United States Patent
Tanaka et al.

(10) Patent No.: US 9,197,939 B2
(45) Date of Patent: *Nov. 24, 2015

(54) MOVING IMAGE DATA DELIVERY SYSTEM, AN ADVERTISING IMAGE DATA DELIVERY SYSTEM, AND A MOVING IMAGE VIEWING APPARATUS

(71) Applicants: Masahide Tanaka, Osaka (JP); Tohru Matsui, Nara (JP)

(72) Inventors: Masahide Tanaka, Osaka (JP); Tohru Matsui, Nara (JP)

(73) Assignee: NL GIKEN INCORPORATED, Osaka (JP)

( * ) Notice: Subject to any disclaimer, the term of this patent is extended or adjusted under 35 U.S.C. 154(b) by 90 days.

This patent is subject to a terminal disclaimer.

(21) Appl. No.: 14/044,969

(22) Filed: Oct. 3, 2013

(65) Prior Publication Data

US 2014/0033244 A1     Jan. 30, 2014

Related U.S. Application Data

(63) Continuation of application No. 11/774,605, filed on Jul. 8, 2007, now Pat. No. 8,677,391.

(30) Foreign Application Priority Data

Jul. 9, 2006 (JP) ................................ 2006-188733

(51) Int. Cl.
| | |
|---|---|
| *H04N 21/47* | (2011.01) |
| *H04N 21/4784* | (2011.01) |
| *G06Q 30/02* | (2012.01) |
| *H04N 21/2543* | (2011.01) |
| *H04N 21/433* | (2011.01) |
| *H04N 21/472* | (2011.01) |
| *H04N 21/81* | (2011.01) |

(52) U.S. Cl.
CPC ........... *H04N 21/4784* (2013.01); *G06Q 30/02* (2013.01); *G06Q 30/0207* (2013.01); *H04N 21/25435* (2013.01); *H04N 21/4334* (2013.01); *H04N 21/47214* (2013.01); *H04N 21/812* (2013.01)

(58) Field of Classification Search
None
See application file for complete search history.

(56) References Cited

U.S. PATENT DOCUMENTS

| | | | | |
|---|---|---|---|---|
| 6,057,872 A | * | 5/2000 | Candelore ....................... | 725/23 |
| 2005/0015798 A1 | * | 1/2005 | Yamamichi et al. ............ | 725/32 |
| 2005/0044568 A1 | * | 2/2005 | White et al. .................... | 725/39 |
| 2007/0113244 A1 | * | 5/2007 | Verschueren et al. .......... | 725/35 |

* cited by examiner

*Primary Examiner* — Cai Chen

(57) ABSTRACT

An advertisement provider issues coupons to an audiences of television set in exchange of viewing a commercial message and receives advertising rate from the advertiser of the commercial message in exchange of informing of the coupon issuance. A television station allows the audience to decompress a downloaded digital image data of a television program in exchange of presentation of the coupon. The television station receives allotment of the advertising rate in exchange of informing of the coupon presentation form audiences. The television station sorts the presented coupons by the advertisement providers to inform each advertisement provider of the coupon presentation. The television station allows the decompression even in a shortage of the presented coupon, provided that it will be compensated by money or later presentation of coupon by due data. The commercial messages are provided automatically or by request. The audience may voluntarily replace television program by commercial message.

16 Claims, 24 Drawing Sheets

MOVING IMAGE DATA DELIVERY SYSTEM, AN ADVERTISING IMAGE DATA DELIVERY SYSTEM, AND A MOVING IMAGE VIEWING APPARATUS

CROSS REFERENCE TO RELATED APPLICATION

This application is a Continuation Application of U.S. application Ser. No. 11/774,605 filed Jul. 8, 2007, herein incorporated by reference in its entirety.

BACKGROUND OF THE INVENTION

1. Field of the Invention

This invention relates to a moving image enjoying system including a moving image delivery system and a moving image viewing apparatus, such as a television program enjoying system.

2. Description of the Related Art

In the conventional commercial television system, a television program is provided by a broadcast station with commercial message by the sponsor of the program inserted therein. However, a person watching the television program on a television set is generally not interested in the commercial message, which is sometimes cut off in recording the television program.

Recently, the television program is delivered as a compressed digital data capable of being downloaded through Internet in addition to the conventional way of delivery through the broadcast airwave. In the case of such a television program as a compressed digital data, the audience can decompress the downloaded data and view the television program at any time. Further, the audience can freely stop and restart the program or skip any part of the program, which means that the audience may cut off an uninterested commercial message. So, various ideas are proposed to prevent audiences from cutting off the commercial message also in the case of delivery of television program as a compressed digital data, which is unpleasant to the audiences.

On the other hand, commercial messages are important information for the audiences who are interested in them. So, various proposals have been made in the field of digital image data delivery to how to selectively deliver a commercial message to a specific audience who is interested therein or how to develop incentives of unspecified audiences to watch a commercial message.

For example, Japanese Laid-open Patent Application 2001-285743 proposes to display in a window of website a part of television commercial message for selection by audiences. On the other hand, Japanese Laid-open Patent Application 2001-285830 proposes a digital television system in which a coupon is issued in exchange of viewing a commercial message.

However, there still remains a demand in this field of art to more suitably harmonize the interest of television stations in producing and delivering the television programs, the interest of audiences in viewing television programs, the interest of audiences in viewing commercial messages and the interest of advertisers in effectively utilizing commercial messages.

SUMMARY OF THE INVENTION

An object of this invention is to provide a moving image enjoying system in which a better harmonization is achieved among television stations, audiences and advertisers.

Another object of this invention is to provide a moving image data delivery system better harmonized with audiences and advertisers.

Still another object of this invention is to provide an advertising image data delivery system better harmonized with television stations, audiences and advertisers.

Further object of this invention is to provide a moving image viewing apparatus with interest of audiences better considered.

To achieve one of the above objects, this invention provides a moving image data delivery system capable of being in communication with a plurality of moving image viewing apparatuses and an advertising image data delivery system. The moving image data delivery system comprises a storage of a plurality of digital moving image data of television programs for the moving image viewing apparatuses. The moving image data delivery system further comprises a first controller adapted to electrically provide one of the digital moving image data of television programs to one of the moving image viewing apparatuses for allowing to display the television program in exchange of a presentation of an electric data denoting a right of viewing the television program, the electric data having been issued to the moving image viewing apparatus by the advertising image data delivery system in exchange of viewing a commercial message provided by the advertising image data delivery system and being presented from the moving image viewing apparatus to the moving image data delivery system. The moving image data delivery system still further comprises a second controller adapted to electrically receive an advertising rate form the advertising image data delivery system in exchange of a report of the electric data presentation to the advertising image data delivery system.

Thus, the moving image data delivery system of this invention provide a moving image data delivery system can provide the digital moving image data of television programs in exchange of the advertising rate in conclusion. And the audience of moving image viewing apparatuses can view both the interested television program and the needed commercial message.

According to a detailed feature of this invention, the first and second controllers are included in a computer as the function thereof.

According to a detailed feature of this invention, the second controller is adapted to aggregate a plurality of presentations of the electric data from the moving image viewing apparatuses in reporting them to the advertising image data delivery system. Thus, the moving image data delivery system of this invention can respond to a great number of unspecified audiences.

In more detail, the advertising image data delivery system is capable of being in communication with a plurality of advertising image data delivery systems. In this case, the second controller is adapted to sort the plurality of presentations of the electric date by the advertising image data delivery systems in aggregating the presentations. Thus, the result of the aggregation is reported to each of the advertising image data delivery systems, respectively.

According to another detailed feature of this invention, the first controller includes a first sub-controller adapted to deliver the digital moving image data in compressed form, and a second sub-controller adapted to allow decompression of the delivered digital moving image data in exchange of the presentation of the electric data. This makes it possible for an audience to avoid presenting the electric data for a digital moving image data which may not been viewed.

In more detail, the first controller further includes a third sub-controller adapted to inhibit a repeated decompression of the delivered digital moving image data unless further electric data is presented to the moving image data delivery system. This is also based on the above principle that the electric data presentation is necessary in exchange of actual viewing of the television program.

According to another detailed feature of this invention, the first controller is adapted to allow the moving image viewing apparatus to display the television program even in the case of insufficiency of the electric data, provided that the insufficiency is to be compensated later by money in due date. This makes it possible for the audience to flexibly switch between a commercial television system and pay television system at its own discretion. Especially, this is advantageous in the case that there is no interesting commercial message at present or there is no time to view commercial message prior to viewing the television program.

In more detail, the first controller is adapted to accept in place of the money a late presentation of electric data issued to the moving image viewing apparatus in exchange of viewing a commercial message prior to the due date. This further increase the flexibility above.

According to another detailed feature of this invention, the advertising image data delivery system is integrated into the moving image data delivery system. In this case, both the delivery systems work in an integrated manner.

According to another feature of this invention, an advertising image data delivery system capable of being in communication with a plurality of moving image viewing apparatuses, a moving image data delivery system and an advertiser is provided. The advertising image data delivery system comprises a storage of a plurality of advertising image data of commercial messages for the moving image viewing apparatuses. The advertising image data delivery system further comprises a first controller adapted to issue to one of the moving image viewing apparatuses an electric data denoting a right of viewing a television program in exchange of viewing commercial message provided by the advertising image data delivery system, the television program being provided by the moving image data delivery system. The advertising image data delivery system still further comprises a second controller adapted to electrically receive an advertising rate from the advertiser of the commercial message in exchange of reporting to the advertiser the electric data issuance. The advertising image data delivery system also comprises a third controller adapted to electrically allot the advertising rate to the moving image data delivery system in exchange of a report of the electric data presentation from the moving image data delivery system to the advertising image data delivery system.

Thus, the electric data denoting a right of viewing a television program is issued in exchange of the advertising rate form the advertiser of the commercial message, which is viewed by the audience in exchange of the electric data. Further, the advertising rate is properly allotted to the moving image data delivery system in exchange of the delivery of the television program to the audience in conclusion.

According to a detailed feature of this invention, the advertising image data delivery system further comprises a fourth controller adapted to electrically provide the plurality of advertising image data of commercial massages to one of the plurality of moving image viewing apparatuses in an automatic manner. Thus, the commercial message data come to the attention of the audience of the moving image viewing apparatus with no operation by audiences needed. The audience can of course easily cut off any commercial message if it is needless.

According to a detailed feature of this invention, the advertising image data delivery system further comprises a fourth controller adapted to electrically provide one of the plurality of advertising image data of commercial messages to one of the plurality of moving image viewing apparatuses by request thereof. Thus, the commercial message data which an audience is interested in is displayed as information or pleasure which the audience wants.

According to another detailed feature of this invention, the advertising image data delivery system further comprises a fourth controller adapted to electrically provide one of the plurality of advertising image data of commercial messages to one of the plurality of moving image viewing apparatuses, the advertising image data of commercial message being related to a television program designated by the moving image viewing apparatus. Thus, an audience can know a commercial message on which the electric data denoting a right of viewing the designating television program can be gotten.

According to another detailed feature of this invention, the advertising image data delivery system further comprises a fourth controller adapted to electrically provide one of the plurality of advertising image data of commercial messages to one of the plurality of moving image viewing apparatuses, the plurality of advertising image data of commercial messages including an advertisement of a television program. This is advantageous for developing the incentive of an audience to get the electric data which is useful for viewing the television program if the audience gets interested in the television program due to the advertisement of the television program.

According to another detailed feature of this invention, the advertising image data delivery system is integrated into a system of the advertiser. This makes it possible for the advertiser to deliver the commercial message and to issue the electric data by itself.

According to another feature of this invention, a moving image viewing apparatus capable of being in communication with a moving image data delivery system and an advertising image data delivery system is provided. The moving image viewing apparatus comprises a display adapted to be capable of displaying a television program provided by the moving image data delivery system and a commercial message provided by the advertising image data delivery system. The moving image viewing apparatus further comprises a first controller adapted to electrically receive form the advertising image data delivery system an electric data denoting a right of viewing the television program on the display in exchange of viewing on the display a commercial message provided by the advertising image data delivery system. The moving image viewing apparatus still further comprises a second controller adapted to be allowed to view the television program provided by the moving image data delivery system in exchange of a presentation of the electric data to the moving image data delivery system.

Thus, the audience of the moving image viewing apparatus can view the television program in exchange of viewing the commercial message in conclusion. The intermediation of the electric data, however, makes it possible for audiences to get free form the intrusive binding between the television program and the commercial message otherwise forced.

According to a detailed feature of this invention, the first controller is adapted to receive the electric data in exchange of selecting one of the plurality of advertising image data of commercial massages provided in an automatic manner. In this case, audiences have choice of selecting or cutting off any of the automatically provided commercial messages. Further, it is possible for the advertising image data delivery system to accommodate the future delivery of the automatic commercial messages to each audience in accordance with the choice thereby.

According to another detailed feature of this invention, the moving image viewing apparatus further comprises a third controller adapted to inform of searched information of a plurality of commercial messages, wherein the first controller is adapted to receive the electric data in exchange of selecting one of the plurality of advertising image data of commercial massages informed by the third controller. In this case, audiences can positively reach a commercial message which it needs.

According to another detailed feature of this invention, the moving image viewing apparatus further comprises a third controller adapted to inform of a plurality of commercial messages related to a television program designated by the moving image viewing apparatus, wherein the first controller is adapted to receive the electric data in exchange of selecting one of the plurality of advertising image data of commercial massages informed by the third controller. Thus, an audience can easily reach a commercial message on which the electric data denoting a right of viewing the designating television program can be gotten. Of course, the audience has a complete option to select one of the commercial messages or not.

According to another detailed feature of this invention, the moving image viewing apparatus further comprises a manual operating portion adapted to voluntary direct the moving image viewing apparatus to at least partially replace the television program by the commercial message on the display. Thus, the audience can take an intermission at any time during the television program with the commercial message voluntarily inserted.

Other features and advantages according to this invention will be readily understood from the detailed description of the preferred embodiments in conjunction with the accompanying drawings.

The detailed description of the preferred embodiments according to this invention includes various detailed features derived from the above mentioned features. However, such detailed features are not only applicable to the above mentioned features, but also are widely and independently applicable to other objects and features. So, the above description should not be deemed to limit the scope of this invention, which should be properly determined on the basis of the attached claims.

DETAILED DESCRIPTION OF THE PREFERRED EMBODIMENTS

Figure 1:
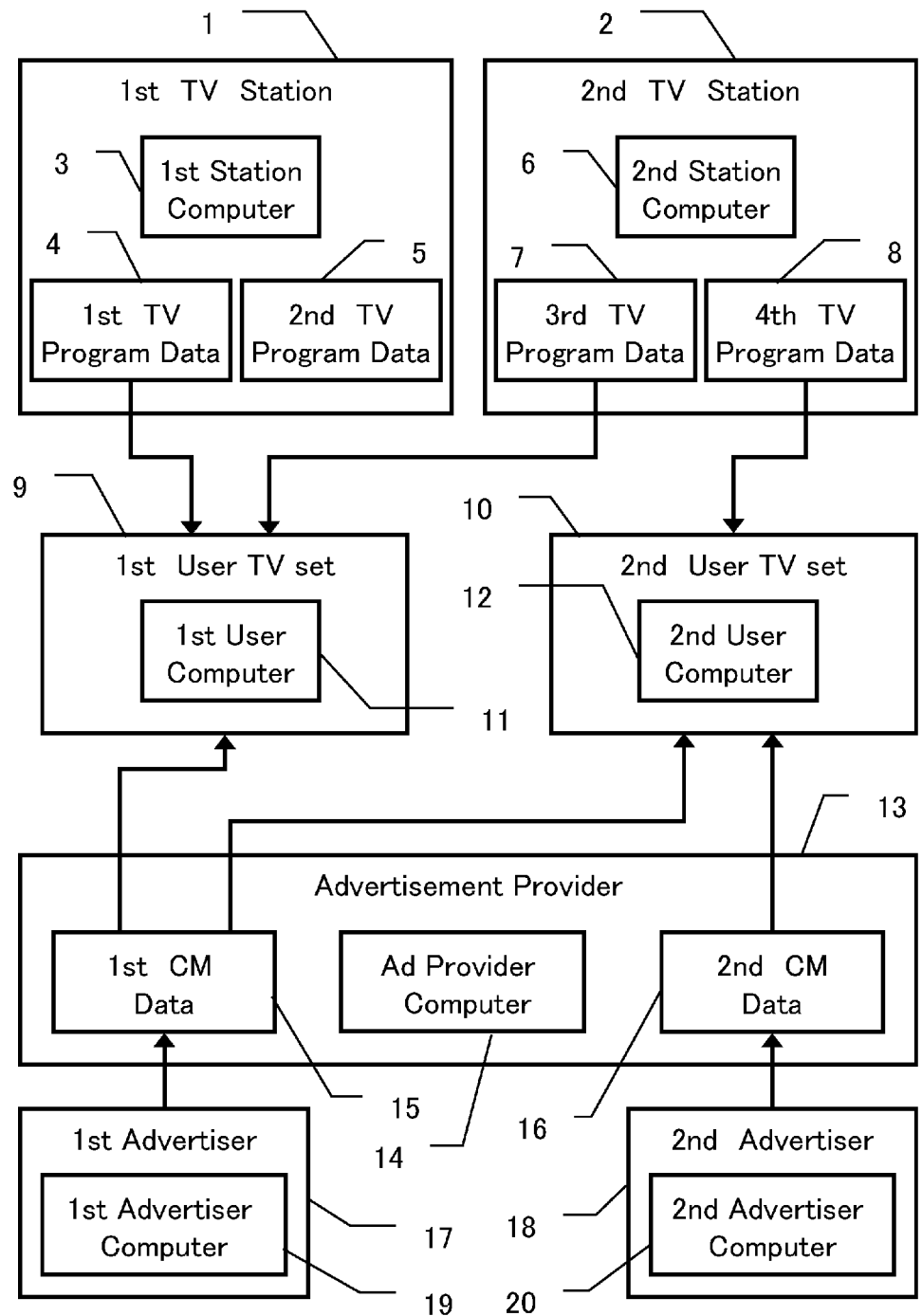
FIG. 1 is a block diagram showing the moving image enjoying system in whole according to this invention.

FIG. 1 is a block diagram showing the moving image enjoying system in whole according to this invention. The moving image enjoying system in FIG. 1 is basically established in a similar manner to that in the commercial television system in that television (TV) program data for various television programs such as movies, shows and news are provided on sponsors so that the users may view the television programs basically free of charge in exchange for viewing advertisement of sponsors such as commercial message (CM).

The moving image enjoying system according to this invention includes a plurality of television stations as moving image data delivery systems. In FIG. 1, however, the first television station 1 and the second television station 2 are shown as the most simplified case. However, the system according to this invention may further include a third or more television stations.

The first television station 1 includes the first station computer 3 and keeps a plurality of television program data. In FIG. 1, however, the first television program data 4 and the second television program data 5 are shown for the purpose of simplification. However, the system according to this invention of course keeps a variety of great number of television program data. In the similar manner, the second television station 2 is shown with the second station computer 6 as well as the third television program data 7 and the fourth television program data 8.

The television program data of the first television station 1 and the second television station 2 are on the air as a conventional television program through conventional broadcast system. According to the feature of this invention, however, the television program data are also capable of being delivered in the form of a compressed digital data file through communication system including Internet.

The moving image enjoying system according to this invention includes a plurality of television sets as moving image viewing apparatuses. In FIG. 1, however, the first user television set 9 and the second user television set 10 for the purpose of simplification. However, the system according to this invention of course includes unspecified great number of television sets. The first user television set 9 and the second user television set 10 include the first user computer 11 and the second user computer 12, respectively, each for controlling the conventional television functions and the receipt of the television program data and in communication with Internet.

The first user television set 9 and the second user television set 10 can receive the television program data on the air as a conventional television program through conventional broadcast system. According to the feature of this invention, however, the television program data are also capable of being received by the first user television set 9 and the second user television set 10 in the form of a compressed digital data file through communication system including Internet. In FIG. 1, the first user television set 9 receives delivery of the first television program data 4 and the third television program data 7 through Internet, while the second user television set 10 receives delivery of the fourth television program data 8 through Internet.

The delivery of the television program data is realized by the first user computer 11 or the second user computer 12 downloading the compressed digital data file of the television program through Internet. The downloaded compressed digital data files are stored in the memory of the first user computer 11 and the memory of the second user computer 12, respectively. Thus, in contrast to the case of the broadcast of the television program data, the downloaded television program can be viewed not only immediately but also afterward at anytime by decompressing the stored data file.

Advertisement provider 13, which functions as an advertising image data delivery system, delivers under control of advertisement provider computer 14 one or more of advertising moving image data such as the first commercial message data 15 and the second commercial message data 16 through communication system including Internet. The advertising image data is downloaded by the first user computer 11 or the second user computer 12 as a form of compressed digital data files. The downloaded advertising image data is decompressed and viewed as the moving image commercial message under control of the advertisement provider computer or in response to operation at the first user computer 11 or the second user computer 12. Of course, advertisement provider 13 keeps variety of great number of advertising image data, which are not shown in FIG. 1 for the purpose of simplification except for the first commercial message data 15 and the second commercial message data 16.

In FIG. 1, the first user television set 9 receives delivery of the first commercial message data 15 through Internet, while the second user television set 10 receives delivery of the first commercial message data 15 and the second commercial message data 15 through Internet. It should be noted that the play of the commercial message data automatically commences immediately after selection thereof on the first user television set 9 or the second user television set 10 in contrast to that the play of the television program data is possibly not only immediately after selection but also afterward at anytime.

The selection of the commercial message data to be played can be made not only by manual operation by the user every time but also automatically in a predetermined order. Further, the user can cut off a once commenced commercial message at the first television set 9 or the second television set 10. The details of the above will be explained again in more detail in relation to the delivery of the advertising image data and its selection.

Advertisement provider 13 issues an electronic coupon to a user who is confirmed to have viewed an advertising image data on the first user television set 9 or the second user television set 10. The user who gotten the electric coupon is entitled to view on the first user television set 9 or the second user television set 10 the television program provided by the first television station 1 or the second television station 2. In other words, the first user television set 9 or the second user television set 10 to which the electric coupon has been issued can download free of charge the television program provided by the first television station 1 or the second television station 2 in exchange for the electric coupon.

The electric coupon is from two types including the exclusive type and the wild card type. The wild card type electric coupon is valid at any television station for any television program data regardless of the commercial message causing the electric coupon. For example, the first user television set 9 can download any of the first television program data 4 to the fourth television program data 8 from any of the first television station 1 and the second television station 2 even if the electric coupon is gotten by viewing a specific advertising image data such as the first commercial message data 15. On the other hand, the exclusive type electric coupon is basically valid only for the designated television program data. For example, if the electric coupon is issued with the first television program data 4 designated upon viewing the first commercial message data 15, the first user television set 9 can only download the first television program data 4 from the first television station 1. The exclusive type electric coupon, however, can be exchanged to the wild card type electric coupon at a predetermined exchange rate. The issuance and usage of the electric coupon will be explained again in more detail.

In FIG. 1, only the advertisement provider 13 is shown for the purpose of simplification. However, the system according to this invention includes a plurality of competing advertisement providers. As long as such advertisement providers join the system, an electric coupon is valid within the system regardless of the specific advertisement provider that actually has issued the electric coupon according to the embodiment above.

An alternative embodiment, however, is possible in which the first television station 1 and some advertisement provider form in combination a first exclusive system and the second television station 2 and another advertisement provider form in combination a second exclusive system, for example. In such an alternative embodiment, an electric coupon is only valid within the exclusive system in which the electric coupon has been actually issued.

The first commercial message data 15 and the second commercial message data 16 are provided by the first advertiser 17 and the second advertiser 18, respectively. Normally, the commercial message data is produced by an advertisement agency in accordance to an order form the advertiser.

The first advertiser 17 and the second advertiser 18 includes the first advertiser computer 19 and the second advertiser computer 20, respectively for controlling the payment of the advertisement rate. The first advertiser computer 19 and the second advertiser computer 20 are in combination with advertisement provider computer 14, respectively, to carry out the advertising rate payment from the first advertiser 17 and the second advertiser 18 to advertisement provider 13, respectively, in accordance with the actual viewing of the first commercial message data 15 or the second commercial message data 16 on the first user television set 9 or the second user television set 10.

The advertisement provider 13 allots the gotten advertising rate to the first television station 1 or the second television station 2 in accordance with the actual presentation of the electric coupon from the first user television set 9 or the second user television set 10 in exchange of viewing the television program. Upon allotting the gotten advertising rate above, the advertisement provider 13 deducts commission necessary for continuing its business.

Figure 2:
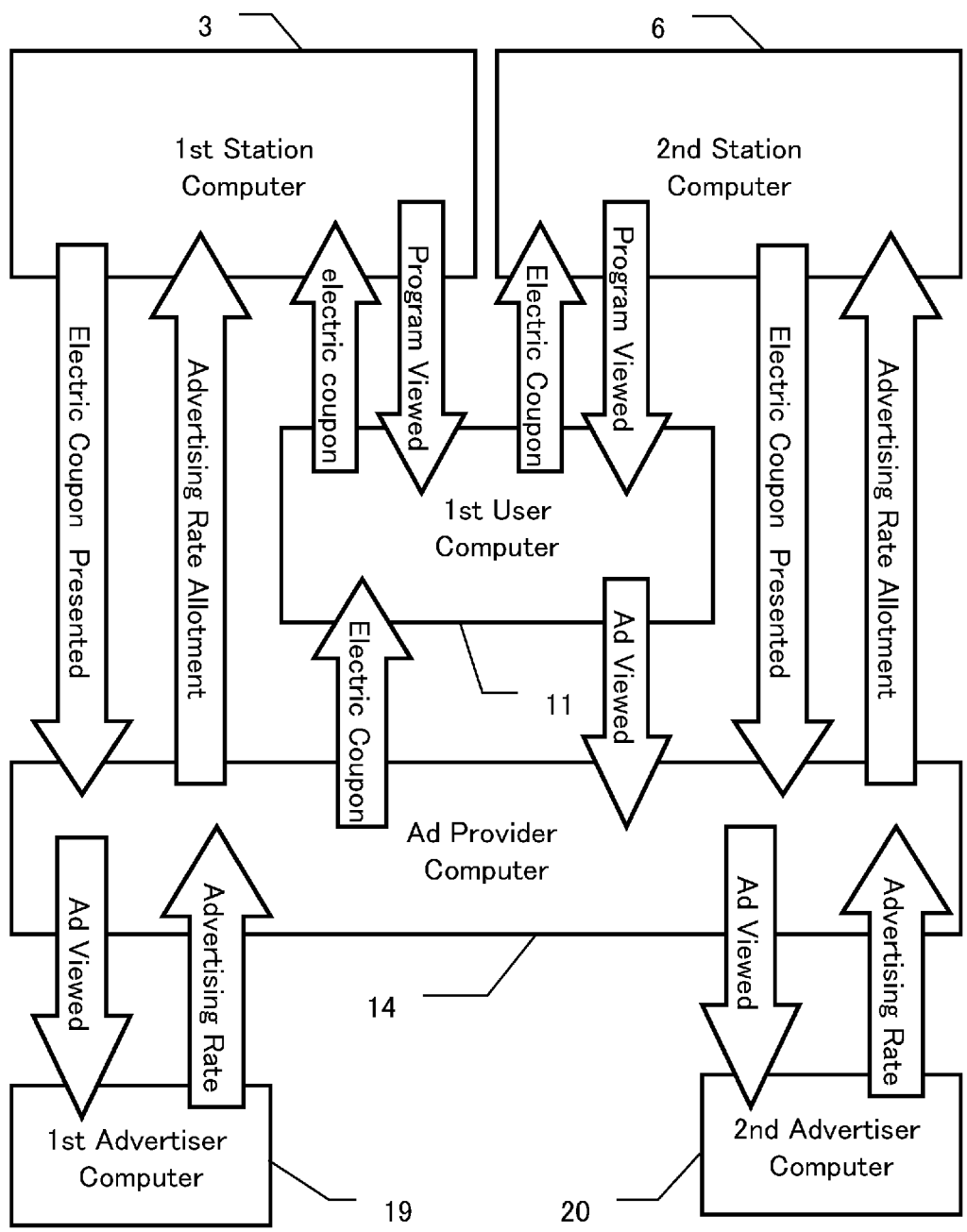
FIG. 2 is a block diagram showing the information transmission and value exchange through Internet among the station computers, the user computer, the advertisement provider computer and the advertiser computers according to the embodiment in FIG. 1

FIG. 2 is a block diagram showing the information transmission and value exchange through Internet among the first station computer 1, the second station computer 2, the first user computer 11, advertisement provider computer 14, the first advertiser computer 19 and the second advertiser computer 20 according to the embodiment in FIG. 1. The second user computer 12 is omitted in FIG. 2 for the purpose of simplification since the relationship of second user computer 12 with the other computers is similar to the relationship of the first user computer 11 and the other computers in FIG. 2. In other word, the relationship is readily understood by substituting the first user computer 12 for the first user computer 11 in FIG. 2.

FIG. 2 is shown as if each of the value exchanges is done between relating pair of the computers. However, another computer such as bank computer or credit company computer may go between the pair of computers.

In FIG. 2, advertising rate payment process are carried out between advertisement provider computer 14 and the first advertiser computer 19 for performing the payment form the latter to the former. The advertising rate consists of the fixed rate and metered rate. The fixed rate is paid on the basis of the data of advertising agreement on the first commercial message between advertisement provider 13 and the first advertiser 17. On the other hand, the metered rate is paid on the basis of the report form the advertisement provider computer 14 to the first advertiser computer 19 about the actually viewed advertising image data. The report includes the total frequency of actual views of the first commercial message by unspecified number of television sets during a predetermined period. The total frequency of commercial message views by unspecified number of television sets includes the actual view of the first commercial message 15 by the second user television set 12.

Similar process for advertising rate payment is carried out between advertisement provider computer 14 and the second advertiser computer 20 for performing the payment form the latter to the former with respect to the second commercial message 16. However, explanation thereof is omitted for avoiding mere duplicate.

Between the first user computer 11 and the advertisement provider computer 14, electric coupon issuance process is carried out for issuing the electric coupon from the latter to the former. The issuance of the electric coupon is carried out every time in exchange of the confirmation by the advertisement provider computer 14 on the basis of information from the first use computer 11.

According to FIG. 1, the first user television set 9 is provided with the first commercial message data. So, if the advertisement provider computer 14 determines that the first commercial massage data 15 is actually viewed, it issues the electric coupon balancing with the first commercial message data 15 to the first user computer 11. Similarly, if the advertisement provider computer 14 determines that the second commercial massage data 16 is actually viewed, it issues possibly different amount of the electric coupon balancing with the second commercial message data 16 to the first user computer 11. Thus, electric coupons of various amounts accumulate in the first user computer 11 one by one every time a commercial message is viewed.

Between the first user computer 11 and the first station computer 3, electric coupon consumption process is carried out. In this process, if first user computer 11 requests to view the first television program data 4, it is confirmed between the first user computer 11 and the first station computer 3 whether or not the total amount of the accumulated electric coupons is sufficient for the requested view. If sufficient, the amount of the coupon necessary for viewing the first television program data 4 is consumed form the accumulated coupons. And, in exchange for the consumption of the coupon, the first television program is can be viewed through the first user computer 11 through the download.

Even if the total amount of the accumulated electric coupons is insufficient, the view of the first television program data itself is possible by means of the credit of the coupon amount. This will be explained in detail later.

Similarly, the process for electric coupon consumption is also carried out between the first user computer 11 and the second station computer 6. However, explanation thereof is omitted for avoiding mere duplicate.

Between the first station computer 3 and advertisement provider computer 14, advertising rate allotment process is carried out. In this process, advertisement provider computer 14 allots the gotten advertising rate to the first station computer 3 in response to the report of the presented electric coupon from the first station computer 3. The report includes information of the total amount of the electric coupons presented form unspecified number of user computers to the first station computer 3 in exchange of the program viewed during a predetermined period. Therefore, the presented electric coupon reported form the first station computer 3 to advertisement provider computer 14 includes coupon presented not only form the first user computer 11, but also from second user computer 12 though not shown in FIG. 2.

Similarly, the process for advertising rate allotment is also carried out between advertisement provider computer 14 and the second station computer 6. However, explanation thereof is omitted for avoiding mere duplicate.

Figure 3:
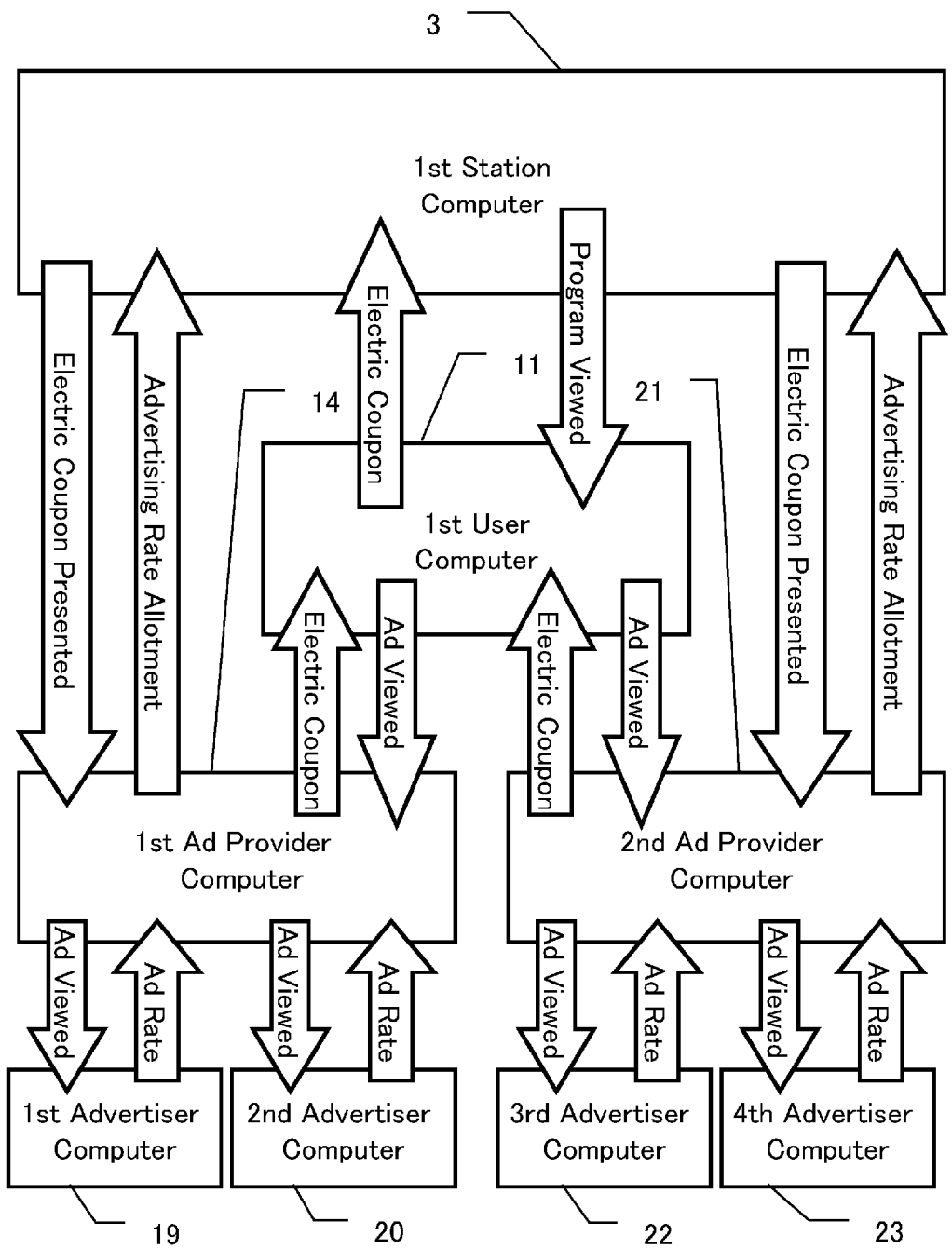
FIG. 3 is a block diagram similar to FIG. 2 for showing the information transmission and value exchange through Internet among related computers including a plurality advertisement provider computers.

FIG. 3 is a block diagram similar to FIG. 2 for showing the information transmission and value exchange through Internet among related computers. In contrast to FIG. 2, FIG. 3 included a plurality of advertisement providers. In other words, the second advertisement provider computer 21, for example, is shown in FIG. 3 in addition to the first advertisement provider computer 14, which is identical with advertisement provider computer 14 in FIG. 2. In FIG. 3, the second station computer 6 is not shown for the purpose of simplification since its relationship with the other computers can be easily understood by substituting the second station computer 6 for the first station computer 3 in FIG. 3.

In the case that the system includes a plurality of advertisement providers as in FIG. 3, each of the advertisement providers is independent from and compete with the others in making agreements with its client advertisers and the television stations as to advertising rate allotment process on the electric coupon.

The second advertising provider computer 21 is in cooperation with the third advertiser computer 22 and the fourth advertiser computer 23 to manage commercial message data provided by the third advertiser and the fourth advertiser. The manner of cooperation between these computers is similar to that between the first advertising provider computer 14 and the first advertiser computer 19 and the second advertising computer 20, duplicate explanation thereof being omitted.

The manner of cooperation between the first user computer 11 and the second advertisement provider computer 21 is similar to that between the first user computer 11 and the first advertising provider computer 14, duplicate explanation thereof being omitted. It should be noted, however, that electric coupons issued by the first advertisement provider 14 and those issued by the second advertisement provider 21 both accumulate in the first user computer 11 in mixture with the origin of issuance identifiable. The accumulated electric coupons include the information of the date of issuance, respectively so that the coupons may be consumed in the order of the issue date as will be explained later in more detail.

The electric coupons issued by the first advertisement provider computer 14 and the electric coupons issued by the second advertisement provider computer 21 can be combined by the first user computer 11 into one for the purpose of viewing one television program data, e.g., the first television program 4 from the first station computer 3.

In aggregating the coupons presented by the user computers, however, the first station computer 3 separates the electric coupons issued by the first advertisement provider computer 14 from the electric coupons issued by the second advertisement provider computer 21. Thus, the report of the presented electric coupon from the first station computer 3 to the first advertisement provider 14 is on the electric coupons that the first advertisement provider 14 issued. So, the first advertisement provider computer 14 allots to the first station computer 3 the advertising rate for the coupons issued by itself. These are also true with respect to the coupons issued by the second advertisement provider computer 21.

Thus, the advertising rate paid depending on the actual view of the commercial message is allotted to the television station depending on the consumption of the coupons. As is well understood from FIG. 3, the total sum of the advertising rate which one advertisement provider gets from all the advertisers corresponds to the total sum of the advertising rate which the advertisement provider allots to all the television stations. It is not matter that a coupon issued on viewing a specific commercial message is consumed for viewing a specific television program data from a specific television station. Each advertiser is not interested in the consumption of the coupons, but is interested in whether or not its commercial message is viewed, which is the only reason why the advertiser pay advertising rate. On the other hand, each television station is not interested in the origin of the coupons, but is interested in whether or not its television program is viewed, which is the only base of being allotted with the advertising rate. The wild card type electric coupon is issued on the basis of the above relationships of interest.

On the other hand, the exclusive type electric coupon is issued and consumed with a combination of a specific television program and a specific commercial message assumed by all of a specific advertiser, a specific television set user and a specific television station. The electric coupon will be explained later in more detail.

In FIG. 2 or FIG. 3, a modification is possible to form an alternative embodiment in which the first television station 1 and the advertisement provider 13 are integrated into one enterprise. Within such an enterprise, the advertising rate gotten by the advertisement provider computer 14 which issues the coupon in exchange of the commercial message viewing by the user is allotted to the first station computer 3 on the basis of the television program viewing by the user.

In FIG. 2 or FIG. 3, another modification is possible to form a further alternative embodiment in which the function of advertisement provider computer 14 is incorporated into the first station computer 3 with the advertising rate allotment process omitted. In such an alternative embodiment, the advertising rate gotten through issuance of the coupon in exchange of the commercial message viewing by the user comes in the first station computer instantly without actual viewing of the television program. In this case the actual viewing of the television program may seem to have no relation to the advertising rate income. However, no one desires to get the coupon by viewing the commercial message if there is no attractive television program viewable in exchange of presentation of such a coupon. And, no advertiser pays the advertising rate if no one gets the coupon by viewing the commercial message. Thus, the system is based on an attractive television program which user desires to view in exchange of presentation of the coupon.

Figure 4:
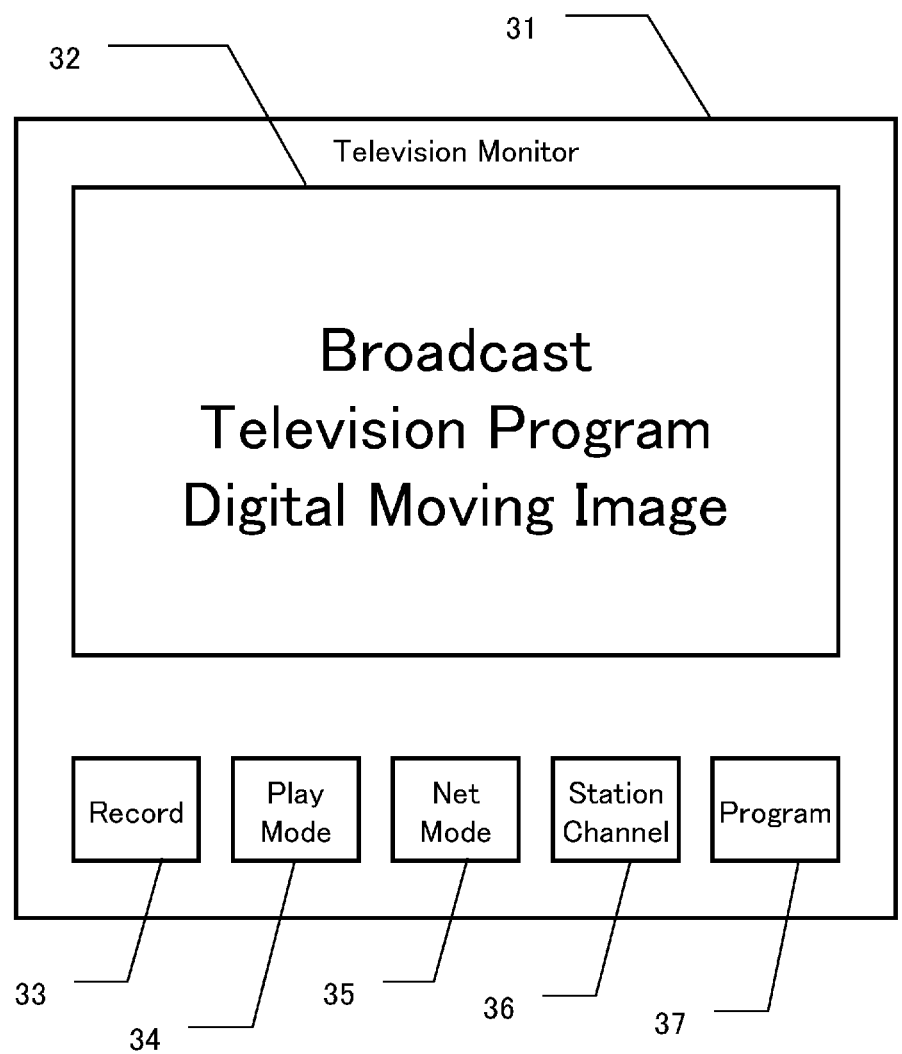
FIG. 4 is a display on television monitor of the user television set in the moving image enjoying system according to this invention.

FIG. 4 is a display on television monitor 31 of the first user television set 9 or the second user television set 10 in the moving image enjoying system according to this invention. The display of television monitor 31 in FIG. 4 is caused by turning on the television set through a remote controller. In this condition, digital moving image of broadcast television program 32 coming on airwaves is displayed on television monitor 31. Below the television program 32, there are displayed record button 33 to be operated for recording broadcast television program, play mode button 34 to be operated for going into the play mode in which the recorded broadcast television program or a downloaded television program data is played back, and net mode button 35 to be operated for starting the net mode in which digital moving image data delivered through Internet is viewed. Further, there are displayed station channel button 36 to be operated for selecting one of the television stations and program button 37 to be operated for displaying the television programs. These buttons and buttons to be referred to later are all operated through the remote controller.

If play mode button 34 is operated, there is displayed on television monitor 31 a list of available television programs including the recorded broadcast television programs or downloaded television programs, which may be listed in mixture. If program button 37 is operated, on the other hand, there is displayed a list including television programs to be broadcasted and television program data capable of being downloaded through Internet, any one of the television programs being selectable form the list. The display above will be explained later in more detail.

Figure 5:
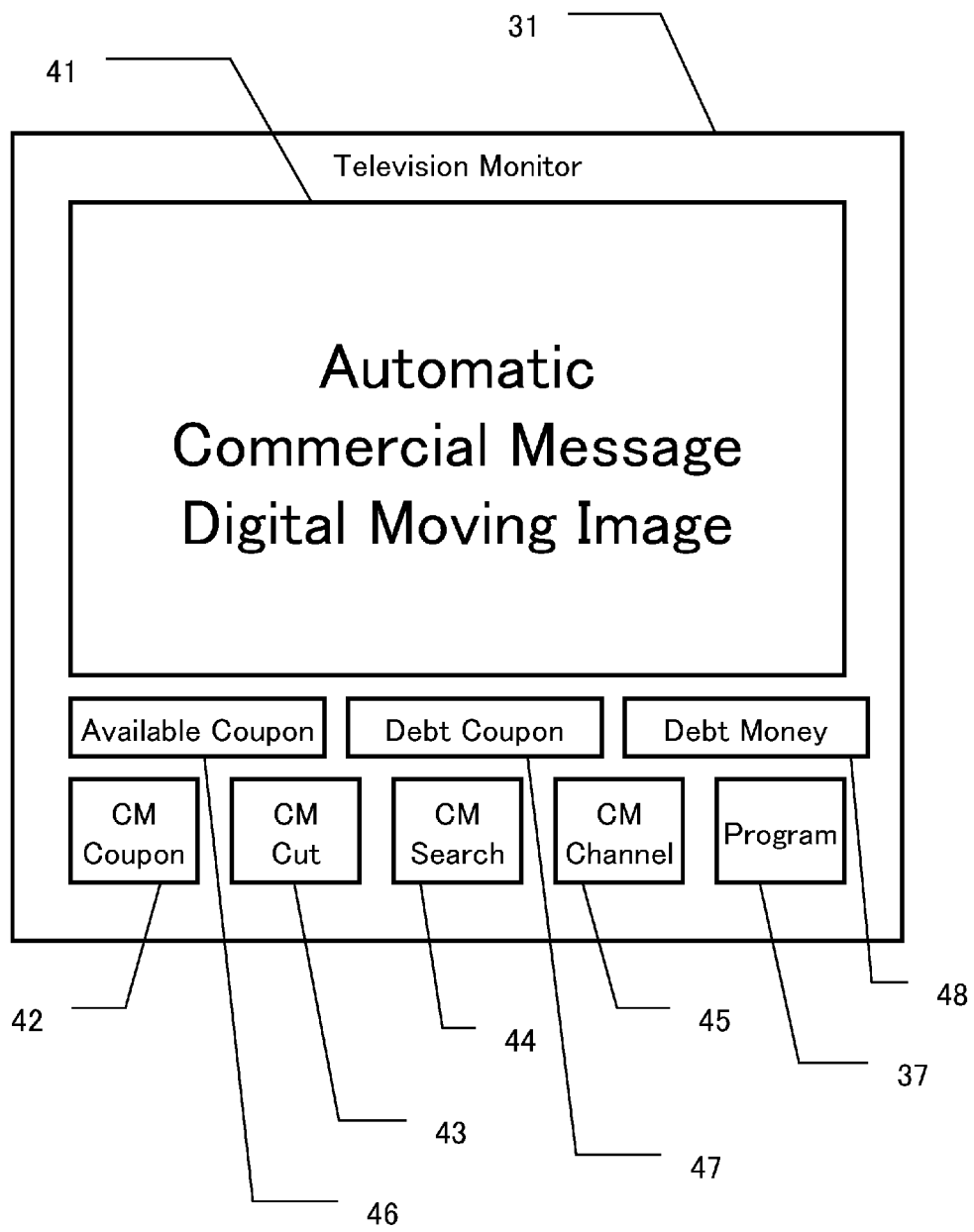
FIG. 5 is another display on television monitor caused by operation of net mode button in the display on monitor in FIG. 4.

FIG. 5 is another display on television monitor 31 caused by operation of net mode button 35 in the display on monitor 31 in FIG. 4. In this case, digital moving image of automatic commercial message 41 is displayed on television monitor 31. Automatic commercial message 41 is displayed in such a manner that commercial message data automatically delivered by advertisement provider computer 14 is automatically decompressed by the user computer one by one in accordance with a predetermined order. During display of one commercial message data, the next commercial message data is decompressed. Thus, the display of the next commercial message data will be started in succession to the end of display of the one commercial message data.

The coupon to be issued in compensation for the viewing of the automatic commercial message does not depend on the actually viewed discrete commercial message, but on the length of total time period during which a series of automatic commercial messages are viewed. However, the amount of coupon issued on the automatic commercial message is set minimum less than the electric bill charged on the television set kept in power-on state for the time period during which the series of automatic commercial massages are displayed. So, no one would keep the television set in power-on state without viewing the commercial message for the purpose of merely getting the coupon. Advertisement provider computer 14 charges the first advertising computer 19 or the like the advertising rate not for the actual view of the first commercial message data, but for the length of the scheduled time allotted to the first commercial message data.

The automatic commercial message data may be the first commercial message data 15 or the like itself with the full length. But, the first commercial data 15 or the second commercial data 16 may be automatically remade into the digest version or the index version for use in the automatic commercial message delivery. Such a digest version or index version is displayed with a link informed accordingly in the automatic commercial message 41. So, if commercial message coupon button 42 is operated with the digest version or the index version of the first commercial message data 15 displayed, the display changes into the original version of the first commercial message data 15 of full length, the regular coupon of a greater amount being to be issued.

On the other hand, if commercial message cut off button 43 is operated with an undesired automatic commercial message displayed, the display of the automatic commercial message is cut off instantly to substitute the next automatic commercial message. Further, such an operation of commercial message cut off button 43 is reported to advertisement provider computer 14 to restrain under some rule from delivering again the same commercial message data to the first user computer 11. Advertisement provider computer 14 aggregates the operations of commercial message cut off button 43 from a great number of customer computers as to each of commercial message data to inform the advertiser of the aggregation result if the frequency of operation of commercial message cut off button 43 is high. Thus, the advertiser can consider whether or not continue the delivery of the unpopular commercial message. In the case of the automatic commercial message, advertisement provider computer 14 may automatically take off the advertising rate for the unpopular automatic commercial message in accordance with the reduced time allotted to it caused by the restraint of delivery.

In FIG. 5, commercial message search button 44 and commercial message channel button 45 for selecting among advertisement provider channels are displayed below automatic commercial message 41. Commercial message channel button 45 is operated to substitute another advertising provider for advertisement provider 13 providing the automatic commercial message 41 currently viewed. Program button 37 in FIG. 4 is also displayed in FIG. 5 with the same function.

Below automatic commercial message 41 in FIG. 5, there is further displayed available coupon window 46 indicating the sum amount of coupons currently gotten and available to view the television programs. There are also displayed debt coupon window 47 indicating the amount of debt in terms of coupon and debt money window 48 indicating the amount of debt money which is a conversion of debt coupon 47. As long as some amount of debt coupon is shown in debt coupon window 47, available coupon window 46 indicates "zero". By means of viewing the indication in available coupon window 46 and debt coupon window 47 in the above condition, the user knows it necessary to get coupon by viewing commercial message. In other words, the user thus knowing the necessity of getting coupon is induced to operate commercial message coupon button 42. The meaning of windows 46, 47 and 48 will be explained later in ore detail.

Figure 6:
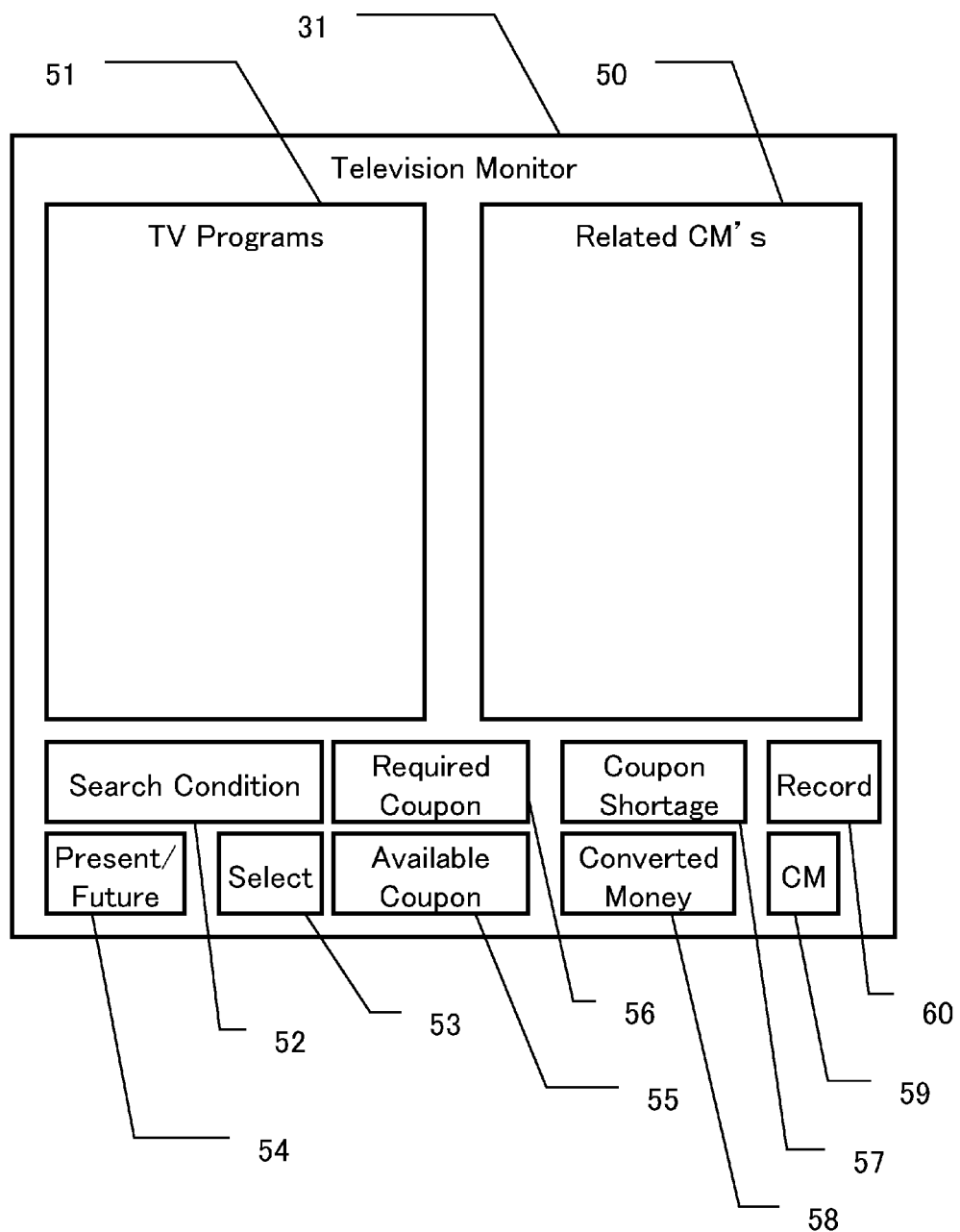
FIG. 6 is another display on television monitor caused by operation of program button in the display on monitor in FIG. 4 or FIG. 5.

FIG. 6 is another display on television monitor 31 caused by operation of program button 37 in the display on monitor 31 in FIG. 4 or FIG. 5. In this case, television program window 51 for indicating television programs available at the time is displayed. In the first stage of display at television program window 51, a major division of the television programs such as categories is displayed, one of the categories being selectable by selection button 53 for limiting the search into the fine sort to finally display a list of hit television programs in television program window 51. Or, alternatively, the user can input search condition at search condition window 52 to display a list of the hit television programs in television program window 51. The list of the hit television programs displayed in television program window 51 as the result of the category limitation or the condition search includes in mixture the television program now on air and the television program data which can be now downloaded through Internet, any of which is selectable by operating selection button 53 among the displayed list. The television program now on air and the television program data which can be now downloaded through Internet are distinguishable from each other in the list.

Further, such a setting is possible that the list of hit television programs displayed in television program window 51 includes recorded broadcast television programs and stored television program data which has been download through Internet as well as the television programs now on air and the television program data which can be now downloaded. Such recorded or stored television programs in the list are distinguishable form the television programs now available through the broadcast or Internet.

Present and future switching button 54 is for switching the list to be displayed in television program window 51 between programs available at present and programs scheduled in the future. The latter is similar to the conventional weekly broadcast schedule table including programs by all the television stations.

If present and future switching button 54 is operated with the programs scheduled in the future displayed in television program window 51, the display changes into the programs available at present. If selection button 53 is operated with the programs available at present displayed in television program window 51, the display changes into the condition of FIG. 4 in which the selected broadcast television program is displayed.

If selection button 53 is operated to select one of the television programs in television program window 51 for the purpose of downloading the same through Internet, total amount of coupon which the user keeps is indicated in available coupon window 55, while amount of coupon necessary to download the selected television program data is indicated in required coupon window 56. In the case that the amount in available coupon window 55 is greater than that in required coupon window 56, the indications in those windows automatically disappear in a short time to cause the automatic download of the selected television program data.

During the time taken for downloading the selected television program data, automatic commercial message 41 is displayed in television monitor 31 as in FIG. 5. If there appears some digest version of commercial message, user can operate commercial message coupon button 42 to change the digest version of commercial message into the original version thereof for getting coupon. Such an operation of commercial message coupon button 42 is possible concurrently with the download of television program data. Upon completion of the download of television program data, the display in television monitor 31 automatically changes into the contents image of the downloaded television program. In some case, the change may occur with commercial message cut off. However, such an incomplete viewing of commercial message is not counted as any refusal of the commercial message as in the case of the operation of commercial message cut off button 43.

In the case that the amount in available coupon window 55 is less than that in required coupon window 56, the automatic download of the selected television program data is postponed with the short amount of coupon indicated in coupon shortage window 57. If the available coupon is zero, the amount in required coupon window 56 and the amount in coupon shortage window 47 are equal. In converted money window 58, short amount of money which is a conversion of the coupon shortage is indicated for the sense of reality.

The indication in converted money window 58 means that the download of the television program to be done may not be free but will be charged to the account of the user in one month for example. The user agreeing to the possible charge will operate select button 53 again. And, the download of the selected television program starts. For the purpose of avoiding an operation in error possibly leading to an undesirable payment, a pay download button may be additionally prepared in television monitor 31 in addition to selection button 53.

In response to the second operation of selection button 53, the indication in required coupon window 56 is reset as well as coupon shortage window 57 is replaced by debt coupon window 46 in which a new amount of debt coupon with the short amount of the coupon formerly appearing in coupon shortage window 57 added. In conjugation therewith, converted money window 58 is replaced by debt money window 48 in which a new amount of debt money corresponding to the indication of debt coupon window 47 is indicated. The amount of money indicated in debt money window 48 will be charged to the account of the user at due date if left as it is. However, the user can cancel the debt money by getting new coupon in exchange of viewing commercial massage prior to the due date.

In the case that the amount in available coupon window 55 is less than that in required coupon window 56, the user can get new coupon in exchange of viewing commercial massage prior to operating selection button 53 again. For assisting such action of the user, indexes of commercial messages are displayed in related commercial message window 50. The indexes of commercial messages are so related to the selected television program that the exclusive type electric coupon basically valid only for the selected television program is issued in exchange of viewing commercial massage in related commercial message window 50. Commercial message window 50 includes indexing still image or simplified moving image designed to be an attractive introduction to the commercial message as in the case of banner ads in the web site. Each indexing still image or simplified moving image is accompanied with the amount of electric coupon to be issued in exchange of viewing the commercial message. Thus, the user can select commercial message to view with the comparison between the amount in coupon shortage window 57 and the coupon amount in related commercial message window 50 as well as attractiveness of the commercial message itself both taken into consideration, the selection being possible by operating commercial message button 59. This is similar to the selection of commercial message by commercial message coupon button 42 in FIG. 5 in terms of getting coupon. If the shortage of coupon amount is not resolved for all newly gotten coupon, the display in FIG. 6 comes again after the commercial message is over. So, the user can select the next commercial message to repeat the coupon getting action. Thus, if the shortage of electric coupon shortage is resolved, the automatic download of the selected television program data automatically starts. The rest is similar to the case of no shortage of electric coupon.

Indexing still image or simplified moving image in commercial message window 50 is not necessarily a direct advertisement such as a brand, trademark, and product, but also other attractive information such as image or name of famous performer or beautiful scenery without information of advertiser. This is because that the indexing still image or simplified moving image is an introduction to main commercial message.

The commercial message to be viewed upon the shortage of electric coupon is not necessarily be selected among those in related commercial message window 50. If the user would not be interested in commercial messages in related commercial message window 50 by any means, the user can stop television program selection to go back to the display in FIG. 5, in which the user can operate commercial message search button 44 through the remote controller to look for other attractive commercial messages to get the electric coupon. The electric coupon getting process will be explained later in more detail.

In the case of recording the television program in place of instantly viewing the same, record button 60 is to be operated in place of selection button 53. This causes recording process in accordance with the type of the selected television program.

In other words, if a broadcast digital television program on air is selected by record button 60, the program on air is recorded in a conventional manner. On the other hand, if a scheduled broadcast digital television program is selected, the program will be recorded in accordance with a conventional timer recording function, the recorded broadcast program data being stored in the first user computer 11.

In the case of a television program data to be gotten through Internet, the television program data is downloaded to be stored in the first user computer 11. In any case, the stored television programs can be displayed in television program window 51 in addition to the television programs explained above in a distinguishable manner from them.

Figure 7:
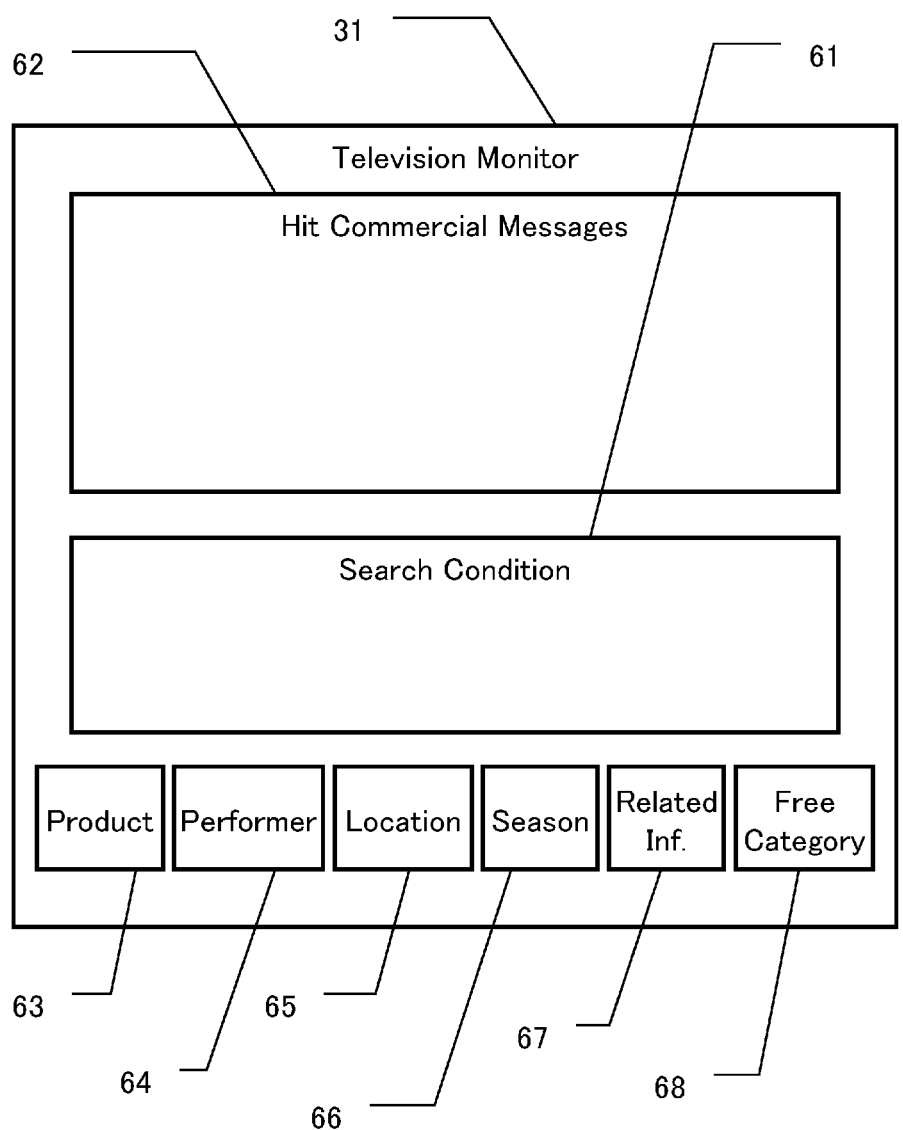
FIG. 7 is another display on television monitor caused by operation of commercial message search button in the display on monitor in FIG. 5.

FIG. 7 is another display on television monitor 31 caused by operation of commercial message search button 44 in the display on monitor 31 in FIG. 5. Commercial message search button 44 is operated when the user wants to gather some product information or to look for commercial message itself for fun as well as to get electric coupon.

If the user wants to gather product information, product button 63 in FIG. 7 is operated to display a major division of the product categories in search condition window 61, which is to be limited into the fine sort to finally display a list of hit commercial messages in hit commercial message window 62. In response to the operation of commercial message search button 44 in FIG. 5, the display in FIG. 7 initially appears with the product set as the search condition even if product button 63 is not operated. Similarly to related commercial message window, hit commercial message window 62 displays indexing still image or simplified moving image designed to be an attractive introduction to the commercial message as in the case of banner ads in the web site.

The amount of coupon to be issued in exchange of viewing the commercial message once is so determined that unit price multiplied by unit number gives a constant result. In other words, the amount of electric coupon issued for one CM view is low for mass consumption goods. On the contrary, the amount is high for a product of low visibility, a high price rare product, or a product for enthusiasts.

The difference in amount of electric coupon for one CM view may invite coupon hunters who selectively view the commercial message with high coupon for the sole purpose of getting coupon. For avoiding such a meaningless case, the indexing information of commercial message in hit commercial message window 62 are not accompanied with the amount of coupon in contrast to the case of related commercial message window 50 in FIG. 6. Further, the amount of coupon cannot be the any condition of searching the commercial message for the same reason. So, no one knows the amount of the coupon prior to once getting the coupon. To prevent the coupon hunters from repeatedly viewing the once known high coupon CM, the amount of coupon issued in exchange of the second or further view by the same user computer is set to minimum. Thus, advertises are protected not to pay meaningless advertising rate in dependence on the number of views of the commercial messages.

In general, the commercial messages are created for the purpose of not only transmitting information to consumers originally interested in the products of the advertiser, but also attracting consumers originally not interested in the products. Thus, a commercial message includes not only product information, but also other attracting factors such as charming performer or beautiful location. Further, the story and artistic image is considered in preparing commercial messages. For assisting consumers to meet unappreciated products with the above view points taken into consideration, various search conditions other than product category are prepared in the display in FIG. 7. If performer button 64 is operated, alphabet table is displayed in search condition window 61 as major division of the performers, which is to be limited into the fine sort by the name of a target performer to finally display a list of hit commercial messages including the performer in hit commercial message window 62.

If location button 65 is operated, alphabet table or wide area map is displayed in search condition window 61 as major division of the locations, which is to be limited into the fine sort by the target location to finally display a list of hit commercial messages including the location in hit commercial message window 62. If season button 66 is operated, a list of hit commercial messages including the season when the commercial message was created is displayed in hit commercial message window 62. The search conditions can be combined. For example, a search conducted with the combination of the location and season conditions will hit commercial messages created at the designated location and in the designated season.

Consumers are interested in products because of information not only directly related to the products, but also indirectly related to the products, such as reputation of the products or comparison between the products and competing products. For example, consumers are greatly interested in comments by others on the products, or discount rate, price comparison and market share or the like related to the products. If commercial messages are to be searched on a condition as to such indirectly related information, related information button 67 is to be operated.

If free category button 68 is operated, any desired search condition free from product, performer, location, season and related information can be input into search condition window 61. Once input free category search condition can be kept to reuse the same in the next search. A plurality search conditions can be combined among the product, performer, location, season, related information and free category.

If one of indexing still images or simplified moving images in hit commercial message window 62 is selected by operating the remote controller, corresponding commercial message data is delivered and coupon is issued in exchange of the viewing thereof, which is similar to the selection of commercial message by commercial message coupon button 42 in FIG. 5 in terms of getting coupon.

Thus, even if there is no television program to download and view for the time being, user is possible to get coupon by searching and viewing commercial messages for gathering product information or for fun. The motivation of consumers to view the commercial message for fun is a good influence on commercial message creators to match wits with creation of more and more attractive commercial messages, which increases consumer to view the commercial messages for fun. Thus, the basic power of commercial messages attracting consumers is developed.

Indexes of commercial messages displayed in related commercial message window 50 in FIG. 6 or hit commercial message window 62 in FIG. 7 are not predetermined, but varies in dependence on search condition. This means that voice or music individually accompanying each of the commercial messages especially in the case of moving images cannot be used for a combination of them displayed by chance in related commercial message window 50 or hit commercial message window 62. Therefore, the individually prepared voice or music do not accompany the combination of indexes of commercial message, but an independently prepared background music or the like accompanies the display of the combination of indexes of commercial message.

According to the embodiment of this invention, a digest version or demo version of music contents accompanies the combination of indexes of commercial message. For this purpose, advertisement provider computer 14 has provide the first user computer 9 with such digest version or demo version of music contents to have the first user computer. 11 store the same in its memory. The demo versions of music contents are retrieved from the memory in a predetermined order to accompany the combination of indexes of commercial message during they are displayed in television monitor 31 in FIG. 6 or FIG. 7 by the first user computer 11. Television monitor 31 displays the name and performer of the music for paid download by the user who is interested in the music.

Figure 8:
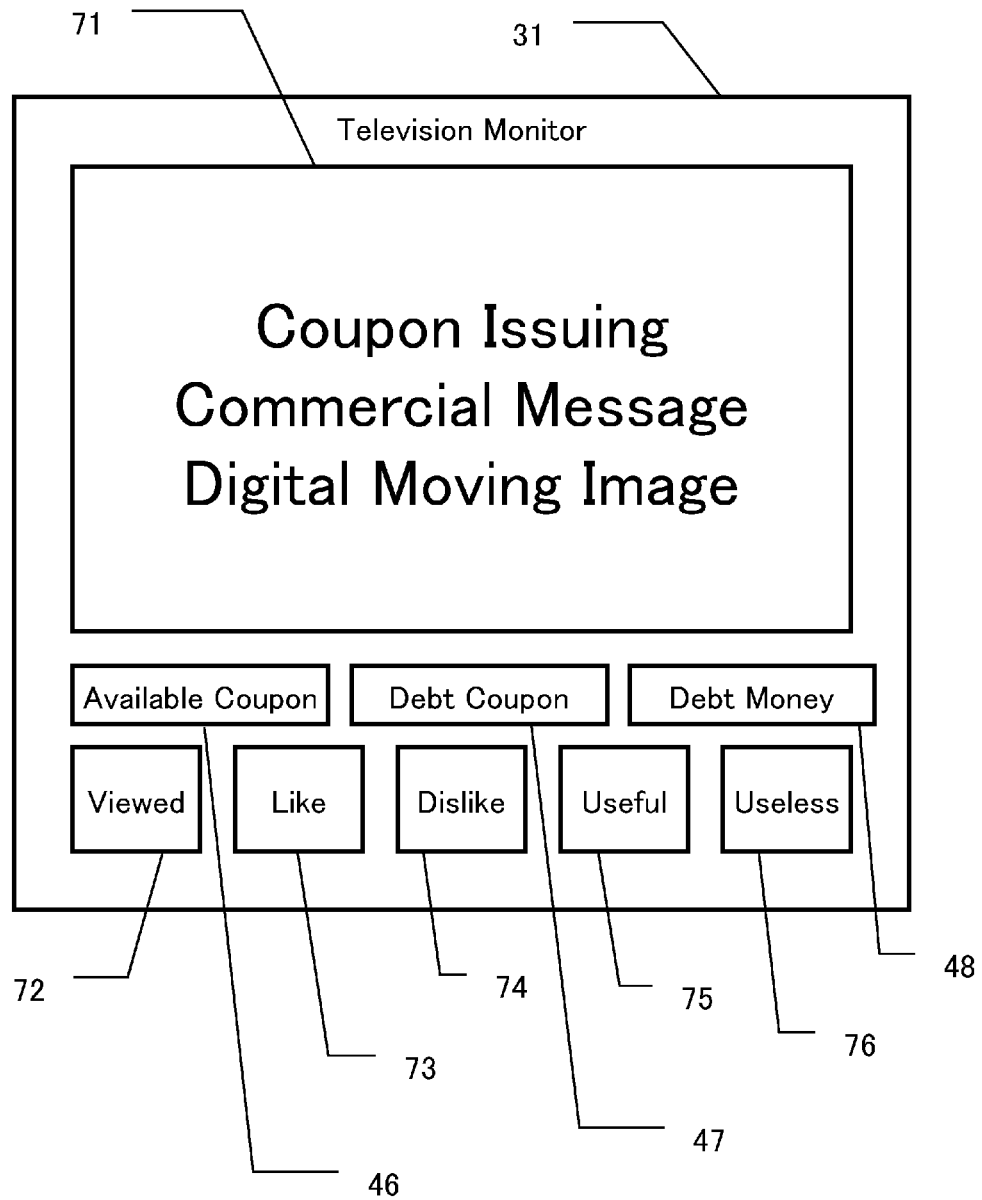
FIG. 8 is another display on television monitor caused by operation of commercial message coupon button in FIG. 5 or by operation of commercial message button to select one among commercial messages in related commercial message window in FIG. 6 or by operation of the remote controller to select one among commercial messages in hit commercial message window in FIG. 7.

FIG. 8 is another display on television monitor 31 caused by operation of commercial message coupon button 42 in FIG. 5 or by operation of commercial message button 59 to select one among commercial messages in related commercial message window 50 in FIG. 6. The display in FIG. 8 is also caused by or by operation of the remote controller to select one among commercial messages in hit commercial message window 62 in FIG. 7. In response to one of the operations above, the digital moving image of coupon issuing commercial message 71 is displayed in television monitor with necessary buttons for getting coupon.

In succession to the end of the commercial message 71, a pattern that can be perceived only by the human eye and brain is repeatedly displayed in random timings. If the user repeatedly operates viewed button 72 in synchronism with the repeating display of the pattern, the coupon is issued. In other words, any coupon will not be issued unless the synchronizing operation of viewed button 72 is correctly detected. This is for preventing such a deceptive coupon getting action that coupon issuing commercial message 71 is caused to be displayed for the soul purpose of getting coupon with no one watching the commercial message, or false signal is generated with no one in front of the television as if viewed button 72 is operated.

During the repetitive operations of viewed button 72, the amount of coupon is doubled if the user returns questionnaire. In other words, if the user operates one of the pair of like button 73 and dislike button 74 or one of the other pair of useful button 75 and useless button 76 prior to the last operation of viewed button 72, the amount of coupon will be doubled. The operation of any of questionnaire buttons 73 to 76 is reported to the advertisement provider to make next commercial message more attractive.

Questionnaire buttons 73 to 76 are displayed on television monitor 31 only when the coupon issuing commercial message 71 is displayed at the first time. In other words, the questionnaire buttons do not appear upon display of the same commercial message 71 at the second or further time for avoiding such confusion that the buttons are meaninglessly displayed with no function of doubling the amount of coupon. The above manner of displaying the questionnaire buttons is controlled by the first user computer 11 in cooperation with advertisement provider computer 14.

Also in the display in FIG. 8, available coupon window 46, credit coupon window 47 and credit money window 48 are always displayed as in FIG. 5 for inducing the user to get the electric coupon by operating questionnaire buttons 73 to 76

If an attractive music accompanies the coupon issuing commercial message 71 displayed in television monitor 31, the name of the music and performer is delivered in the form of code information in addition to the commercial message data. The first user computer 11 responsive to the code information overlaps character image of the name of music and performer on the coupon issuing commercial message 71 in television monitor 31.

In response to the name of music and performer displayed, the user can search other commercial messages in which the music is used or the performer participates by setting the music or the performer as the search condition. Such a search is possible by pointing the name on the television monitor 31 with the GUI function or by inputting the name into search condition window 61 in FIG. 7.

Figure 9:
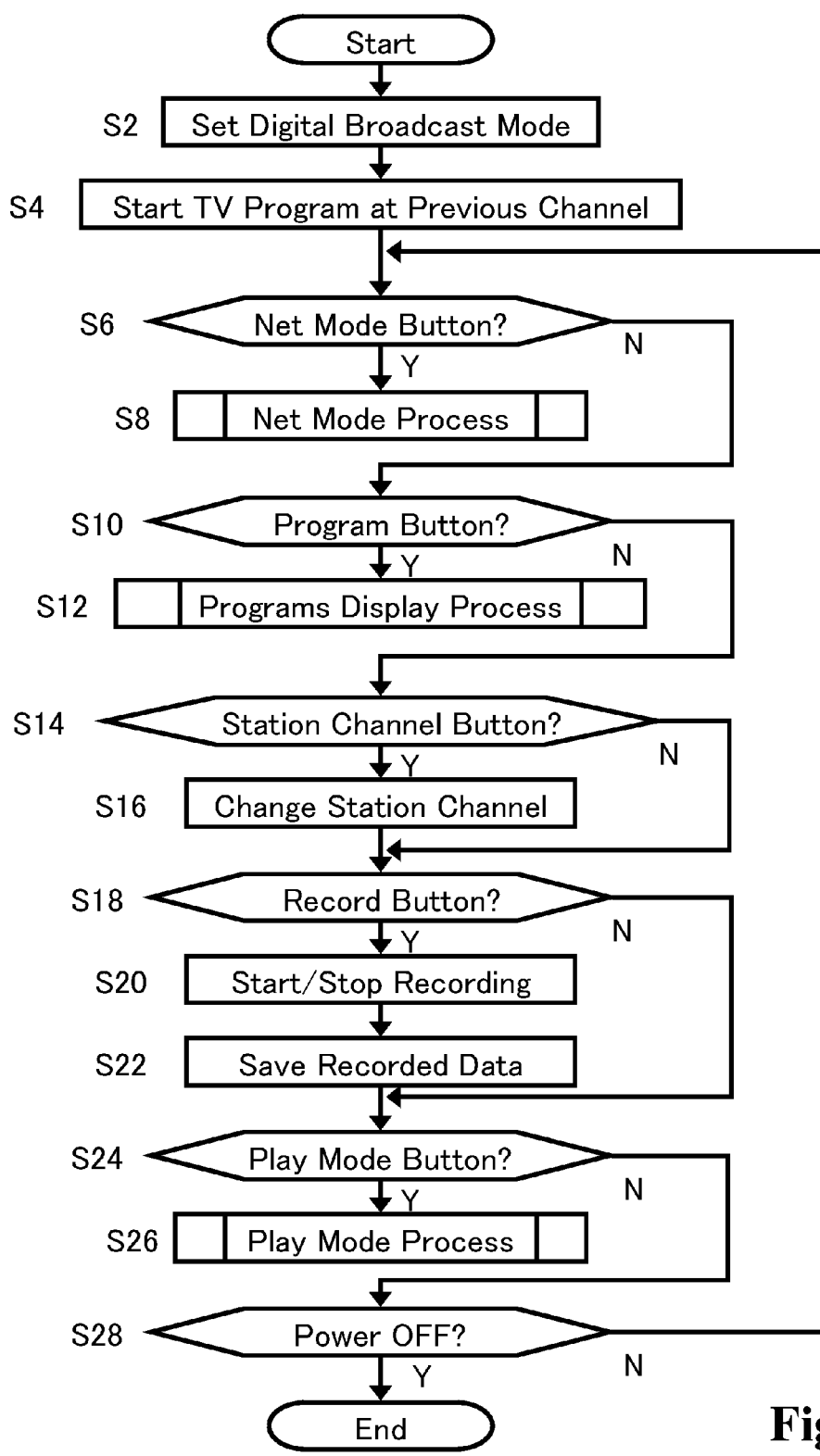
FIG. 9 is a flow chart showing the function of the user computer of the embodiment in FIGS. 1 to 3 according to this invention.

FIG. 9 is a flow chart showing the function of the first user computer 11 of the embodiment in FIGS. 1 to 3 according to this invention. The function in FIG. 9 relates to the start up of the first user computer 11 led by the turning ON thereof. The functions of the first user computer 11 hereinafter explained according to flow charts are common to the second use computer 12 or any other user computers in the user television sets If the power of the first user computer 11 is turned ON, the flow of FIG. 9 starts to go to step S2 in which the first user television set 9 is automatically set to the digital broadcast mode. Next in step S4, the display of television program starts at the previous channel at which the first user television set was turned OFF last time.

Then in step S6, it is checked whether or not net mode button 35 is operated to select net mode. If operated, the flow advances to step S8 to carry out the net mode process, the details of which will be explained later. On the other hand, if it is not determined in step S6 that net mode button 35 is operated, the flow goes to step S10.

In step S10, it is checked whether or not net program button 37 is operated to display the television programs. If operated, the flow advances to step S12 to carry out the programs display process, the details of which will be explained later. On the other hand, if it is not determined in step S10 that program button 37 is operated, the flow goes to step S14.

In step S14, it is checked whether or not net station channel button 36 is operated to select station channel. If operated, the flow advances to step S16 to change the station channel into new one to go to step S18. On the other hand, if it is not determined in step S14 that station channel button 37 is operated, the flow directly goes to step S18.

In step S18, it is checked whether or not record button 33 is operated. If operated, the flow advances to step S20 to start or stop the recording of television program in accordance with the operation of record button 33. The display of the television program is carried in parallel with the recording thereof. Then the recorded data caused in step S20 is saved in step S22, the flow then going to step S24. On the other hand, if it is not determined in step S18 that record button 33 is operated, the flow directly goes to step S24.

In step S18, it is checked whether or not play mode button 34 is operated. If operated, the flow advances to step S26 to carry out the play mode process, the details of which will be explained later. On the other hand, if it is not determined in step S24 that program button 37 is operated, the flow goes to step S28.

In step S28, it is checked whether or not the first user computer 11 is turned OFF. If tuned OFF, the flow goes to the end. On the centrally, if it is not determined in step S28 that the first user computer 11 is turned OFF, the flow returns to step S6 to repeat steps S6 to S28 unless it is determined that the first user computer 11 is turned OFF or an operation of one of the buttons is detected in one of steps S6, S10 and S24

Figure 10:
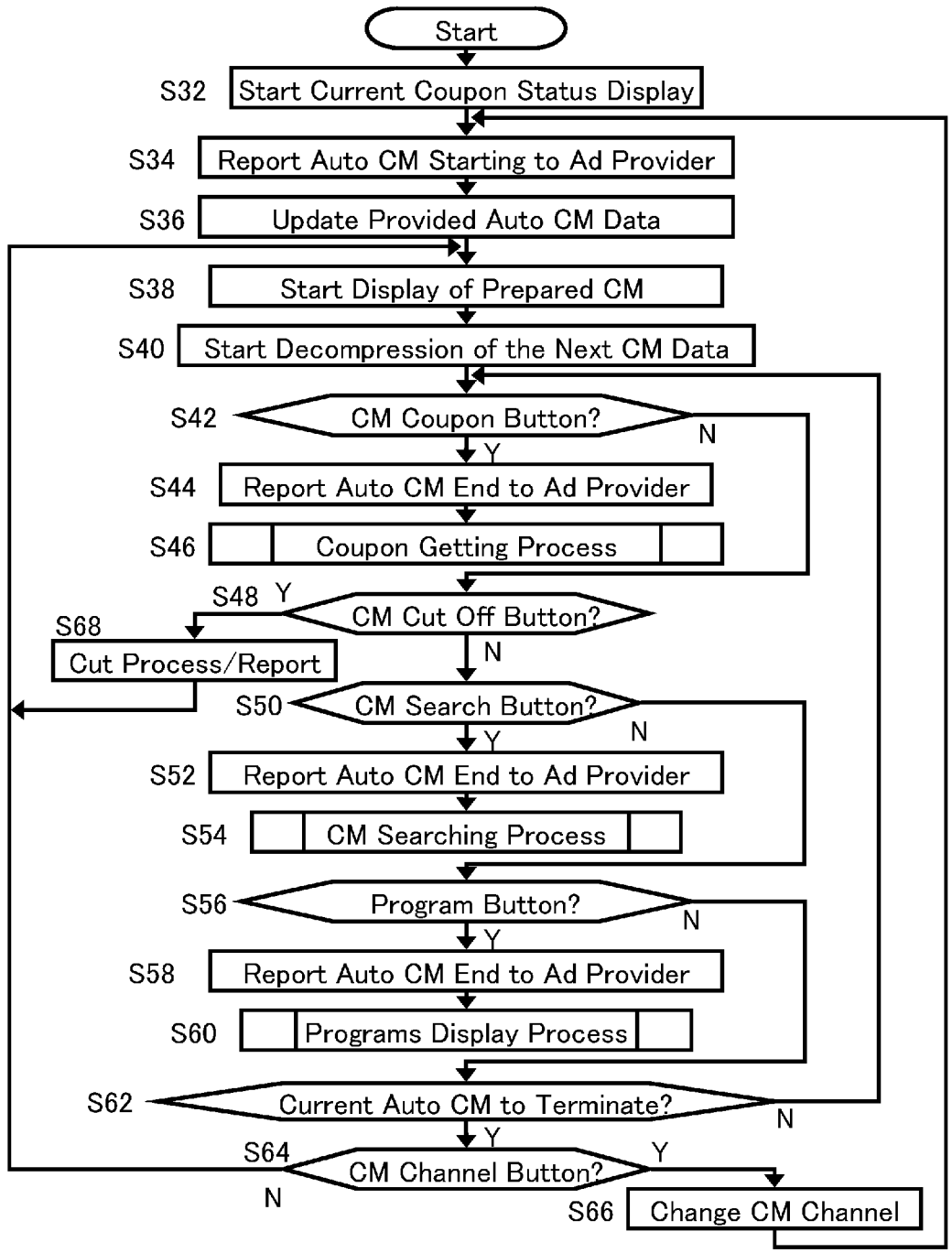
FIG. 10 is a flow chart showing the detail of the net mode process in step S8 of FIG. 9.

FIG. 10 is a flow chart showing the detail of the net mode process in step S8 of FIG. 9. If the flow starts in response to the operation of net mode button 35 in FIG. 4, the display is changed into the condition of FIG. 5 and the current coupon status is started in step S32. In other words, the displays of amounts in available coupon 46, debt coupon window 47 and debt money window 48 in FIG. 5 are started. "Zero" appears in each of the windows if there is no corresponding amount to be displayed.

Such a modification of FIG. 10 is possible that a step is added before step S32 to check whether or not the amount in available coupon window 46 is less than a predetermined limit or to check whether or not the amount in debt coupon window 47 exists. And, step S32 follows only when the answer is "Yes" while step S32 is skipped when the answer is "No". This is because that the purpose of step S32 is to induce the user to get coupon. So, step S32 may be omitted to simplify the display layout if it is determined in the added step above that the amount in available coupon window 46 is not less than a predetermined limit or the amount in debt coupon window 47 does not exists. In other words, such a display manner is rather impressive that the display in step S32 does not appear in normal case but appears only when the amount in available coupon window 46 is less than a predetermined limit or the amount in debt coupon window 47 exists.

Next in step S34, the commencement of displaying digital moving image of automatic commercial message 41 at the first user computer 11 is reported to advertisement provider computer 14 to start the time counting for issuing coupon.

In step S36, the first user computer 11 communicates with advertisement provider computer 14 to update the provided automatic commercial message data. A batch of automatic commercial message data is automatically provided from advertisement provider computer 14 to the first user computer 11 in a periodic manner, the batch of data being kept in the first user computer 11 with the order of displaying each of commercial messages predetermined. However, advertisement provider computer 14 upon the operation of net mode button 35 may have caused some change in automatic commercial message data after the last batch provision. Thus, the updating communication is done in step S36 between the first user computer 11 and advertisement provider computer 14. In other words, the first user computer 11 follows the change made at advertisement provider computer 14 in the order of displaying the already downloaded automatic commercial messages. Further, the first user computer 11 deletes an already downloaded automatic commercial message data if the corresponding automatic commercial message is cancelled at the advertisement provider computer 14. Or, the first user computer 11 downloads a new automatic commercial message data if advertisement provider computer 14 has prepared such new automatic commercial message data.

Next in step S38, the display of the prepared first automatic commercial message is started. To prepare for instant display of automatic commercial message, the first user computer 11 always has decompressed at least one automatic commercial message data in accordance with a predetermined order. A considerable number of automatic commercial message data may have been decompressed for preparation of display in case commercial message cut off button 43 will be frequently operated. In any way, the preparation of at least one decompressed automatic commercial message data makes it possible to instantly start the display of the automatic commercial message in step S38.

According to an agreement with an advertiser, advertisement provider computer 14 can designate a commercial message of the advertiser so as to be displayed first upon the operation of net mode button 35. The advertiser pays extra advertising rate for such a designation since the opportunity for the automatic commercial message to be viewed is remarkably increased by the designation. If the commercial message cut off button 43 is operated for the commercial massage, however, the designation is cancelled in the next time.

Upon the start of displaying one automatic commercial message in step S38, the flow goes to step S40 to start decompression of the next automatic commercial message data in a parallel manner, the flow then going to step S42. The decompression of the next automatic commercial message data started in step S40 is to be completed prior to the end of the automatic commercial message display started in step S38.

In step S42, it is checked whether or not commercial message coupon button 42 is operated. If operated, the flow goes to step S44 in which the end of displaying automatic commercial message is reported from the first user computer 11 to advertisement provider computer 14 to stop the time counting for issuing coupon for automatic commercial message. The meaning of step S44 is the same in the other steps for reporting the end of displaying automatic commercial message from the first user computer 11 to advertisement provider computer 14. And then, the flow goes to step 46 to carry out the coupon getting process, the detail of which will be explained later.

On the other hand, if it is not detected in step S42 that commercial message coupon button 42 is operated, the flow goes to step S48 to check whether or not commercial message cut off button 43 is operated. If it is not detected in step S48 that commercial message cut off button 43 is operated, the flow goes to step S50.

In step S50, it is checked whether or not commercial message search button 44 is operated. If operated, the flow goes to step S52 in which the end of displaying automatic commercial message is reported from the first user computer 11 to advertisement provider computer 14, the flow then going to step S54 to carry out the commercial message searching process, the detail of which will be explained later. On the other hand, if it is not detected in step S50 that commercial message search button 44 is operated, the flow goes to step S56.

In step S56, it is checked whether or not program button 37 is operated. If operated, the flow goes to step S58 in which the end of displaying automatic commercial message is reported from the first user computer 11 to advertisement provider computer 14, the flow then going to step S60 to carry out the programs display process, the detail of which will be explained later. On the other hand, if it is not detected in step S56 that program button 37 is operated, the flow goes to step S62.

In step S62, it is checked whether or not the automatic commercial message currently displayed comes to the end. If it has not come to the end yet, the flow returns to step S42 to repeat steps S42 to S62 unless it is determined in step S62 that the currently displayed automatic commercial message comes to the end or an operation of one of the buttons is detected in one of steps S42, S48, S50 and S56.

If it is determined in step S62 that the currently displayed automatic commercial message comes to the end, the flow goes to step S64 to check whether or not commercial message channel button 45 is operated. If the operation is not detected, the flow returns to step S38. Thus, display of the next prepared automatic commercial message starts in step S38. Steps S38 to S64 are repeated in this manner to successively display the automatic commercial messages one by one unless an operation of one of the buttons is detected in one of steps S42, S48, S50, S56 and S64

If it is determined in step S64 that commercial message channel button 45 is operated, the flow goes to step S66 to change the commercial message channel for another advertisement provider computer such as the second advertisement provider computer 21 in FIG. 3. In addition in step 66, the end of displaying automatic commercial message is reported from the first user computer 11 to advertisement provider computer 14 to stop the time counting for issuing coupon for automatic commercial message as in S44

And then, the flow returns to step S34 to carry out the succeeding steps in cooperation with the second advertisement provider computer 21 this time. Since the functions of the first user computer 11 carried out with the second advertisement provider computer 21 is just the same as that with the first advertisement provider computer 14, duplicate explanation is omitted. Thus, every time when the operation of CM channel button 45 is detected in step S64, the functions led from step S34 is repeated with the new advertisement provider computer.

If it is determined in step S48 that commercial message cut off button 43 is operated, the flow goes to step S68 to cut off the currently displayed automatic commercial message and the fact of the operation is reported to the advertisement provider computer such as the first advertisement provider 11 which provided the automatic commercial message unfortunately cut off. The record of the cut off operation for the automatic commercial message is also kept in the first user computer 11. And then, the flow returns to step S38 in which display of the next prepared automatic commercial message starts.

In response to the operation detected in step S68 of commercial message cut off button 43, the first user computer 11 and advertisement provider computer 14 both lower the priority of the cut off commercial message personally and statistically, respectively. And, if commercial message cut off button 43 is operated over a predetermined times at the first user computer 11 for the same automatic commercial message, the automatic commercial message is inhibited from being displayed by the first user computer 11.

In the above mentioned net mode function in FIG. 10, the automatic commercial message data provided from and controlled by advertisement provider computers in a periodic batch and through step S36 include a commercial message advertising the television program provided by a television stations. Such commercial message of the television program is a digital moving image a trailer or a preview or a digest of the television program. In other words, a television station can be not only a provider of the television programs consuming the electric coupon but also an advertiser generating the electric coupon.

Thus, the inclusion of the commercial message provided by the television stations in the automatic commercial messages activates the moving image enjoying system in that it induces the users to view both an attractive television program itself and other commercial messages for the purpose of getting coupon necessary to view the attractive television program for free. Further, the user who gets interested in a trailer or a preview or digest of television program through the repetition of the net mode function in FIG. 10 may operate program button 37 in step S56 to efficiently search and find commercial messages to get coupon for viewing the television program.

Further, such a modification is possible that a step is inserted after step S44 to check whether the automatic commercial message selected by commercial message coupon button 42 in step S42 is of the television program or of other products or service. And, if it is detected in such an additional step that the selected commercial message is of a television program, the flow is modified to go to step S58 in place of step S46. According to such a modification of the flowchart in FIG. 10, an operation of commercial message coupon button 42 with a commercial message for a television program displayed will shortcut to the television program process.

Another modification of the flowchart of FIG. 10 is possible in such a way that the flow goes from the additional step to step 88 in FIG. 11 explained later if it is detected in the additional step that the selected commercial message is of a television program. According to such a modification of FIG. 10, an operation of commercial message coupon button 42 with a commercial message for a television program displayed will shortcut to an automatic download of the television program.

Figure 11:
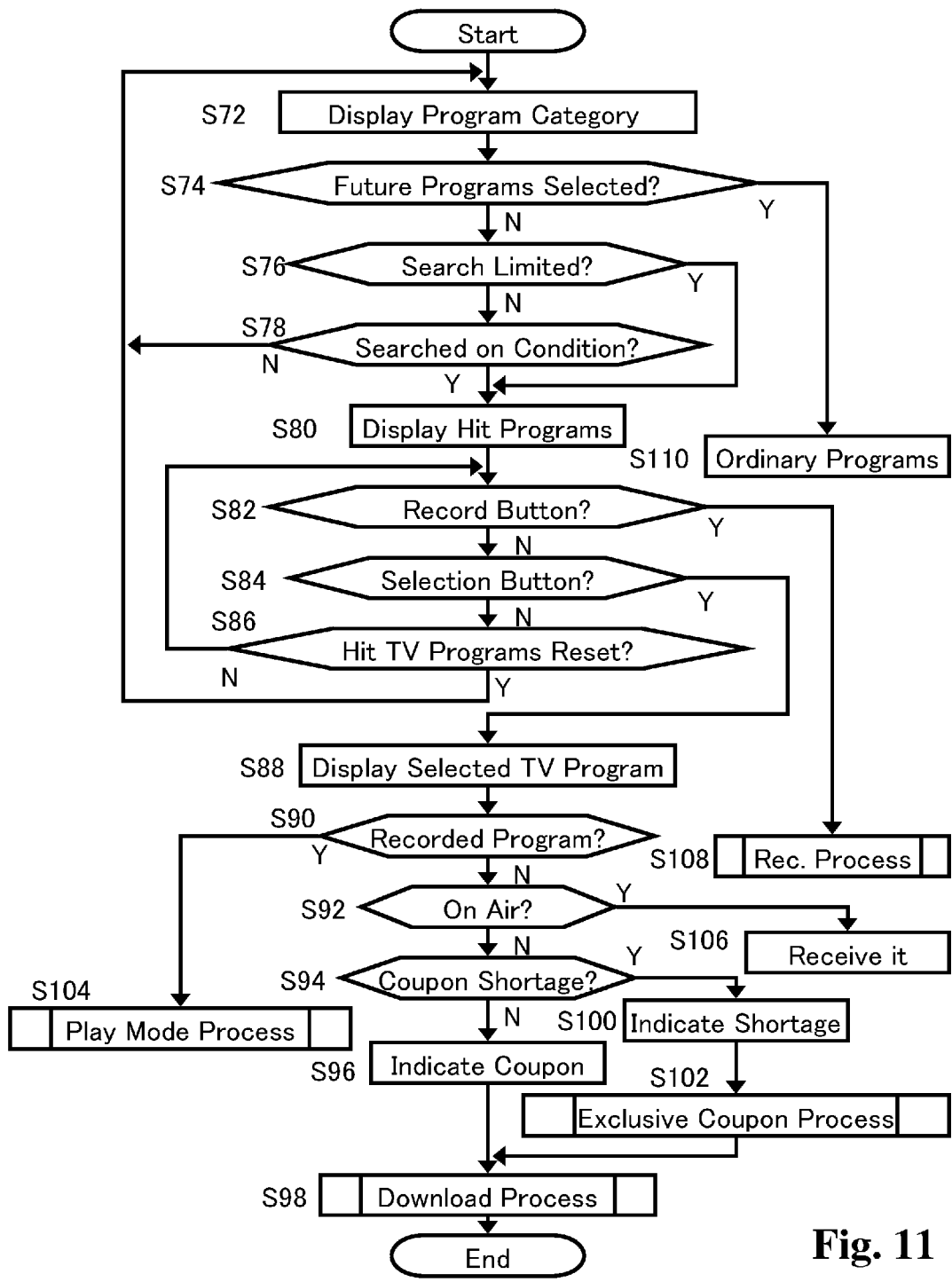
FIG. 11 is a flow chart showing the detail of the programs display process in step S12 of FIG. 9 and step S60 of FIG. 10.

FIG. 11 is a flow chart showing the detail of the programs display process in step S12 of FIG. 9 and step S60 of FIG. 10. If the flow starts, in step S72, a major division of the television programs such as categories is displayed at television program window 51. Next in step S74, it is checked whether or not present and future switching button 54 is operated to select a list of programs scheduled in the future. If no such operation detected, the flow goes to step S76.

In step S76, it is checked whether or not one of the categories is selectable by selection button 53 for limiting the search into the fine sort to finally display a list of hit television programs in television program window 51. If such an operation is not detected, the flow goes to step S78 to check whether or not search condition is input at search condition window 52 to conduct search for finally displaying a list of the hit television programs in television program window 51. If it is detected in step S78 that the search on condition is conducted, the flow goes to step S80 to display a list of the hit television programs in television program window 51. If it is detected in step S76 that the search is limited, the flow also goes to step S80 to display a list of the hit television programs in television program window 51.

The list of the hit television programs displayed in television program window 51 includes various types television programs. In other words television program window 51 includes the television program now on air, the television program data which can be now downloaded through Internet, recorded broadcast television programs not viewed yet and stored television program data which has been download but not viewed yet. Each type of the television program is distinguishable from the other types in the television program window 51.

If it is not detected in step S78 that the search on condition is conducted, the flow returns to step S72 to repeat steps S72 to S78 for continuing the program category display unless an operation is detected in one of steps S74 to S78.

The steps S72 to S80 are carried out with relating data updated through suitable communication with all of television stations to get the newest information of television programs.

In step S78, it may be possible to input a specific advertised product name at window 52 as the search condition. And, a plurality of television programs may be hit and displayed in television program window 51 in step S80 if the advertised product designates such a plurality of television programs to which the coupon of exclusive type is valid. Thus, the user can know whether or not coupon of exclusive type gotten with respect to a television program is also valid for another television program.

For such a purpose, in place of inputting a specific advertised product name at search condition window 52 in FIG. 6, it is possible to select one of the indexes of commercial messages displayed in related commercial message window 50. By this, a plurality of television programs relating to the selected index of commercial message can be displayed in television program window 51

Next in step S82, it is checked whether or not record button 60 is operated to select a television program. If no such an operation detected, the flow goes to step S84 to check whether or not selection button 53 is operated to select a television program.

If it is not detected in step S84 that selection button 53 is operated, the flow goes to step S86 to check whether or not the display of hit television programs in window 51 is reset by operating the remote controller. If such a reset operation is not detected in step S84, the flow returns to step S82 to repeat steps S82 to S86 to wait for a selection among the hit television programs unless any operation is detected in one of steps S82 to S86.

If it is detected in step S86 that the display of hit television programs in window 51 is reset by operating the remote controller, the flow returns to step S72 to replace the display of the hit television programs by that of the major division of the television programs. Thus, steps S72 to S86 are repeated unless any operation is detected in one of steps S74, S82 and S84.

If it is detected in step S84 that selection button 53 is operated to select a television program, the flow goes to step S88 to display the selected television program, the flow then advancing to step S90. In step S90, it is checked whether or not the selected television program is a recorded one. The recorded television program means not only the recorded broadcast television program unviewed but also the downloaded television program data unviewed. If it is not determined tin step S90 that a recorded television program is selected, the flow goes to step S92 to check whether or not the selected television program is a broadcast television program on air.

If the selected television program is not determined to be a recorded one in step S90 nor a television program on air in step S92, the selected television program is a television program data available for download through Internet. The flow accordingly goes to step S94 to check to be safe that there is no coupon shortage in downloading the selected television program data by means of comparing the available coupon of the user and the required coupon by the television station. If it is confirmed in step S94 that there in no coupon shortage, the flow goes to step S96 to start an indication of the available coupon and the required coupon for reference. Upon the start of the indication, the flow instantly goes to step S98 to carry out the downloading process, the flow then goes to the end. The display of the available coupon and the required coupon is to automatically disappear in a very short period of time in the early stage of the download process. The details of the download process in step S98 will be explained later.

If it is detected in step S94 that there is a coupon shortage in downloading the selected television program data, the flow goes to step S100 to indicate the coupon shortage information in available coupon window 55, required coupon window 56, coupon shortage window 57 and converted money window 58. And then, the flow goes to step S102 to carry out the exclusive coupon process in which a list of commercial message indexes are displayed in related commercial message window 50 for assisting the user to get the exclusive coupon designating the selected television program in case of the coupon shortage. Details of the exclusive coupon process will be explained later.

The exclusive coupon process in step S102 is followed by the download process in step S98 which leads to the end of the flow.

If it is detected in step S90 that the selected television program is a recorded one, the flow goes to step S104 to carry out the play mode process, the details of which will be explained later. On the other hand, if it is detected in step S92 that the selected television program is a broadcast television program on air, the flow goes to step S106 to receive the television program on air.

If it is detected in step S82 that record button 60 is operated to select a television program, the flow goes to step S108 to carry out the recording process, the details of which will be explained later. If it is detected in step S74 that present and future switching button 54 is operated to select a list of programs scheduled in the future, the flow goes to step S110 to display the ordinary television programs. In carrying out such a display, the first user computer 11 functions with relating data updated through suitable communication with all of television stations to get the newest information of television programs. Of course, it is possible to return form the ordinary program displaying state in step S110 to the mainstream of the flow in FIG. 11 if present and future switching button 54 is operated. Such a function is, however, omitted in FIG. 11 for the purpose of simplification of the drawing.

Such a modification of the flow in FIG. 11 is possible that step S80 for displaying the hit programs in a list at once is replaced by anther step for sequentially displaying the digest moving image of the hit programs one by one. Another modification of the flow in FIG. 11 is also possible in which step S80 is replaced by a combination of steps of firstly displaying at least a part of the hit programs in a list at once and secondly displaying the digest moving image of one of the hit programs selected by the remote controller operation among the firstly displayed list.

In the above modifications, selection of the television program in step S82 or step S84 is possible by operating the button during the one digest moving image of the hit program is displayed, in place of selecting one among a plurality of indexes of television program in the list.

Figure 12:
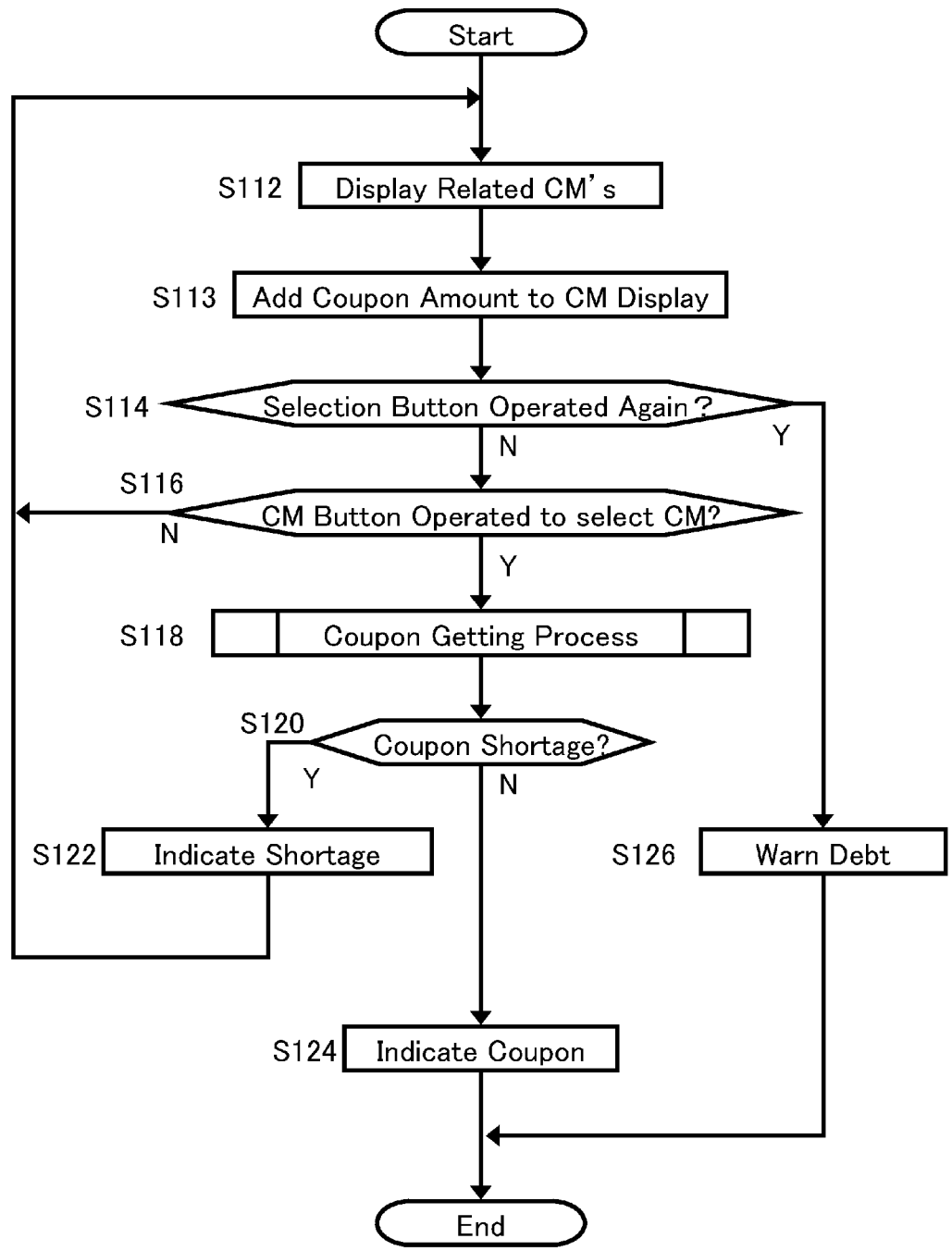
FIG. 12 is a flow chart showing the detail of the exclusive coupon process in step S102 of FIG. 11.

FIG. 12 is a flow chart showing the detail of the exclusive coupon process in step S102 of FIG. 11. If the flow starts, in step s112, a list of indexes of commercial massages with which the exclusive coupon can be gotten is displayed in related commercial message window 50. And, the amount of coupon to be gotten is added to each of the indexes, respectively in step S113. The amount of coupon even for the same commercial massage may differ if the related television program differs in accordance with the agreement between the television station providing the television program and the advertisement provider providing the commercial message. Further, the amount of coupon for the same commercial message is altered in dependence on the change in past popularity of the commercial massage itself or in the number of the other commercial messages getting in or out of a group designating the same television program. Thus, the first user computer 11 updates the display in steps S112 and S113 through communication with all of the television stations and the advertisement providers.

Next in step S114, it is checked whether or not selection button 53 is operated again. If no such operation is detected, the flow goes to step S116 to check whether or not commercial message button 59 is operated to select one commercial message digital moving image among the list of indexes displayed in related commercial message window 50. If no such selection is detected, the flow returns to step S112 to repeat steps S112 to S116 unless an operation is detected in one of steps S114 or S116.

If it is detected in step S116 that commercial message button 59 is operated to select one commercial message digital moving image, the flow goes to step S118 to carry out the coupon getting process. With the result of the coupon getting process, the flow advances to step S120 to check whether or not the coupon shortage is resolved by the coupon getting process. If it is determined in step S120 that there still is coupon shortage, the flow goes to step S122 in which the display in FIG. 6 comes back to indicate the coupon shortage information in available coupon window 55, required coupon window 56, coupon shortage window 57 and converted money window 58. By way of such a function above in step S122, the flow returns to step S112. In this case, the index of commercial message previously selected and confirmed to be viewed is excluded from the list displayed in related commercial message window 50 in step 112.

Thus, the steps S112 to S122 are repeated unless the coupon shortage is resolved or the operation is detected in step S114. Thus, the coupon getting process 118 is carried out every time when a new commercial message is selected.

If it is detected in step S120 that the coupon shortage has been resolved, the flow goes to step S124 to indicate the available coupon window 55 for reference, which is to automatically disappear in a very short period of time, the flow then going to the end If it is detected ext in step S114 that selection button 53 is operated again, the flow goes to step S126 to make an indication for warning that a debt is to be caused if the selected television program data is downloaded. Thus, it is possible to carry out the download of the selected television program data with the shortage of coupon unresolved. However, this may result in a payment of money through charging to the account of the user in accordance with the coupon settlement process explained later. Step S126 is the warning of such a possibility in advance.

Figure 13:
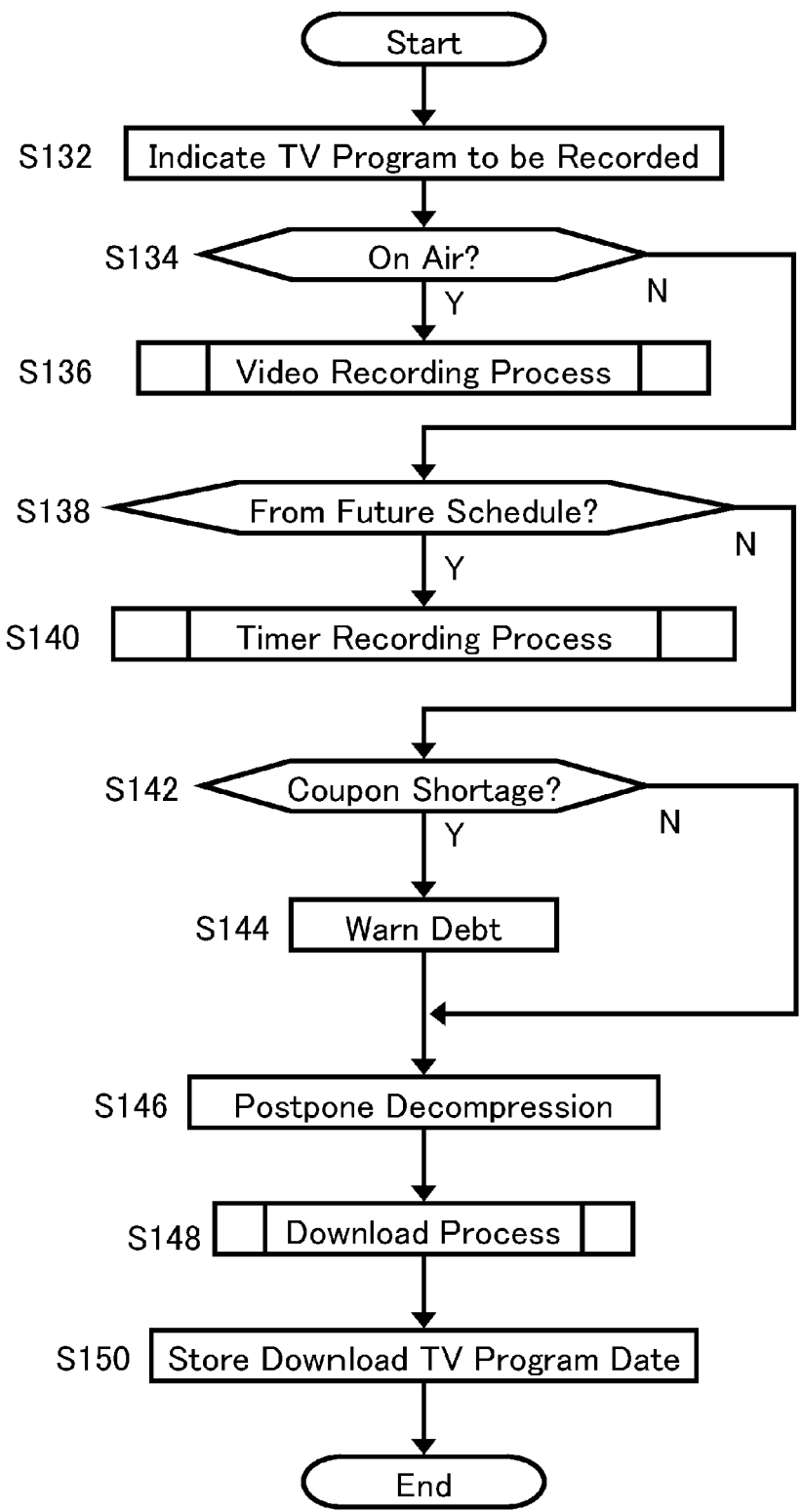
FIG. 13 is a flow chart showing the detail of the recording process in step S108 of FIG. 11.

FIG. 13 is a flow chart showing the detail of the recording process in step S108 of FIG. 11. If the flow starts, the selected television program to be recorded is indicated in step S132. Next in step S134, it is checked whether or not the television program is now on air. If the television program is on air, the flow goes to step S136 to carry out the ordinary video recording process.

On the other hand, if it is not detected in step S134 that the selected television program is on air, the flow goes to step S138 to check whether or not the selected television program is from programs scheduled in the future. If the selected television program is from the future schedule, the flow goes to step S140 to carry out the conventional timer recording process. In the timer recording process, the selected television program is to be recorded during the on air time to be stored in the first user computer 11.

If the selected television program does not fall under any of the categories checked in step S134 and S138, the selected television program is data available for download through Internet. So, the flow goes to step S142 to check to be safe that there is no coupon shortage in downloading the selected television program data by means of comparing the available coupon of the user and the required coupon by the television station. If there is any shortage, the flow goes to step S144 to make an indication for warning of the shortage, the flow then going to step S146. If there is no coupon shortage, the flow directly goes form step S142 to step S146. If the "recording" corresponds to a mere download of the television program data, it is uncertain whether or not the downloaded data is to be actually viewed. So, the coupon is not deemed to be used at the stage of a mere download, but is deemed to be used at the stage of actual viewing of the downloaded television program. In this reason, the flow automatically advances to step S146 even in a case of coupon shortage although a warning is made for reference in step S144.

In step S146, a measure is taken to postpone the automatic decompression in the succeeding download process in step S148. Thus downloaded television program data through step S148 is stored in the first user computer 11 in step 150, the flow then going to the end. The television program data with the decompression postponing measure taken can be recognized due to the measure as the "recorded" program in television program window 51 as well as at the check in step 90 in FIG. 11.

The decompression postponing measure in step S146 also relates to the coupon settlement process explained later. In other words, the downloaded television program data with the decompression postponing measure taken cannot be viewed unless an operation to playback is purposely made, which means that the settlement of coupon is postponed unless the operation is made. Thus, the settlement of coupon and the decompression of the television program data correspond one-to-one with each other. Accordingly in the moving image enjoying system of this invention, there is no concern about unexpected coupon settlement prior to viewing the downloaded television program as well as the viewing of the downloaded television program is impossible unless the coupon settlement is to be done.

Figure 14:
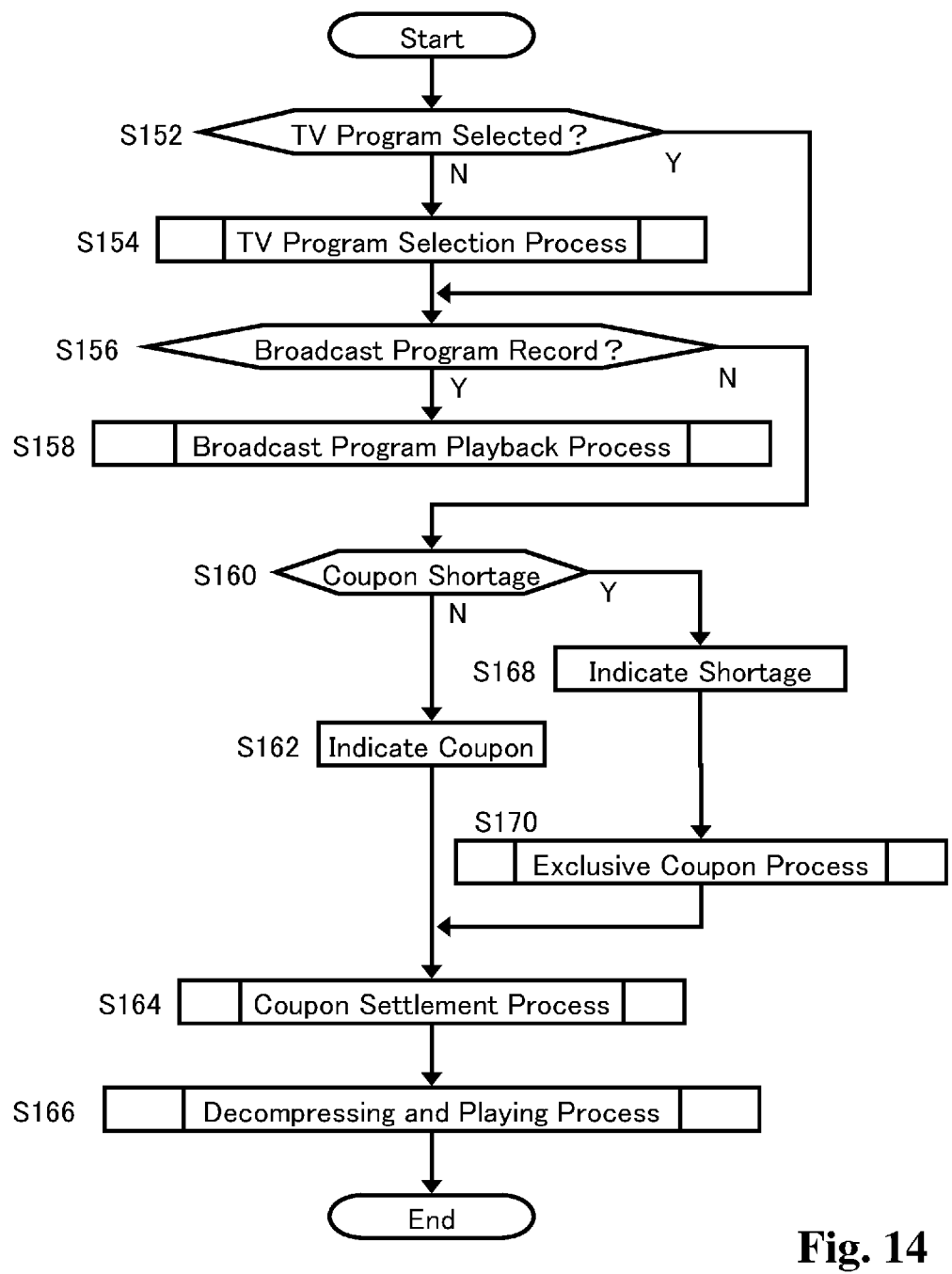
FIG. 14 is a flow chart showing the detail of the play mode process in step S26 of FIG. 9 and step S104 of FIG. 11.

FIG. 14 is a flow chart showing the detail of the play mode process in step S26 of FIG. 9 and step S104 of FIG. 11. If the flow starts, it is checked in step S152 whether or not a television program is selected for playback. In the case of step S26 of FIG. 9, the flow goes from step S152 to step S156 by way of step S154 to carry out there the television program selection process since any television program has not been selected at the initial stage of the flow in FIG. 9. In the television program selection process in step S154 corresponds to the step of displaying the recorded television programs in television program window 51 and the step of waiting for the user to select one of them with selection button 53. On the other hand, in the case of step S104 of FIG. 11, the flow directly goes from step S152 to step S156 since the recorded television program has been selected for playback in the flow in FIG. 11.

In step S156, it is checked whether or not selected television program is a record of a broadcast program. If a broad cast program record, the flow goes to step S158 to carry out broadcast program playback process. On the other hand, it is determined that the selected television program is not a recorded broadcast program, but a downloaded television program data, the flow goes to step S160.

In step S160, it is checked to be safe that there is no coupon shortage in decompressing the selected television program data by means of comparing the available coupon of the user and the required coupon by the television station. Though the download of the "recorded" television program data has been completed, the decompression of the data is postponed without coupon settlement. Thus the check in step S160, which is similar to the check in step S94 of FIG. 11, is necessary.

If it is confirmed in step S160 that there in no coupon shortage, the flow goes to step S162 to start an indication of the available coupon window 55 and the required coupon window 56 for reference. Upon the start of the indication, the flow instantly goes to step S164 to carry out the coupon settlement process. This process is for settling the actual use of coupon in exchange of actual delivery of the television program, the details of which will be explained later. If the coupon settlement process is over, the flow goes to step S166 to carry out the decompressing and playing process for the television program data, the flow then going to the end. The display of the available coupon and the required coupon started in step S162 is to automatically disappear in a very short period of time in the early stage of the succeeding process.

On the other hand, if it is detected in step S160 that there is a coupon shortage in decompressing the selected television program data, the flow goes to step S168 to indicate the coupon shortage information in related windows. In other words, the coupon shortage condition is indicated in available coupon window 55, required coupon window 56, coupon shortage window 57 and converted money window 58. And then, the flow goes to step S170 to carry out the exclusive coupon process, the details of which has been explained in FIG. 12. If the exclusive coupon process is over, the flow goes to step S164 for the coupon settlement process. The functions of steps S164 and S166 by way of step S170 are similar to those by way of step S162 which has been explained.

Figure 15:
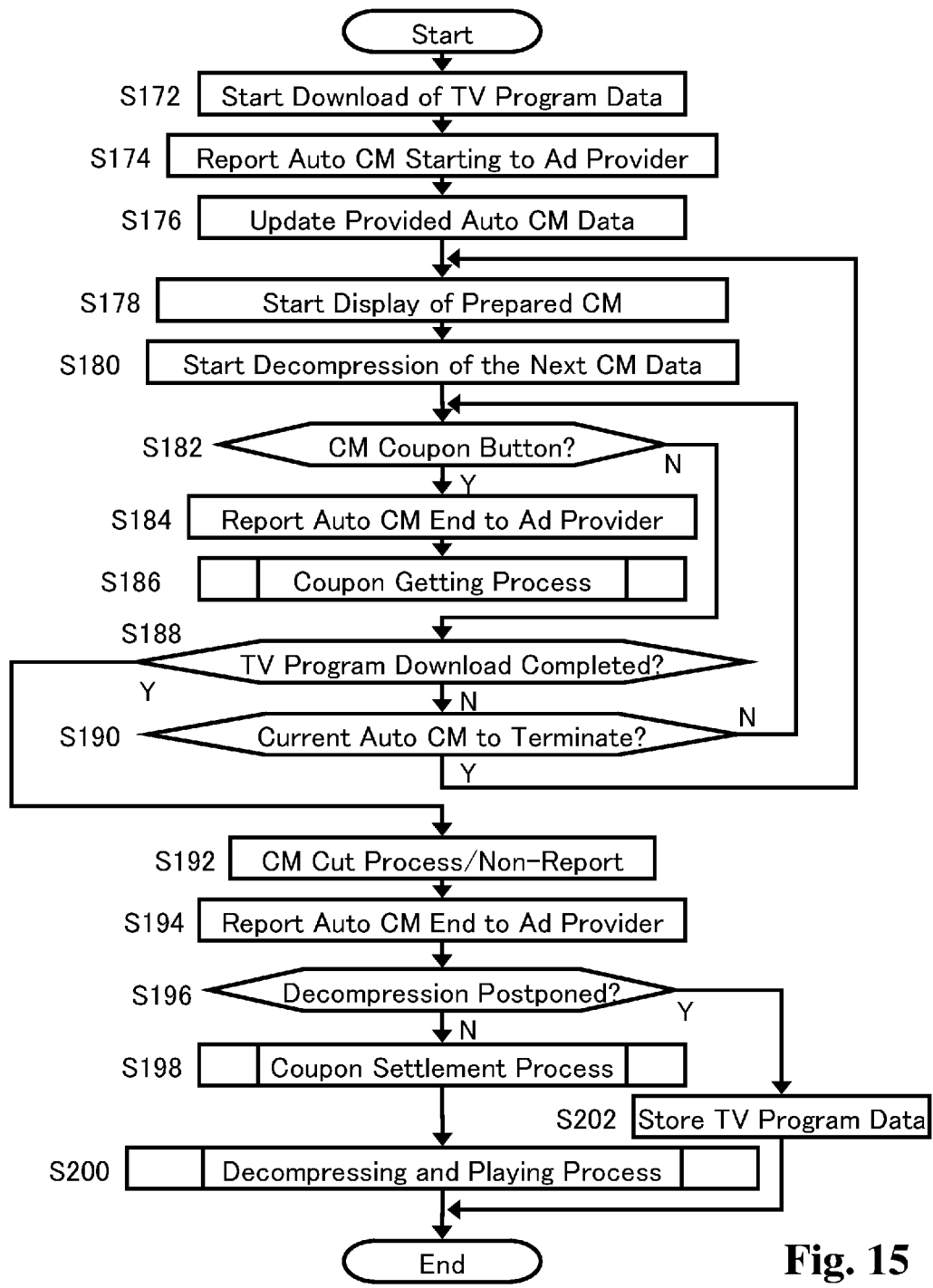
FIG. 15 is a flow chart showing the detail of the download process in step S98 of FIG. 11 and step S148 of FIG. 13.

FIG. 15 is a flow chart showing the detail of the download process in step S98 of FIG. 11 and step S148 of FIG. 13. If the flow starts, in step S172, the download of the television program data from the television station computer is started. The download function is continued in parallel with functions of succeeding steps.

Steps S174 to S194 are for automatic commercial message process with the latency period for download made use of. The functions carried out by the steps are basically similar to those of FIG. 10. In the beginning in step S174, the commencement of displaying digital moving image of automatic commercial message is reported to advertisement provider computer 14 to start the time counting for issuing coupon.

Next in step S176, the first user computer 11 communicates with advertisement provider computer 14 to update the provided automatic commercial message data. And then, in step S178, the display of the prepared first automatic commercial message is started with latency of download made use of. Upon the start of displaying one automatic commercial message in step S178, the flow goes to step S180 to start decompression of the next automatic commercial message data in a parallel manner, the flow then going to step S182.

In step S182, it is checked whether or not commercial message coupon button 42 is operated. If operated, the flow goes to step S184 in which the end of displaying automatic commercial message is reported from the first user computer 11 to advertisement provider computer 14. And then, the flow goes to step 186 to carry out the coupon getting process. Thus, even during the download of the television program data, it is possible to get coupon by operating commercial message coupon button 42.

On the other hand, if it is not detected in step S182 that commercial message coupon button 42 is operated, the flow goes to step S188 to check whether or not the download of the television program data is completed. If not, the flow goes to step S190 to check whether or not the automatic commercial message currently displayed comes to the end. If it has not come to the end yet, the flow returns to step S182 to repeat steps S182 to S190 unless it is determined in step S190 that the currently displayed automatic commercial message comes to the end or an operation of one of the buttons is detected in one of steps S188 and S190.

If it is determined in step S190 that the currently displayed automatic commercial message comes to the end, the flow returns S178. Thus, display of the next prepared automatic commercial message starts in step S178. Steps S178 to S190 are repeated in this manner to successively display the automatic commercial messages one by one unless an operation of the commercial message cut off button is detected in step S182 or it is determined in step 188 that the download of the television program data is completed.

If it is determined in step S188 that the download of the television program data is completed, the flow goes to step 192 to cut off the currently displayed automatic commercial message with the fact of cutting off the commercial message not reported to the advertisement provider computer in this case. In other words, in step S192, the display of commercial message is cut off in instant response to the completion of the download of the television program data, which means a termination of latency period. However, such a cut off of the automatic commercial message is not because the use is not interested in the commercial message. That is the reason why the cut of the automatic commercial message is not reported to the advertisement provider computer nor kept in the first user computer 11. So, the first user computer 11 and advertisement provider computer 14 both do not lower the priority of the commercial message which is cut off by chance in response to the termination of download of the television program.

Next in step 194, the end of displaying automatic commercial message is reported from the first user computer 11 to advertisement provider computer 14 to stop the time counting for issuing coupon for automatic commercial message. And then the flow goes to step S196 to check whether or not the downloaded television program data is with the decompression postponing measure. If not, the flow goes to step S198 to carry out t the coupon settlement process through communication with the television station computer. And then, the flow goes to step S200 to carry out the decompressing and playing process for the television program data, the flow then going to the end.

On the other hand, if it is determined in step S196 that the downloaded television program data is with the decompression postponing measure, the flow goes to step S202 to store the downloaded television program data as it is without decompression. Decompression of such a stored television program data and the accompanying coupon settlement process is postponed until the functions in steps S164 and S16 are carried out in FIG. 14.

Figure 16:
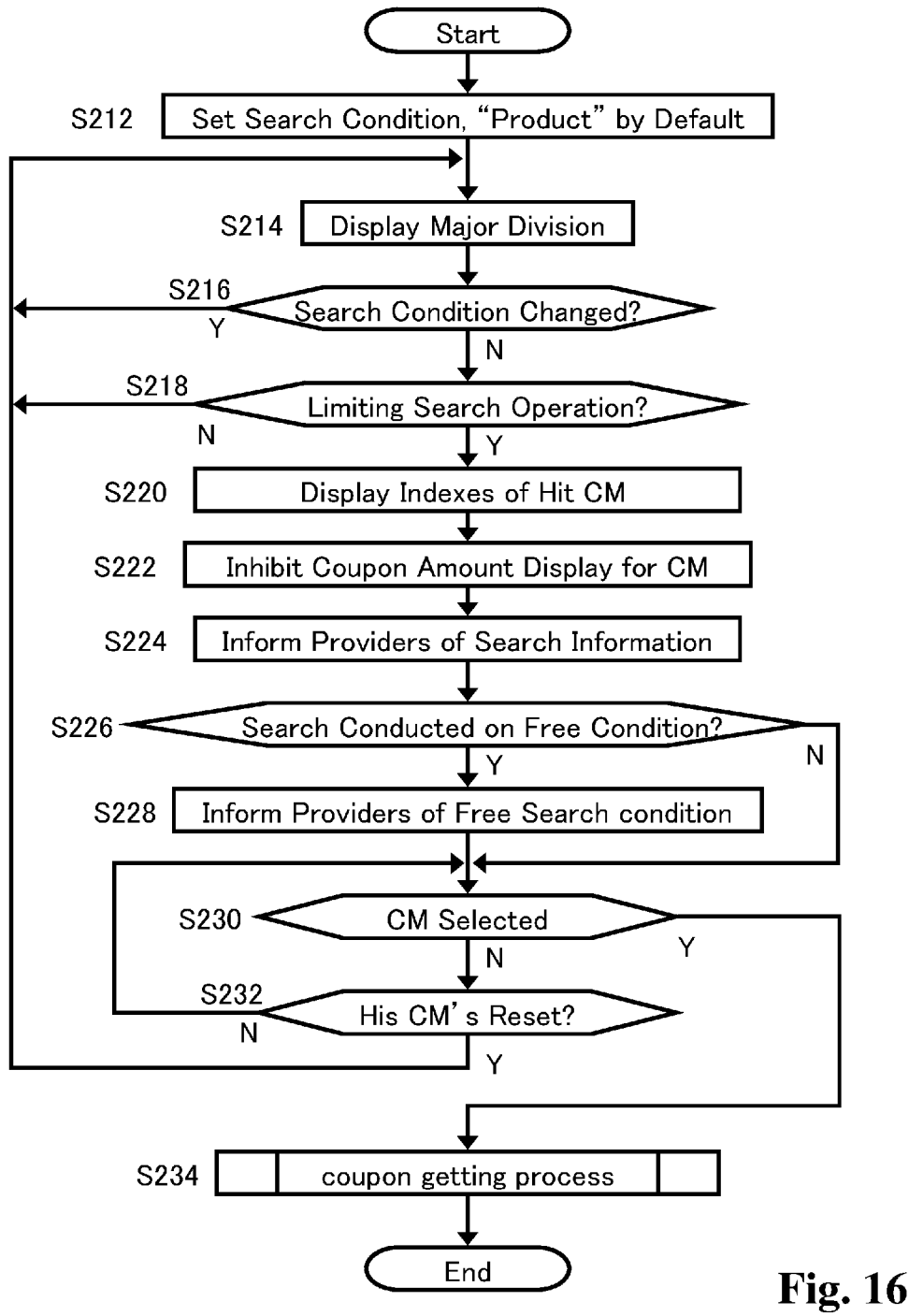
FIG. 16 is a flow chart showing the detail of the commercial message searching process in step S54 of FIG. 10.

FIG. 16 is a flow chart showing the detail of the commercial message searching process in step S54 of FIG. 10. If the flow starts, search condition, "Product" is automatically set by default in step S212. The flow then goes to step S214 to display a major division of the product categories in search condition window 61 in FIG. 7.

Next in step S216, it is checked whether or not an operation is done to change the search condition. In other words, this check corresponds to detect whether one of performer button 64, location button 65, season button 66, related information button 67 and free category button 68 is operated. If no such operation is detected in step 216, the flow goes to step S218 to check whether or not an operation of limiting the search is done. This operation is practiced by the remote controller to select one of categories in the major division to limit the search into the fine sort or to direct search with a search condition input into search condition window 61. In this operation, it is possible to conduct search with a plurality of search conditions combined in AND manner or OR manner.

If an operation to limit the search is detected in step S218, the flow goes to step S220 to display a list of indexed of commercial messages in hit commercial message window 62. And then, the flow goes to step S222 to inhibit the display of the amount of coupon expected to be gotten in exchange of viewing the commercial messages from accompanying the list of indexes in hit commercial message window 62.

The scope of search explained above covers all the commercial message data provided by all the advertisement provider computers joining the moving image enjoying system according to this invention.

Next in step 224, the first computer 11 informs the advertisement provider computers of the conducted search including the searching condition and the results. All the advertisement provider computers joining the moving image enjoying system are basically entitled to receive the information of the conducted search. However, such an advertisement provider computer is not informed of the search information that no commercial message from the advertisement provider is included in the search result. The advertisement provider computers informed of the search information can each improve the production and delivery of commercial messages with the search information taken into consideration so as to adjust the taste of the users. Further, the advertisement computers improve the selection and order of the automatic commercial messages to meet the demands of the users in accordance with the informed search result.

Next in step 226, it is checked whether or not the search is conducted on a free condition. If so the flow advances to step S228 to inform the advertisement provider compute of such free condition. The free search condition includes a free keyword which the user inputs in search condition window 61 or the free searching category set by free category button 68. The free search condition is also a good information for the advertisement provider to reconsider the commercial messages.

Next in step S230, it is checked whether or not the one among the commercial message indexes in the hit commercial message window 62 is selected by the remote controller. If not, the flow goes to step S232 whether or not the commercial message indexes displayed in the hit commercial message window 62 is reset by the remote controller. If not, the flow returns to step S230 to repeat steps S230 and S232 unless the selection or reset of the hit commercial message window 62 is done.

On the other hand, if it is detected in step S232 that the commercial message indexes in the hit commercial message window 62 is reset by the remote controller, the flow returns to step S214 to display the major division of the product categories excluding the reset division. Thus, the flow repeats steps S214 to S232 unless a commercial message selection is detected in step S230. The repletion of steps such as steps 214 to S232 in general can be resolved by an interruption caused by the remote controller or the like to order another function.

If it is detected in step S230 that one among the commercial message indexes in the hit commercial message window 62 is selected by the remote controller, the flow goes to step S234 to carry out the carry out the coupon getting process, the flow the going to the end.

Figure 17:
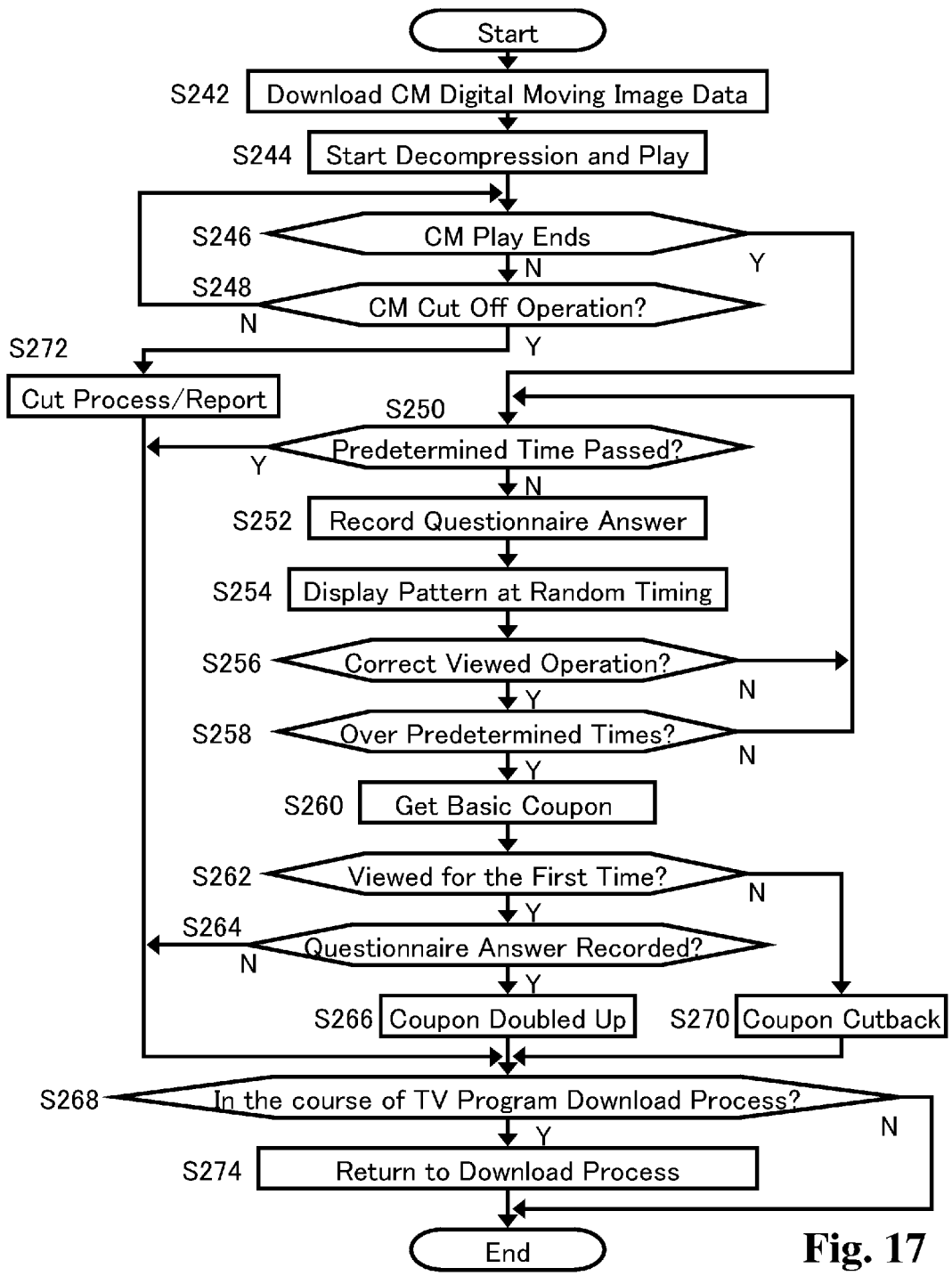
FIG. 17 is a flow chart showing the detail of the coupon getting process in step S46 of FIG. 10, S118 of FIG. 12, S186 of FIG. 15 and S234 of FIG. 16.

FIG. 17 is a flow chart showing the detail of the coupon getting process in step S46 of FIG. 10, S118 of FIG. 12, S186 of FIG. 15 and S234 of FIG. 16. If the flow starts, the selected commercial message digital moving image data is downloaded from the advertisement provider computer in step S242. In contrast to that the automatic commercial message digital image data is downloaded in a batch in advance, the coupon issuing commercial message digital moving image data is downloaded at the time of selection in step S242.

Of course, such a modification is possible that popular coupon issuing commercial message digital moving image data are downloaded from the advertisement provider computer in a periodic batch in advance as in the case of the automatic commercial message data, such popular coupon issuing commercial message data being stored n the first user computer 11. In this modification, a step is added in front of step 242 to check whether or not the selected commercial message data has been downloaded to skip step 242 when it has been downloaded. Thus, even in the modification, step S242 is necessary in case the selected commercial message data has not been downloaded yet as in a case that the commercial message data is relatively new.

Next in step 244, decompression of the commercial message data is started to start playing the same. And then, it is checked in step 246 whether or not the play of the commercial message ends. If not, the flow goes to step S248 to check whether or not an operation is made to cut off the play of the commercial message. If such operation is not detected in step S248, the flow returns to step S246 to repeat steps S246 and S248 unless the commercial message is ended or is cut off.

If it is detected in step 246 that the play of the commercial message ends, the flow goes to step S250 to check whether or not a predetermined time period has passed after the end of the commercial message digital moving image. If the flow comes to step S250 for the first time, the time period has not passed of course. Thus, the flow goes to step S252 to record the answer of questionnaire if any, which corresponds to an operation of one of the pair of like button 73 and dislike button 74 or one of the pair of useful button 75 and useless button 76 in FIG. 8

Next in step S254, a pattern which can be perceived only by the human eye and brain is repeatedly displayed in random timings in television program 31. And then, it is checked in step S256 whether or not the user correctly operates viewed button 72 in synchronism with the appearance of the pattern. If such a correct operation is confirmed in step S256, the flow goes to step 258 to check whether or not the number of repetitions of such correct operation is over a predetermined times, e.g., three times. If the flow comes to step S258 for the first time, the repetition number is less than the predetermined times of course. So, the flow returns to S250. If a correct operation of viewed button in synchronism with the appearance of the pattern is not confirmed in step S256, the flow also returns to step 258

Thus, the steps S250 to S258 are repeated unless it is detected that the predetermined time has passed in step 250 or that the number of repetitions of the correct operation is over a predetermined times in step 258

The chance of operating one of the pair of like button 73 and dislike button 74 or one of the pair of useful button 75 and useless button 76 in FIG. 8 is given in every repetition of steps S250 to S258. Thus, the operation of those buttons can be done at any time unless it is detected that the predetermined time has passed in step 250 or that the number of repetitions of the correct operation is over a predetermined times in step 258.

If it is determined in step S258 that the repetition number of the correct viewed operation is over the predetermined times, the flow goes to step S260 to get the basic amount of coupon for the viewed commercial message. The basic amount of coupon is gotten in step S250 even if no questionnaire answer has been recorded in step S252 as long as it is determined in step S258 that the repetition number is over the predetermined times.

Next in step S262, it is checked whether or not the commercial message is viewed for the first time. If for the first time, the flow goes to step S264 to check whether or not questionnaire answer has been recorded in step S252. If recorded, the flow goes to step S266 in which the amount of coupon gotten in step 260 is doubled up, the flow then going to step S268. On the other hand, if it is not determined that any questionnaire answer has been recorded in step S252, the flow directly goes to step S268 without changing the gotten basic amount of coupon.

If it is determined in step S262 that the commercial message is viewed not for the second time or more, the flow goes to step S270 to cutback the basic amount of coupon gotten in step 260 to the minimum limit, the flow then goes to step S268. In this case, step S264 is skipped because any questionnaire answering button such as like button 73, dislike button 74, useful button 75 and useless button 76 is not displayed in FIG. 8, which results in no possibility that any questionnaire answer has been recorded.

If it is determined in step S250 that a predetermined time period has passed without confirmation of the repetition of correct viewing operations over a predetermined times, the flow instantly goes to step S268. Accordingly, no coupon is gotten in this case.

If it is detected in step S248 that an operation is made to cut off the play of the commercial message, the flow goes to step S272 to cut off the currently displayed automatic commercial message. Also in step S272, the fact of the cut off operation is reported to the advertisement provider computer as is step S68 is FIG. 10, the flow then going to step S268. Accordingly, no coupon is gotten also in this case.

In step S268, it is checked whether or not the flow is in the course of the television program download process. In other words, it is checked whether or not the flow of FIG. 17 is carried out as the detailed function of step S186 in FIG. 15. If so, the flow goes go the end by way of step S274 in which the flow returns to the download process. On the other hand, if it is not determined that the flow is in the course of the television program download process, the flow directly goes to the end.

At the end of the coupon getting process in FIG. 17, the flow generally returns to the former flow which caused the flow of FIG. 17. For example, if the flow of FIG. 17 is carried out as the detailed function of step S46 in FIG. 10, the flow returns to the start of the flow in FIG. 10. Similarly, if the flow of FIG. 17 is carried out as the detailed function of step S234 in FIG. 16, the flow returns to the start of the flow in FIG. 10. In any case, after returning the former flow, the coupon getting process in FIG. 17 can be carried out again at any time when new coupon is necessary.

If it is detected in step S264 that an affirmative questionnaire answer such as the operation of like button 73 or useful button 75 has been recorded in step S252, it is possible to further introduce related commercial message digital moving images to the user, who seems to get interested in the former commercial message on which the button has been operated.

In other words, if it is detected in step S264 that the operation of like button 73 or useful button 75 has been recorded in step S252, the flow is modified to jump from step S266 to step S220 in FIG. 16 to display indexes of the related commercial message digital moving images. For example, if the operation of like button 73 or useful button 75 has been operated on a commercial message of a car, commercial messages of similar grade cars by other manufacturers can be automatically searched to display the indexes of such commercial messages in step S220. Or, if the operation of like button 73 or useful button 75 has been operated on a commercial message on which a popular performer appears, other commercial messages on which the same performer appears can be automatically searched to display the indexes of such commercial messages in step S220.

Thus, a linkage of commercial massages can be introduced one after another to the user following its taste. This is possible not only by the above modification, but such a modification is also possible for the above purpose that related commercial messages have been automatically searched and ranked on the basis of a commercial message on which like button 73 or useful button 75 has been operated. According to this modification, the coupon getting process in FIG. 17 is repeated one by one automatically as to the related commercial messages in the order of the rank. Thus, the related commercial messages are automatically displayed one by one, on which coupon can be gotten fore each commercial messages.

As a further modification, steps S254 to S262, and S270 can be omitted with step S266 replace by a step to get basic coupon. According to this modification, the coupon can be gotten only when the user answer the questionnaire within a predetermined time.

In the flowchart in FIG. 17 and all of its modifications above, some measures are taken for confirming that the user has really viewed the commercial message in exchange of issuing the coupon. In other words, the step of requiring an answer to questionnaire is for confirming that the user actually views the commercial message as well as for gathering information of the taste of the user.

Figure 18:
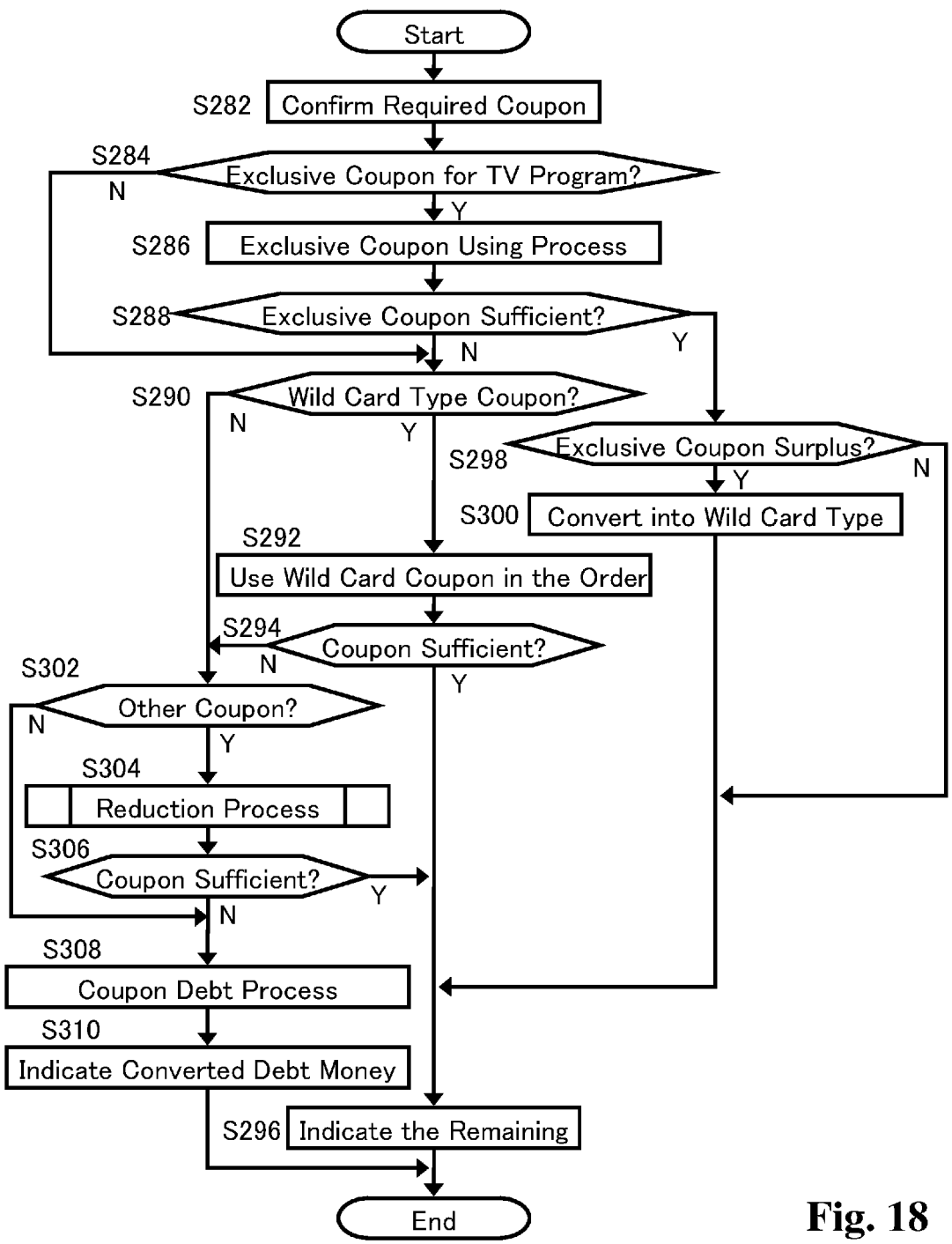
FIG. 18 is a flow chart showing the detail of the coupon settlement process in step S164 of FIG. 14 and S198 of FIG. 15.

FIG. 18 is a flow chart showing the detail of the coupon settlement process in step S164 of FIG. 14 and S198 of FIG. 15. If the flow starts, the amount of the required coupon for the television program is confirmed in step S282. Further, in step S284, it is checked whether or not the available coupon of the user includes exclusive type electric coupon designating the television program.

If it is determined in step S284 that the available coupon includes exclusive type, the flow goes to step S286 to carry out the exclusive type coupon using process. In that process, all exclusive coupons valid for the television program are gathered since not a single exclusive coupon but a plurality of exclusive coupons in total can approach the required coupon amount for the television program. However, such a special exclusive coupon in single can approach the required coupon amount that the user has actually bought a product which has been advertised through the commercial message on which the special exclusive coupon was gotten but has not been settled yet. In that case, a password has been issued to the customer who has bought the product. And, if the password is input during the exclusive coupon using process in combination with the special coupon, the amount of the special coupon is trebled for example. Thus, in such a special case, a single exclusive coupon may approach the required coupon amount for the television program.

Next in step S288, it is checked whether or not the total amount of gathered exclusive type electric coupons is sufficient in comparison with the required amount of the coupon. If insufficient, the flow goes to step S290 to check whether or not the available coupon of the user includes wild card type electric coupon for compensating for the shortage. If it is determined in step S284 that the available coupon includes no exclusive type, the flow instantly goes to step S290 since the shortage is obvious.

If it is determined in step S290 that the available coupon of the user includes wild card type electric coupon, the flow goes to step 292 to carry out the wild card type coupon in the order of the date on which it was gotten. This is because of avoiding any irrational settlement of coupons in the case that the moving image enjoying system includes a plurality of advertisement providers as in FIG. 3, i.e., any irrationality between the first station computer 3 to the first advertisement provider computer 14 coupon settlement and the first station computer 3 to the second advertisement provider computer 21 coupon settlement.

For example, provided that the first advertisement provider computer 14 issued a coupon with an older date to the first user computer 11 and the second advertisement provider computer 21 issued a coupon with a newer date to the first user computer 11. In this case, if the first user 11 were to use the newer coupon first for a television program provided by the first station computer 3, the advertising rate allotment to the first station computer 3 would be made first by the second advertisement computer 21 on the use of the newer coupon with the older coupon left unsettled between the first station computer 3 and the first advertisement provider computer 14, which means that the advertising rate from the advertiser would piled up at the first advertisement provider computer 14. Such retardation from the issuance to the usage of the coupon may result in a failure of the moving image enjoying system. The usage of wild card type coupon Step S292 is important to avoid such an irrational settlement of coupons.

Next in step S294, it is checked whether or not the total amount of electric coupons is sufficient in comparison with the required amount of the coupon. If sufficient, the flow goes to step S296 to calculate remaining amount of coupon to indicate it, the flow then going to the end.

On the other hand if it is determined in step S288 that the total amount of gathered exclusive type electric coupons is sufficient in comparison with the required amount of the coupon, the flow goes to step S298 to check whether or not there is any surplus in the exclusive coupon amount. If any, the flow goes to step S300 to convert the exclusive coupon surplus into wild card type electric coupon, the flow the going to step S296.

In the conversion of the coupon from the exclusive type to the wild card type in step S300, the amount is reduced. This is because that the unit amount of the exclusive type electric coupon gotten in step S260 of the coupon getting process in FIG. 17 by viewing one commercial message is generally set higher that that of the wild card type electric coupon gotten in the commercial message searching process in FIG. 16.

The reason of such a setting for unit amount of electric coupon is that the advertisement provider can require higher advertising rate on commercial message related to the television program displayed in FIG. 6 than on a general commercial message which will be displayed only when hit by search as in FIG. 7. In other words, the former has a greater chance than the latter of catching the attention of the user, who is basically interested in the television program.

The higher unit amount setting of the exclusive type electric coupon is also advantageous for the television station in that the economic support of the advertisers with the higher unit amount of exclusive coupon makes it possible for the television station to produce a specialized television program or an ambitious television program that may not be so popular but is of high quality. Thus, the television station can be free from the cookie-cutter programs which have to be produced with audience share always taken into consideration to get more and more advertising rate. Only with the wild card type coupon of less unit amount, on the contrary, the television station would not produce a program that minority of specialized users, which may constitute a considerable industry of high unit cost, strongly want to view.

If it is determined in step S290 that the available coupon of the user does not include wild card type electric coupon or it is determined in step S294 that the total amount of electric coupons is insufficient, the flow goes to step S302 to check whether or not the available coupon of the user includes exclusive type electric coupon designating another television program. If any, the flow goes to step S304 to carry out amount reduction process for trying to divert the exclusive type coupon for another television program.

The reduction process includes a first step of asking consent of the user to divert the exclusive type coupon for another television program. And with the consent, a second step, which is similar to step S300, follows to reduce the amount of the diverted exclusive type coupon into the level of the wild card type coupon, and then the flow going to step S306.

In step S306, it is checked whether or not the total amount of electric coupons with the coupon form the reduction process added is sufficient in comparison with the required amount of the coupon. If sufficient, the flow goes to step S296.

On the other hand, if it is determined in step S306 that the total amount of electric coupons for all the coupon form the reduction process added is still insufficient, the flow goes to step S308 to carry out the coupon debt process. In the case that the user does not consent to divert the exclusive coupon in the first step of the reduction process of step S304, the flow directly goes to step 308 to carry out the coupon debt process.

At the coupon debt process in step S308, the shortage of coupon is counted is a debt and indicated. Next, in step S310, the debt coupon in converted into debt money and indicated, the flow then going to the end.

Figure 19:
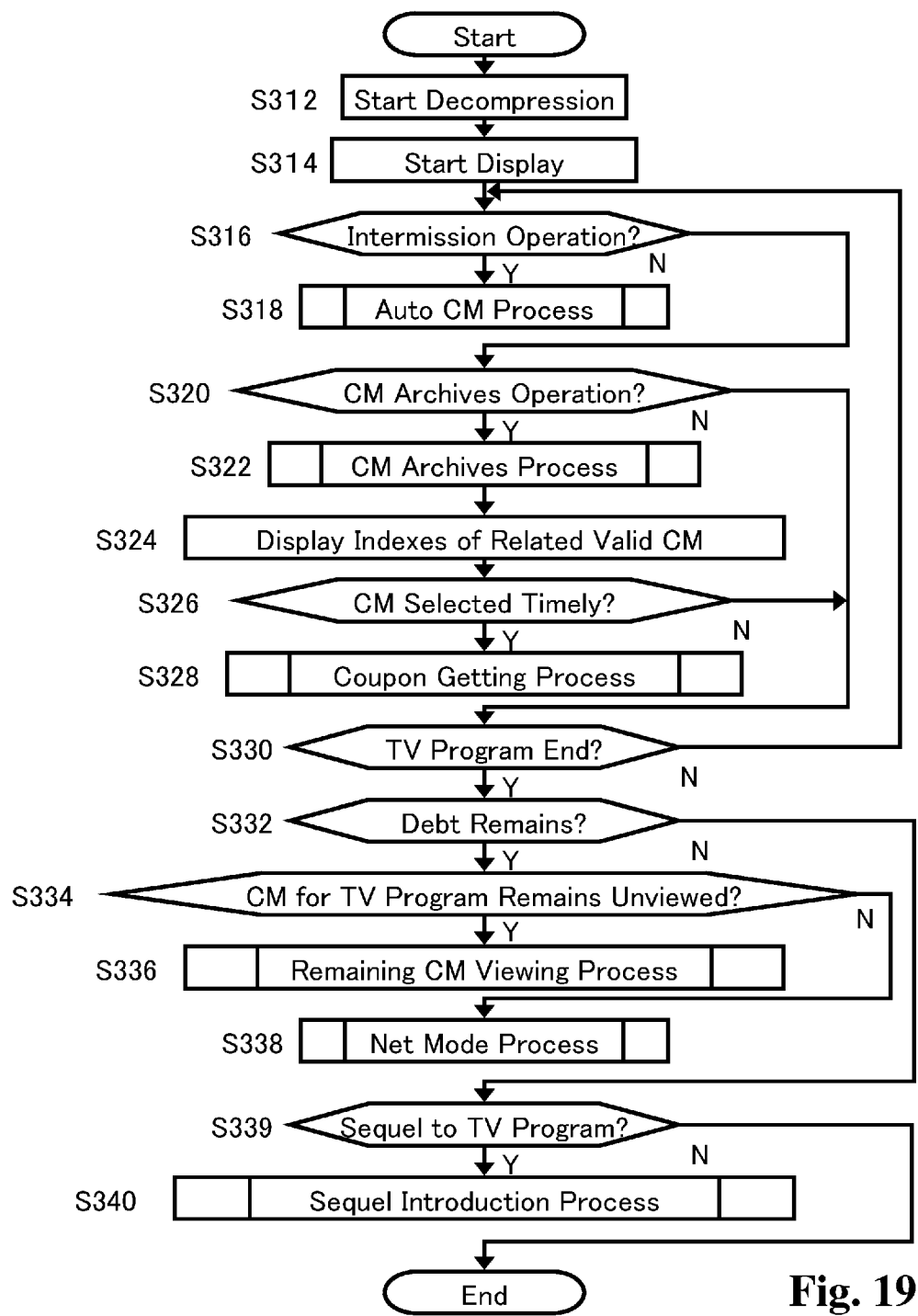
FIG. 19 is a flow chart showing the detail of the decompressing and playing process in steps S166 of FIG. 14 and S200 of FIG. 15.

FIG. 19 is a flow chart showing the detail of the decompressing and playing process in steps S166 of FIG. 14 and S200 of FIG. 15. If the flow starts, the decompression of the television program data is started in step S312, which is followed by step S314 in which the decompressed television program data is displayed. Since the television program data is divided into a plurality of segment data, the first segment data having been decompressed in step S312 is displayed in step S314 in parallel with the decompression of the second segment data in step S312. Thus, even in a full-length television program such as a feature film, step S312 is followed by step S314 to start the display with no substantial delay which would otherwise irritate the user.

Next in step S315, it is checked whether or not an intermission operation through the remote controller is done. Such an intermission operation may be done at any time when the user wants to have a break in the course of the display of the television program.

If it is detected in step S316 that the intermission operation is done, the flow goes to step S318 in which the display of the television program is interrupted to carry out the automatic commercial message process. The detail of the automatic commercial message process in step S318 is similar to the flow in FIG. 10 with steps S56 to S60 excluded so that step S50 may lead to step S62. Thus, during the intermission of the television program optionally caused by the user itself, the automatic commercial messages 41 as in FIG. 5 appears in television monitor 31 with commercial message coupon button 42, commercial message cut off button 43, commercial message search button 44 and commercial message channel button 45, with which the user can get coupon if he or she is interested in any of the automatic commercial messages.

Even if the user has gone into the flow to get coupon by operating one of these buttons, the user can easily quit such a coupon getting process to return to the rest of the television program by means of an interrupt operation through the remote controller.

If it is not detected in step S316 that an intermission operation is done, the flow goes to step S320 to check whether or not a commercial message archives operation through the remote controller is done. This operation is similar to the intermission operation in that the operation leads to voluntary commercial message viewing. In the case of the commercial message archives operation, it is to be done when the user wants to view the archives of the commercial message for a change by intentionally interrupt the television program.

If it is detected in step S320 that the commercial message archives operation is done, the flow goes to step S322 in which the display of the television program is interrupted to carry out the commercial message archives process. In general, all commercial messages each have their available periods, respectively. In other words, any commercial massage would not be provided by the advertisement provider after the expiration of the available period, nor any coupon would be issued on such an expired commercial message. The expired commercial messages, however, can be kept in commercial message archives of the advertisement provider computers or the user computers on a low amount of optional maintenance payment by the advertiser. Such expired commercial messages can be played back on the first user computer 11 in step S322 which is free from the issuance of the coupon or advertising rate payment from the advertiser corresponding thereto. In step S322, search windows similar to those in FIG. 7 are displayed on television monitor 31 for assisting the user. Thus, the user can search, select and view any of the expired commercial messages for fun in accordance with his or her memory of a nostalgic product or an old performer. In other words, the user may take a break with old commercial messages for fun at any time in the course of viewing a full-length television program such as a feature film. This may resemble the conventional commercial television broadcast program in which commercial message sometimes interrupts a feature film. However, the conventional commercial message forcibly interrupts the television program in contrast to the commercial message archives operation according to this invention, which is done voluntary by the user.

In response to the end or stop or the commercial message archives process, the flow goes to step S324 to display a list of indexes of valid commercial messages related to the expired commercial message which the user has been interested in. The relation may be intentionally set by the advertiser to update its commercial massage through a link between the expired commercial message and the valid commercial message. The relation may also be automatically searched through a common point between the expired commercial message and the valid commercial message, such as a common performer.

Next in step S326, it is checked whether or not one of the related commercial message is selected within a predetermined time. If such a selection operation is detected in step S326 the flow goes to step S328 to carryout the coupon getting process. Thus, a link form an expired commercial message to a valid message gives opportunity of getting coupon.

Even if the user has gone into the commercial message archives process in S322, the user can easily quit such a process to return to the rest of the television program by means of an interrupt operation through the remote controller.

If it is not detected in step S320 that the commercial message archives operation is done or if it is not detected in step S326 that one of the related commercial message is selected within a predetermined time, the flow goes to step S330.

The commercial message archives process in step S322 is possible not only in the flow of FIG. 19, but also in any time by an interruption through the remote controller.

Next in step S330, it is checked whether or not the television program ends. If not, the flow returns to step S316 to repeat steps S316 to S330 until the television program ends unless an operation is detected in one of steps S316 or S320.

If it is detected in step S330 that the television program ends, the flow goes to step S332 to check whether or not debt coupon remains. If debt coupon remains, the flow goes to step S334 to check whether or not any commercial message designating the viewed television program remains unviewed. If any, the flow goes to step S336 to carry out the remaining commercial message viewing process. If the remaining commercial message designating the viewed television program is viewed through the remaining commercial message process, the exclusive type electric coupon for resolving the debt can be promptly and effectively gotten.

On the other hand, if it is detected in step S334 that all commercial message designating the viewed television program have been already viewed, the flow goes to step S338 to carry out the net mode process. Thus, coupon getting action is possible through the automatic commercial message process or commercial message searching process led by the net mode process.

As stated above, if it is detected in step S332 that the debt coupon remains upon the television program ends, the flow automatically prepares a display for getting coupon to facilitate the user to resolve the debt. The user who does not want to do so, however, can quit the process of step S336 or step S338 to instantly end the flow by interruption through an operation of the remote controller. On the contrary, if it is not detected in step S332 that the debt coupon remains, the flow goes to step S339 without any display for coupon getting action.

In step S339, it is checked whether or not a sequel to the television program is available. If any, the flow goes to step S340 to carry out the sequel introduction process, which is convenient to the user if the television program is one of a series. The "sequel" in steps S339 and S340, however, means not only a series programs to be viewed in a sequential order, but also one of a group of related programs free from the order of viewing.

The detail of the sequel introduction process in step S340 is similar to step S80 and the following steps in FIG. 11 with the hit programs in step 80 replaced by sequels. Or, the sequel introduction process in step S340 can include such steps that the net mode in FIG. 10 follows the step of introducing sequels. The user who does not want to know about the sequel, however, can quit the process of step S340 to instantly end the flow by interruption through an operation of the remote controller. On the contrary, if it is not detected in step S339 that any sequel is available, the flow goes to the end.

Such a modification of the process in FIG. 19 is possible that a step of postponing the automatic decompression as in step 146 of FIG. 13 is inserted between steps 330 and S332. By means of such decompression postponing process, the television program which has been viewed is again made to be recognized as the "recorded" program. Thus, such a system is completed that coupon settlement is not necessitated by downloading the television program data, but is necessitated basically every time when the television program is decompressed to be viewed. In this case, it is possible to apply lower amount of coupon requirement for the second and further decompressions, or to allow free decompression on or after a predetermined times of decompression.

Figure 20:
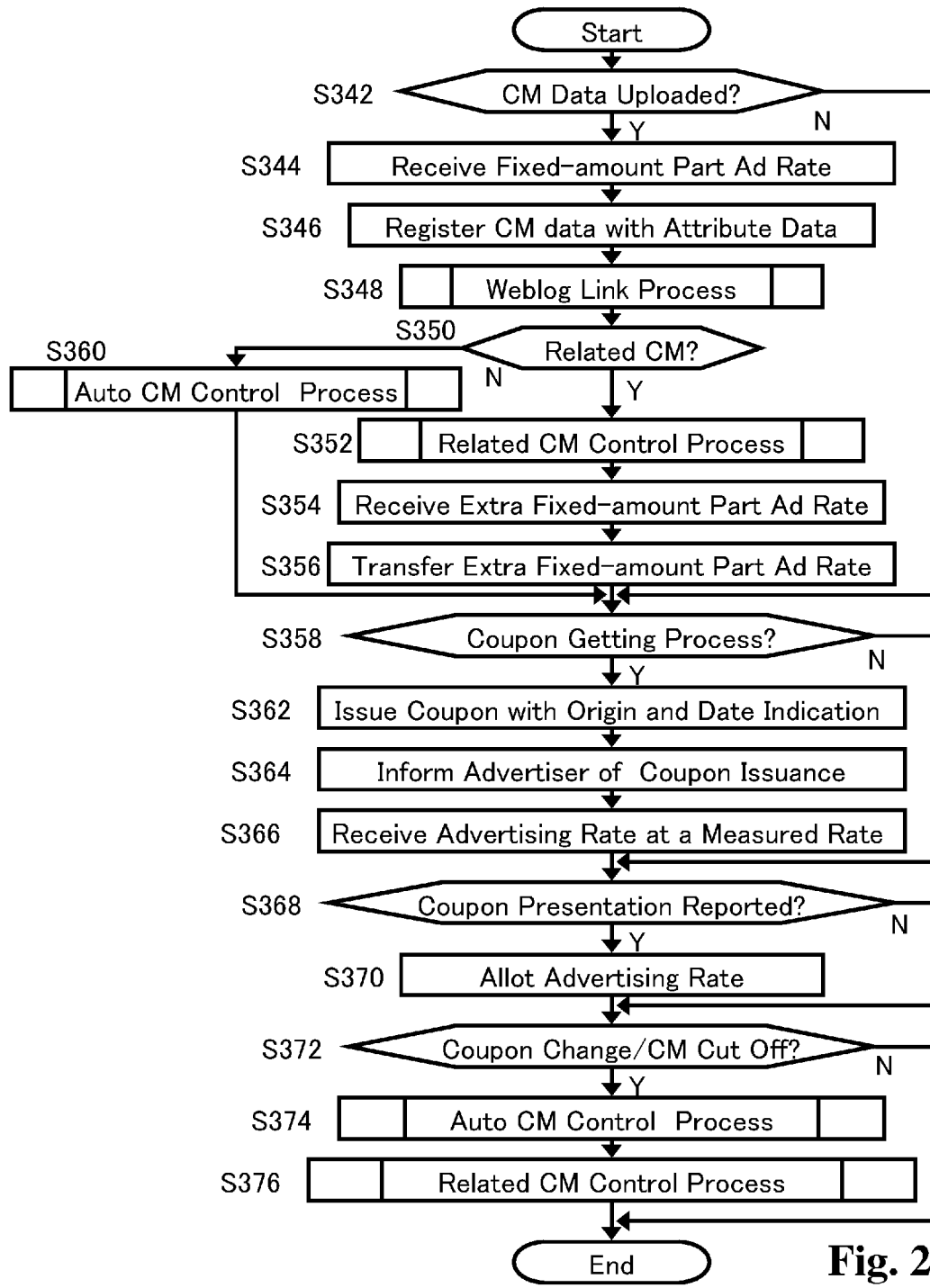
FIG. 20 is a flow chart showing the function of the advertisement provider computer of the embodiment in FIGS. 1 to 3 according to this invention.

FIG. 20 is a flow chart showing the function of the advertisement provider computer 14 of the embodiment in FIGS. 1 to 3 according to this invention. The function in FIG. 20 starts when advertisement provider computer 14 is turned ON, or when a commercial message data is uploaded from one of the advertiser computers to the advertisement provider computer 14, or when one of the user computers informs advertisement provider computer 14 of the point getting operation or commercial message cutting off operation, or when one of the television station computers inform the advertisement provider computer 14 of the electric coupon presentation by the user in exchange of viewing television program. The flow of FIG. 20 is common to the second advertisement provider computer 21 or other advertisement provider computers.

If the flow starts, it is checked in step S342 whether or not a commercial message data is uploaded from one of the advertiser computers. If any, the flow goes to step S344 to electrically receive a fixed-amount part of advertising rate from the advertiser computer. The fixed-amount part advertising rage corresponds to a basic cost for the advertisement provider computer 14 for managing the uploaded commercial message, which is independent from how many times the commercial message is actual viewed. Next in step S346, the uploaded commercial message data is registered in the advertisement provider computer 14 as well as the attribute data of the commercial message which is necessary for the commercial message data to be searched.

Next in step S348, the Weblog link process is carried out. This process makes it possible for unspecified great number of users to write Weblog linked to the commercial message. The meaning of step S348 is as follows.

Namely, a user who selects a commercial message among indexes displayed in related commercial message window 50 of FIG. 6 or in hit commercial message window 62 of FIG. 7 may write Weblog by operating the remote controller on the product advertised by the selected commercial message.

On the other hand, a user who is interested in Weblog possibly written on the commercial message makes a Weblog reading operation by the remote controller with the interested commercial message displayed as in FIG. 5 or FIG. 8. And, a list of Weblogs commenting the commercial message is displayed in television monitor 31. So, if the user selects one of the Weblogs by operating the remote controller, the details of the Weblog is displayed on television monitor 31. Thus, the user can know the information of the product not only by the commercial messages coming from the advertiser, but also by comments written on the product by unspecified great number of users. Such Weblogs may possibly include a malicious comment, which basically is on the selection and decision of the reader. Further, if the advertiser complains, the advertisement provider may investigate the Weblog and delete the comment in the Weblog or invalidate the link of Weblog to the commercial message it if necessary.

The user can access Weblog not only when the related commercial message is displayed as explained above, but also the list of Weblogs is displayed in television monitor 31 if one of the commercial messages is selected by the remote controller among the indexes in related commercial message window 50 in FIG. 6 or hit commercial message window 62 in FIG. 7. In this case, the user can access the related Weblogs without decompressing the commercial message data.

The Weblog link process in step S348 may include a step for issuing coupon to a user who written Weblog. Since the function of writing Weblog belongs to the first user computer 11, the advertisement provider locates the computer writing the Weblog for issuing the coupon to the located user computer. If the coupon is issued for the Weblog writing, the advertisement provider computer 14 informs the advertiser computer of the issuance of the electric coupon to electrically receive advertising rate at a metered rate. As to a malicious comment in Weblog, the advertiser can request the advertisement provider to delete the comment or to invalidate the link to Weblog as well as to refund the advertising rate.

The Weblog link process in step S348 may also include an Weblog creation assisting step for displaying an auxiliary menu for selectively pasting an icon or a clipart of commercial message. Commercial message information gotten and displayed through such an auxiliary menu includes not only commercial message digital moving image on which Weblog is to be written, but also information of a related product or product in the same category or competing product.

If one of the icons or clip arts pasted on Weblog through the above mentioned Weblog creation assisting step is operated, the display changes from Weblog to the commercial message for starting the coupon getting process of FIG. 17.

So, if the user pastes an icon or clipart of commercial message on Weblog through the Weblog creation step, a part of the created Weblog has similar function to that of related commercial message window 50 in FIG. 6 or hit commercial message window 62 in FIG. 7. In other words, a commercial message digital moving image can be directly viewed by selecting one of the icons or clip arts on Weblog.

After Weblog link process, the flow goes to step S350 to check whether or not the uploaded commercial message data is a related commercial message designating a television program. If so, the flow goes to step S352 to carry out the related commercial message control process. This is because that an addition of a new related commercial message data necessitates a change in controlling the display of entire related commercial messages. The details of related commercial message control process will be explained later. Next in step S354, an extra fixed-amount part of advertising rate is electrically received from the advertiser computer. Thus, the payment form the advertiser of the fixed-amount part of advertising rate is higher for the related commercial message than for the general commercial message. And then, the flow goes to step S356, in which the most of extra fixed-amount part of the advertising rate is electrically transferred to the television station computer in advance as the production resource of the television program which is designated by the commercial message.

If it is not determined in step S350 that the uploaded commercial message data is a related commercial message designating a television program, the flow goes to step S360 to carry out the automatic commercial message control process since it is the case that the general commercial message data has been uploaded. This is because that an addition of a new general commercial message data necessitates a change in controlling the automatic display of entire general commercial messages. The details of automatic commercial message control process will be explained later. And then, the flow goes from step S360 to step S358. On the other hand, if it is not determined in step S342 that a commercial message data is uploaded from one of the advertiser computers, the flow directly goes to step S358.

In step S358, it is checked whether or not the coupon getting process is correctly carried out in one of the user computers. If any, the flow goes to step S362 to issue the coupon to the user computer in response to the coupon getting process carried out therein. Upon issuing such a coupon, the advertisement provider computer 14 adds the origin and date indication of issuance to the coupon.

Next in step S364, advertisement provider computer 14 informs the advertiser computer of the coupon issuance in exchange of the viewing of commercial massage digital moving image of the advertiser. In exchange of informing the advertiser computer of the coupon issuance, the advertisement provider computer 14 electrically receives advertising rate at a metered rate from the advertiser computer in step S366, the flow then going to step S368. On the other hand, if it is not detected in step S358 that a coupon getting process is correctly carried out in any of the user computers, the flow directly goes to step S368.

In step S368, it is checked whether or not any of the television station computers informs the advertisement provider computer 14 of the presentation of coupon from the user in exchange of viewing a television program. If any, the flow goes to step S370 to allot the advertising rate to the television station computer, the flow then going to step S372. On the other hand, if it is not determined in step S368 that any of the television station computers informs the advertisement provider computer 14 of the presentation of coupon from the user, the flow directly goes to step S372.

In step S372, it is checked whether or not any change in coupon controlled by advertisement provider computer 14 is caused or any report of commercial message cut off comes form one of the user computers, the change in coupon controlled by advertisement provider computer 14 being caused by the coupon getting process reported in step S358 or the coupon presentation report in step S368. If it is detected in step S372 that a change in coupon controlled by advertisement provider computer 14 is caused or any report of commercial message cut off comes, the flow goes to step S374 to carry out automatic commercial message control process, and then goes to step S376 to carry out related commercial message control process in accordance with a necessity of change in controlling the display of entire automatic commercial messages or entire related commercial messages. The flow the goes form step S376 to the end. On the contrary, if it is not determined in step S372 that any change in coupon controlled by advertisement provider computer 14 is caused or any report of commercial message cut off report comes, the flow directly goes to the end.

Figure 21:
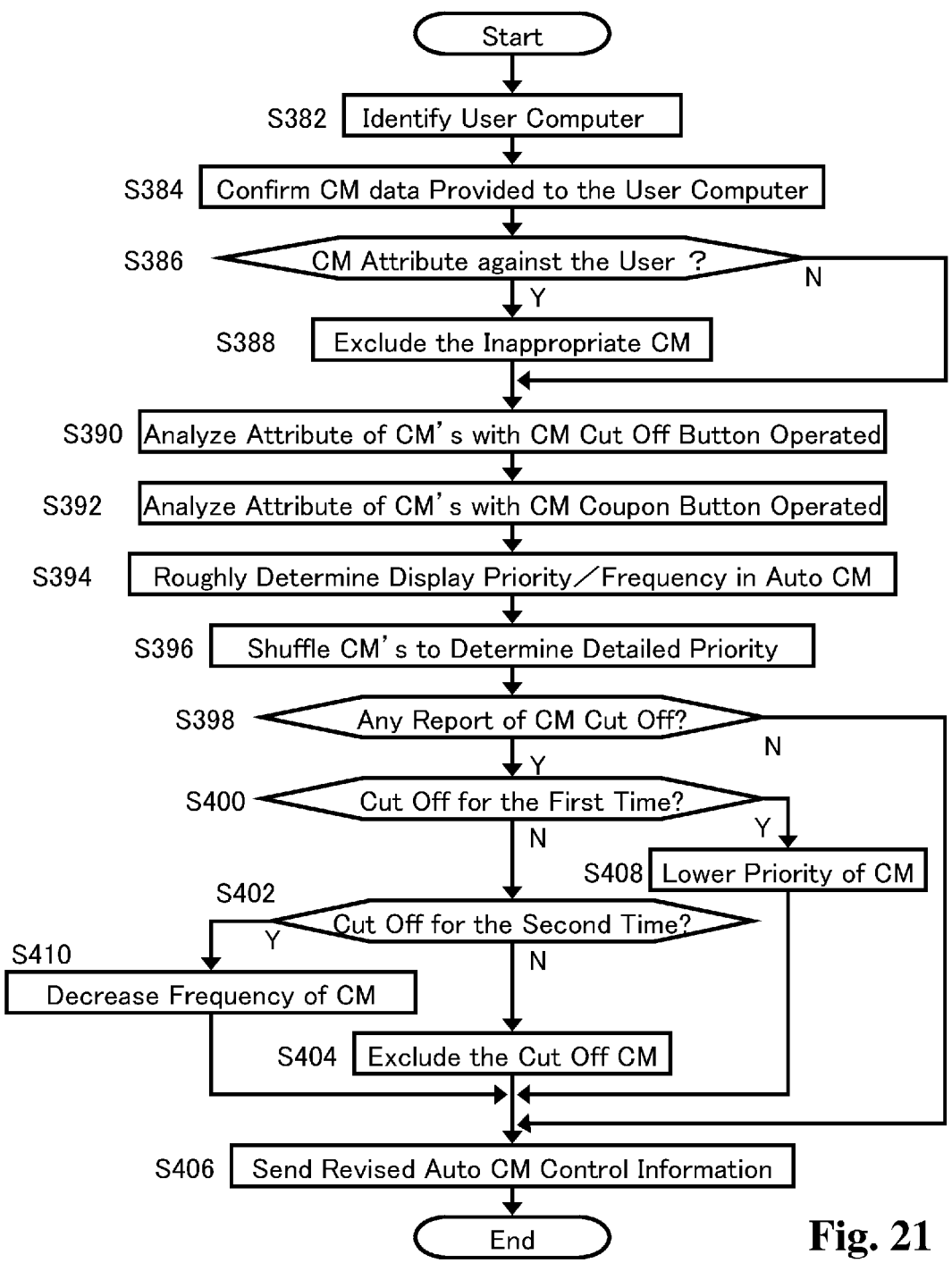
FIG. 21 is a flow chart showing the detail of the automatic commercial message control process in steps S360 and S374 of FIG. 20.

FIG. 21 is a flow chart showing the detail of the automatic commercial message control process in steps S360 and S374 of FIG. 20. If the flow starts, the user computer is identified in step S382. Next in step S384, all the commercial message data which have been provided to the identified user computer are confirmed by means of communication with the user computer. Thus, the manner of displaying commercial message data is controlled by the steps in FIG. 21 in contrast to that the provision of a commercial message data or of new edition thereof from the advertisement provider computer to the user computer is carried out in a suitable timing independently from the steps in FIG. 21.

And then, the flow advances to step S386 to check whether or not the provided commercial message data include any inappropriate commercial message with attribute against the user. If any, the flow advances to step S388 to exclude such an inappropriate commercial message data, the flow the going to step S390. For example, if the user is male, commercial message with attribute for female only is excluded form display. On the contrary, if it is not determined in step S386 that any inappropriate commercial message with attribute against the user is included, the flow directly goes to step S390.

Next, in step S390, attribute of the commercial massage on which commercial message cut off button 43 is operated by the user is analyzed on the basis of record of the buttons operations by the user to determine a negative interest of the user. On the other hand, in step S392, attribute of the commercial massage on which commercial message coupon button 42 is operated by the same user is similarly analyzed to determine a positive interest of the same user.

Next in step S394, display priority and frequency of the commercial messages are roughly determined in accordance with the analysis in steps S390 and S392 for the automatic commercial message process. For example, the priority is raised and the frequency is increased for a commercial message expected to attract the user's interest. On the other hand, the priority is lowered and the frequency is decreased for a commercial message of little chance to attract the user's interest.

In the rough determination in step S394, the specific priority for each of commercial messages in a group of the same level of priority and frequency is not determined but is left to step S396. Namely, in step S396, the specific priority of each of the commercial messages in the group is determined by means of a random shuffle.

If the flow of FIG. 21 is carried out as step S360 in FIG. 20, steps S390 and S392 may be omitted since any change in the result of the analysis is expected to be caused by the steps preceding step S360. Further in step S394, the first priority of display is given to the new commercial message data uploaded in step S342 of FIG. 20.

Next in step S398, it is checked whether or not step S372 in FIG. 20 has detects any new report of cutting off a commercial message. In contrast to steps S390 and S394 in which the priority or frequency of a commercial message is controlled in accordance with information of other cut off commercial messages of the same attribute as that of the commercial message to be controlled, step S398 and the succeeding steps are for controlling the display of a commercial message itself which has been cut off.

If it is determined in step S398 that any commercial message has been newly cut off, the flow goes to step S400 to check whether or not the commercial message is cut off for the first time. If not, the flow goes to step S402 to further check whether or not the commercial message is cut off for the second time. If still not, the flow goes to step S404 to exclude the cut off commercial message data because the commercial massage has been cut off for the third time or the more, the flow then going to step S406.

If it is determined in step S400 that the commercial message is cut off for the first time, the flow goes to step S408 to lower the priority of the commercial message, the flow then going to step S406. The lowering of the priority in step S408 does not mean a decrease of frequency of display in average, means but a postponement of the next automatic display with the repeated advertising effect kept. On the other hand, if it is determined in step S402 that the commercial message is cut off for the second time, the flow goes to step S410 to decrease the frequency of displaying the commercial message for avoiding to be finally disliked by the user rather than seeking the repeated advertising effect. However, the commercial message is not completely excluded in the case of step S410 in contrast to the case of step S404. The flow then goes from step S410 to step S406. If it is not determined in step S398 that any commercial message has been newly cut off, the flow directly goes to step S406.

In step S406, the above mentioned various measures carried out in the preceding steps in FIG. 21 are integrated as a revised automatic commercial message control information to send to the user computer identified in step S382, the flow then going to the end.

Figure 22:
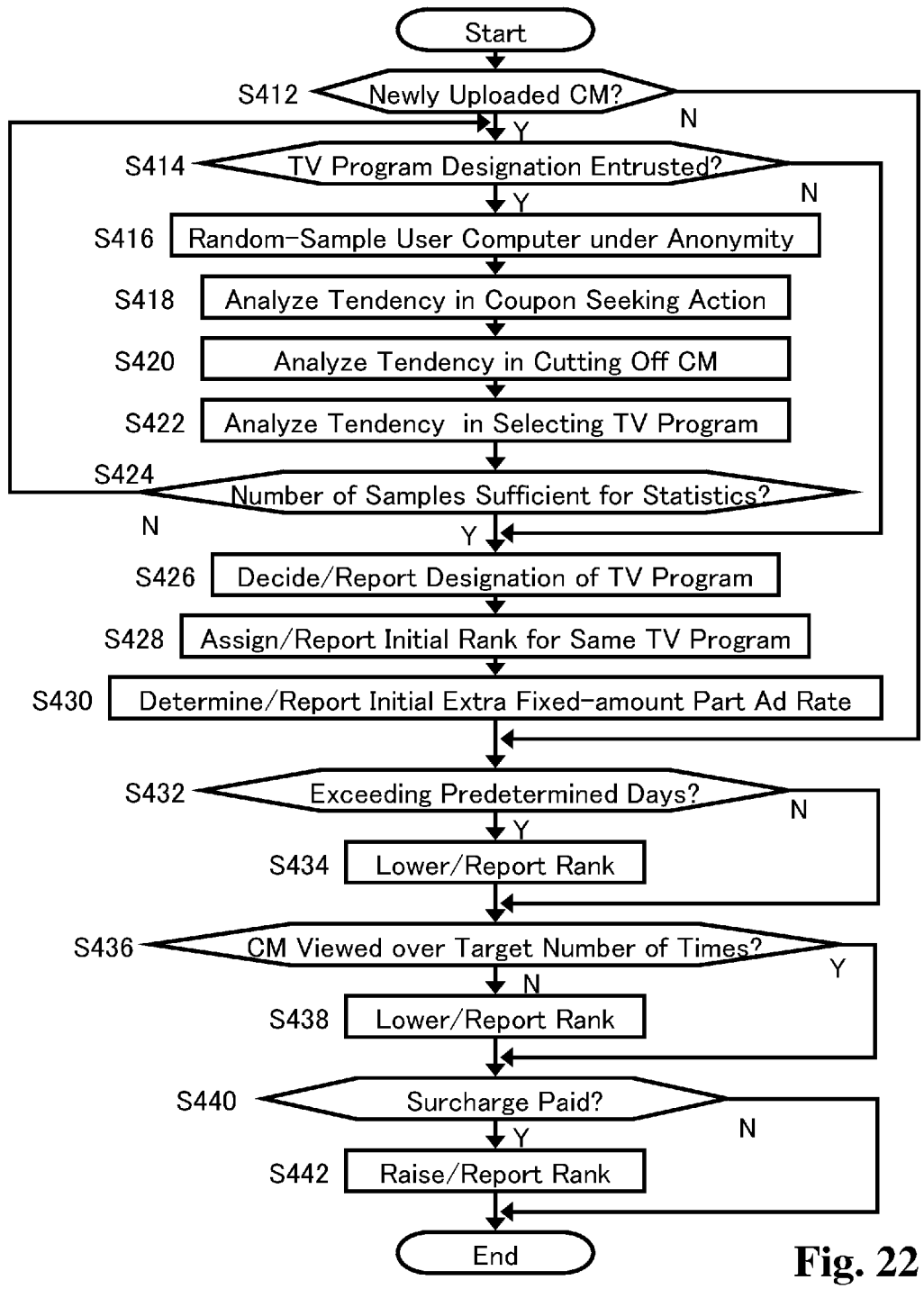
FIG. 22 is a flow chart showing the detail of the related commercial message control process in steps S352 and S376 of FIG. 20.

FIG. 22 is a flow chart showing the detail of the related commercial message control process in steps S352 and S376 of FIG. 20. If the flow starts it is checked in step S412 whether or not step S342 has detected that a commercial message data is newly uploaded from one of the advertiser computers.

And if it is determined in step S412 that the commercial message to be treated in the flow of FIG. 22 is a newly uploaded one, the flow goes to step S414 to check whether or not the designation of television program by the commercial message is entrusted to the advertisement provider according to an agreement with the advertiser. The designation of television program by the commercial message is basically made by the advertiser by itself. However, it is possible for the advertiser to make the agreement with the advertisement provider to entrust the television program designation to the advertisement provider who may propose a better matching between the commercial message and the television program depending on the database of past advertising performance that the advertisement provider possesses. If it is determined in step S414 that the commercial message data is under such an entrusting agreement, the flow goes to step S416.

In step S416, a user computer is sampled at random under anonymity. Upon such a sampling, the attribute of the user of the use computer is recorded with the privacy protection taken into consideration. And, the succeeding steps led by step S418 analyze the relation between the attribute and the action of the sampled user.

In step S418, the positive and negative interest of the sampled user in the commercial messages is analyzed on the basis of the tendency of actions by the user for seeking coupon. In other words, the relationship is analyzed between the attribute of the user and the tendency of the user who operates various buttons such as commercial message coupon button 42, commercial message button 59, commercial message search button 44 and questionnaire returning buttons 73 to 76 on various types of commercial messages. Further in step S420, the tendency of cutting off the commercial message by the sampled user is analyzed for a supplement to the information of negative interest of the user. In other words, the relationship is analyzed between the attribute of the user and the tendency of the user operating commercial message cut off button 43 on various types of commercial messages.

Next in step S442, the tendency of presentation or usage of the coupon by the sampled user is analyzed to get information of interest of the user in the television program. In other words, the relationship is analyzed between the attribute of the user gotten in step S416 and the tendency of the user, who operates selection button 53 or record button 60 to select a television program, to finally analyze the correlation between the commercial message and the television program for a specific attribute of the sampled user. This is also done in step S422 by comparing the relationship between the attribute and the commercial message gotten in steps S418 and S420 with the relationship between the attribute and the television program gotten in step S422 itself.

Next in step S424, it is checked whether or not the number of samples is sufficient for statistics. Of course, it is insufficient with the first sample only. Thus, the flow returns to step S414 to confirm that the designation is still entrusted. And, since the entrustment normally continues, the flow goes to step S416 to sample the next user computer. Thus, steps S412 to S424 are repeated until it is determined in step S424 that the number of samples is sufficient for statistics.

If it is determined in step S424 that the number of samples is sufficient for statistics, the flow goes to step S426 in which the advertisement provider computer decides by itself the most appropriate television program on the statistics to start providing the commercial message with the decided designation of the television program, the advertiser computer being informed of only the result.

On the other hand, if it is not determined in step S414 that the commercial message data is under the entrusting agreement, the flow directly goes to step S426 in which the advertisement provider computer decides the television program according to the designation by the advertiser, the advertiser computer being informed of the result for confirmation.

Next in step S428, the initial rank for the newly uploaded commercial message in the list of displaying commercial massages designating the same television program is automatically assigned. The advertisement provider computer starts providing the commercial message according to the initial rank, the advertiser computer being informed of the assigned initial rank. The newly uploaded commercial message is generally assigned with a high rank.

Further in step S430, an initial extra fixed-amount part of advertising rate is determined on the above explained advertising condition, the advertiser computer being informed of the initial extra fixed-amount part of advertising rate. And, then the flow goes from step S430 to step S432. On the other hand, if it is not determined in step S412 that the commercial message to be treated in the flow of FIG. 22 is a newly uploaded one, the flow directly goes to step S432.

Next in step S432, it is checked whether or not a time counted from the date of uploading the commercial message exceeds a predetermined days. If the time count exceeds the predetermined days, the flow goes to step S434 to lower the rank of the commercial message in accordance with a predetermined rule with the time count reset and restarted, the advertiser being informed of the lowered rank. The flow then goes from step S434 to step S436.

Thus, every time the flow goes through steps S432 and S434, the rank of the commercial message is lowered. As a result, the position of index of the commercial message in related commercial message window 50 moves downwardly so that it may be less and less appealing. Sometimes, the index may not be visible unless related commercial message window 50 is scrolled up.

On the other hand, if it is not determined in step S432 that the time count exceeds the predetermined days, the flow directly goes to step S436 without lowering the rank.

In step S436, it is checked whether or not the commercial message was viewed over a predetermined target number of times within a predetermined time period. If not, the flow goes to step S438 to lower the rank of the commercial message in accordance with a predetermined rule with the accumulated viewed times reset and recounted, the advertiser being informed of the lowered rank. The flow then goes to step S440. Thus, every time the flow goes through steps S436 and S438, the rank of the commercial message is lowered. As a result, the position of index of the commercial message in related commercial message window 50 moves downwardly as in the case of steps 432 and S434. On the other hand, if it is determined that the commercial message was viewed over a predetermined target number of times within a predetermined time period, the flow directly goes to step S440 without lowering the rank.

In step S440, it is checked whether or not surcharge for the extra fixed-amount part of the advertising rate is electrically paid from the advertiser computer of the advertisement provider computer. If the payment is confirmed, the flow goes to step S442 to raise the rank of the commercial message in accordance with a predetermined rule with the receipt of the surcharge reset, the advertiser being informed of the raised rank. The flow then goes to the end.

Thus, even if the rank is lowered in step S434 or step S438, the rank can be recovered in step S442 by means of payment of surcharge. Such a recovery of rank is possible every time the flow goes through steps S440 and S442.

On the other hand, if any payment of surcharge is not detected in step S440, the flow directly goes to the end without raising the rank.

Figure 23:
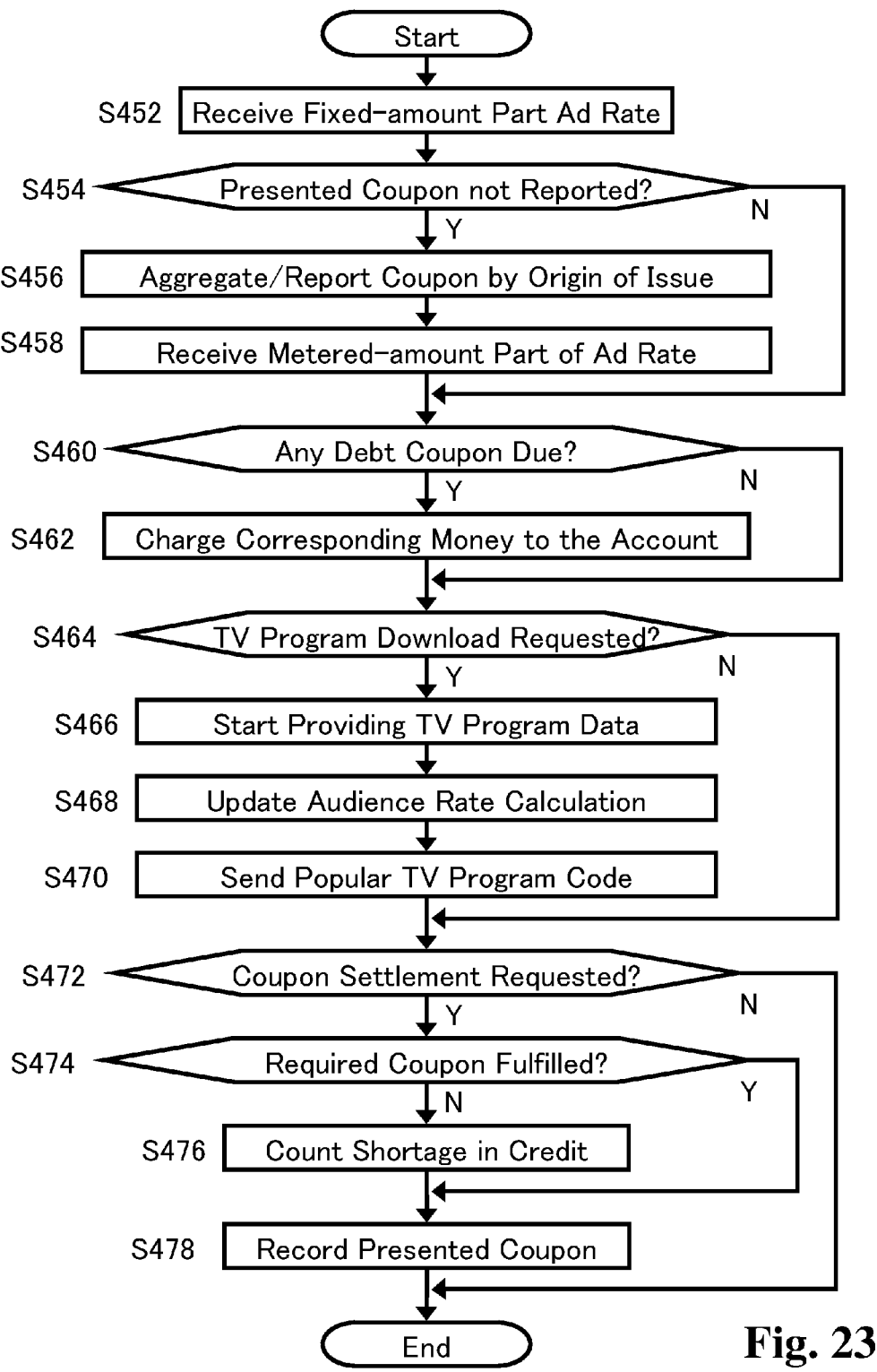
FIG. 23 is a flow chart showing the function of the television station computer of the embodiment in FIGS. 1 to 3 according to this invention.

FIG. 23 is a flow chart showing the function of the first station computer 3 of the embodiment in FIGS. 1 to 3 according to this invention. The function in FIG. 23 starts from the beginning every time when first station computer 3 is turned ON, or when the download of the television program or the coupon settlement is required by any of user computers. The flow of FIG. 23 is common to the second station computer 6 or other station computers.

If the flow starts, fixed-amount part of the advertising rate is electrically received from the advertisement provider computer in step S452. This corresponds to the transfer of the extra fixed-amount part of the advertising rate carried out by the advertisement provider computer in step S356 in FIG. 20. If such a transfer is not done by the advertisement provider computer, step S452 is omitted.

Next in step S454, it is checked whether or not any coupon presented by a user is left unreported to the advertisement provider computer. If any, the flow goes to step S456 to aggregate the unreported coupons by origin of issue, i.e. with respect to each advertisement provider computer which issued the coupons, the aggregated coupon being reported to each of advertisement providers. And then, the flow goes to step S458 to electrically receive the metered rate part of the advertising rate which is allotted from each of the advertisement computers in exchange of the aggregated amount of coupons reported to each of the advertisement computers. The flow then goes form step S458 to step S460. On the other hand, if it is determined in step S454 that no coupon presented by a user is left unreported to the advertisement provider computer, the flow directly goes to step S460.

In step S460, it is checked whether or not any debt of coupon at any of the user computers is due. If any, the flow goes to step S462 to charge money corresponding to the debt coupon to the account of the user, the flow then going to step S464. On the other hand, if it is not detected in step S460 that any debt of coupon at any of the user computers is due, the flow directly goes to step S464.

In step S464, it is checked whether or not any user computer requires the download process. If any, the flow goes to step S466 to start providing the television program data to the user computer requesting it.

Next in step S468, the audience rate is recalculated with the new provision of television program in step S466 added to the data base of television programs provision with date and time recorded to update the audience rate. The audience rate means the accumulation of number of times in providing a specific television program within a period divided by total number of times of provision of all the television programs falling into a predetermined category within the same period. If the audience rate of a television program is greater than a predetermined rate, the television program is regarded as "popular program" with a code attached for indication thereof, which is sent to all the user computers in step S470 for general television program information, the flow then going to step S472. The code indicative of "popular program" may be replaced by the audience rate as it is. In television program window 51 includes a television program with the code or audience rate attached, the index of the television program is accompanied with an indication of "popular program" or audience rate in television program window 51. It is needless to say that step S470 is void if no audience rate of a television program is grater than a predetermined rate. On the other hand, if it is not detected in step S464 that any user computer requires the download process, the flow directly goes to step S472.

In step S472, it is checked whether or not any user computer requires the coupon settlement process. If any, the flow goes to step S474 to check whether or not the required coupon is fulfilled by the presentation thereof from the user computer. If any shortage occurs, the flow goes from step S474 to step S476 to count the shortage of coupon in credit, the flow then going to stem S478. On the other hand, if it is determined in step S474 that the required coupon is fulfilled by the presentation thereof from the user computer, the flow directly goes to step S478.

In step S478, the presentation of coupon is recorded for statistics, the flow then going to the end. In the record made in step S478, the amount of coupon counted in credit is excluded from the record since it has not related with any viewing of commercial message. On the other hand, if it is not determined in step S472 that any user computer requires the coupon settlement process, the flow directly goes to the end.

As stated above, the embodiment according to this invention separates the check of the requirement for the download process in step S464 and the check of the requirement for the coupon settlement process in step S472 from each other. This means that the coupon settlement does not instantly begin in response to the download process started in step S466, but is postponed until the coupon settlement is required in accordance with actual viewing of the television program. In other words, the coupon settlement is not carried out in exchange of a mere recording of the television program. This corresponds to the function of the user computer in steps S196 to S202 of FIG. 15.

In FIG. 23 above, steps S468 and S470 for updating the audience rate and sending the same are carried out in response to the request for the television program download process. Steps S468 and S470 are not limited to be carried out under such a condition, but can be carried out in any case of necessity. For example, these steps can be located at any suitable step where they can be periodically carried out without any condition.

Here, a modification of the embodiment is to be explained in relation to step S456. For a preparatory measure to the modification, the coupon is to be issued in step S362 in FIG. 20 with a code indicative of the viewed commercial message in addition to the origin and date of the coupon issuance. Corresponding to the modification in step S62, the aggregation in step S456 is not done roughly by the origin of coupon issuance, but is to be done in more detail by individual commercial message, the advertisement provider computer being informed of the result of the aggregation.

Such an aggregation by commercial message is not necessary for the purpose of advertising rate allotment in step S458 between the television station computer and the advertisement provider computer, but the aggregation by commercial message is utilized by the advertisement provider in its own information control as well as in a special agreement with the advertiser for the payment of advertising rate, the detail of which will be explained below.

First, the advantage of the aggregation by commercial message is explained with respect to information control. Since the aggregation shows correlation between the commercial message selection tendency and the television program selection tendency of the same user, the aggregation is helpful for the advertisement provider to recommend a television program as a good match with a commercial message to the advertiser thereof. In other words, the flow of FIG. 22 for the advertisement provider computer is so modified that a step of analyzing the correlation is added between step S416 and step S424 for helping the decision of designating the television program in step S426.

Second, the advantage of the aggregation by commercial message is explained with respect to the special agreement between the advertisement provider and the advertiser. As stated above, the advertiser pays the advertising rate primarily for the viewing of the commercial message by the user. In other words, the advertiser is generally not so interested in the future usage of the coupon once having been issued in exchange of viewing of the commercial message. However, such a special agreement for advertising rate payment between the advertisement provider and the advertiser, on the other hand, that the advertising rate will not be paid unless not only when the coupon is issued, but also when the issued coupon is actually used by the user in viewing a television program. According to the special agreement, the advertiser can directly confirm the effect of the commercial message through the entire process leading to the final object of coupon getting action by the users. For the special agreement, the aggregation by commercial message is inevitable.

Further, the aggregation by commercial message is advantageous in the following case of the embodiment. Namely, such a case is possible in embodying this invention that an advertiser is also an advertisement provider who provides its own advertisement. In this case, the advertiser computer and the advertisement provider computer are integrated into one in which the advertiser computer itself issues coupons to the user computers. In such a case, it may be necessary for the advertiser to control the coupon usage by commercial message. Further, in the simplest case, an advertisement provider provides only one commercial message. The aggregation by commercial message is advantageous in that it is universally applicable to various cases of the relationship between the advertiser and the advertisement provider.

As is apparent above, step S456 of the flow in FIG. 23 relates by its nature to the broad meaning that the aggregation is done by the history of issuance of the coupon. In other words, "the aggregation by the history of issuance of the coupon" according to this invention has a broad meaning covering not only the aggregation by the origin of issuance of the coupon as in step S456, but also the aggregation by the commercial message as in the modified embodiment.

In the above mentioned case in which an advertiser is also an advertisement provider who provides its own advertisement, the advertisement provider can make a following agreement with a television station. According to the agreement, the advertisement provider has the television station provide a trailer or the like of its television program to the advertisement provider without compensation, the trailer or the like being provided by the advertisement provider to the user computers along with its own commercial message. According to the agreement, the advertisement provider does not require any advertising rate from the television station in compensation for the effort of providing the trailer or the like. The detailed manner of using the trailer of the television program as one of the commercial message has been explained above in the function of the advertisement provider.

According to the agreement above, the commercial message on which the exclusive type coupon will be issued and the trailer or the like of the television program designated by the coupon are provided in combination at once to the user computers. Thus, the television station can take advantage of the agreement in effectively advertising its television program, while advertiser as the advertisement provider can take advantage of the agreement in strengthen the motivation of the user to view the commercial message of the advertiser.

In the modified embodiment above, such a system can be easily realized on a conventional website of the company that an exclusive type coupon is issued on the web site on which the commercial message and the trailer or the like of the television program are both capable of being viewed without newly establishing a special advertisement provider.

Figure 24:
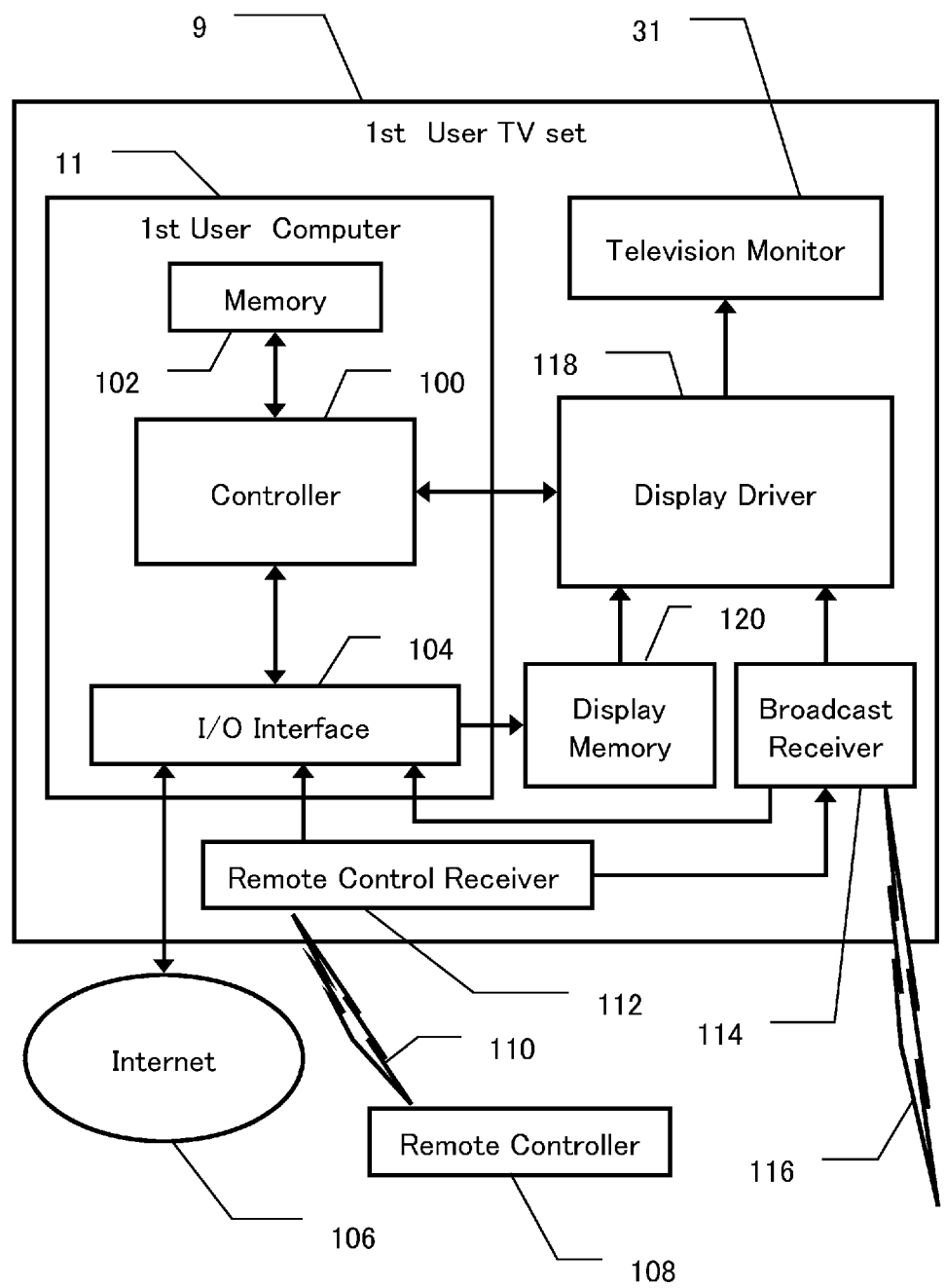
FIG. 24 is a block diagram showing the detail of the user television set in FIG. 1.

FIG. 24 is a block diagram showing the detail of the first user television set 9 in FIG. 1. The first user computer 11 includes controller 100, memory 102 and input/output interface 104. Memory 102 is for storing computer program to be executed by the controller 100 as well as various data including television program data downloaded from the television stations and commercial message data downloaded from the advertisement providers. The communication with the television stations and the advertisement providers are made under the control of controller 100 through Internet 104 by way of input/output interface 104

Input/output interface 104 also transmits to controller 100 various operation signals from remote control receiver 112 which is to receive infrared signals 110 form remote controller 108. Remote controller 108 makes it possible to make various operations including the power ON/OFF, the change in television station channel, the adjustment of sound volume, the operation of various buttons displayed on the television monitor and the selection of an item among a list displayed on the television monitor.

The operation signals based on the infrared signal 110 received by remote control receiver 112 is also transmitted directly to broadcast receiver 114. Broadcast receiver 114 receives airwaves 116 carrying the digital television programs which is selected in response to the television station channel changing signal from remote control receiver.

Display driver 118 drives television monitor 31 to display on it broadcast television program 32 as in FIG. 4 on the basis of broadcast receiver 114. Display driver 118 further drives television monitor 31 under control of controller 100 to display the computer image data received from display memory 120, the image data being transmitted from controller 100 by way of input/output interface 104.

The computer image data such as various buttons 33 to 37 may be superimposed on the broadcast television program 32 in one case as in FIG. 4. The computer image data from display memory 120, however, occupies the entire television monitor 31 in other cases as in FIG. 5 to FIG. 8.

The digital television programs received by broadcast receiver 114 is also transmitted to input/output interface 104 to be stored in memory 102 under control of controller 100 as the recorded broadcast program in response to the operation of remote controller 108.

Although FIG. 24 shows the block diagram of the first user computer 11, other computers in FIG. 1 to FIG. 3 such as the second user computer 12, the first station computer 3, the second station computer 6, advertisement provider computer 14, the second advertisement provider computer 21, the first advertiser computer 19, the second advertiser computer 20, the third advertiser computer 22 and the fourth advertiser computer 23 each include necessary elements similar to controller 100, memory 102 and input/output interface 104 of the first user computer 9 in FIG. 24.

The other computers above are each capable of communicating with each other, or with other computers within the system, or with outside computers through Internet by way of each of their input/output interfaces, respectively. Further, the computers are each capable of being connected with suitable operating devices such as a keyboard or a mouse and display device such as a monitor through each of the input/output interfaces, respectively.

What is claimed is:

1. A moving image viewing apparatus capable of being in communication with a moving image data delivery system and an advertising image data delivery system comprising:

a display capable of displaying a television program provided by the moving image data delivery system and a commercial message provided by the advertising image data delivery system without intermediary of the delivery of the moving image data by the moving image data delivery system;

a first controller to electrically receive form the advertising image data delivery system an electric data denoting a right of viewing the television program on the display in exchange of a commercial message view by the moving image viewing apparatus on the display provided by the advertising image data delivery system, wherein no electric payment is made to the moving image data delivery system when the advertising image data delivery system issues the electric data to the moving image viewing apparatus in exchange of viewing commercial message;

a second controller allowed to view on the display the television program provided by the moving image data delivery system in exchange of a presentation of the electric data to the moving image data delivery system; and a third controller to inform the moving image data delivery system of a report of the presentation of the electric data to the moving image data delivery system, wherein an electric payment from the advertising image data delivery system is made in exchange of a presentation of the report from the moving image data delivery system to the advertising image data delivery system.

2. The moving image viewing apparatus according to claim 1, wherein the second controller is allowed to view on the display the television program even in the case of insufficiency of the electric data, provided that the insufficiency is to be compensated later by money in due date.

3. The moving image viewing apparatus according to claim 2, wherein the second controller is allowed to view on the display the television program in advance conditioned on a late presentation of the electric data to be received by the moving image viewing apparatus in exchange of viewing a commercial message prior to a due date by means of the first controller.

4. The moving image viewing apparatus according to claim 1, wherein the advertising image data delivery system includes a controller to electrically provide a plurality of advertising image data of commercial massages to the moving image viewing apparatus in an automatic manner.

5. The moving image viewing apparatus according to claim 1, wherein the advertising image data delivery system includes a controller to electrically provide one of a plurality of advertising image data of commercial messages to the moving image viewing apparatus by request thereof.

6. The moving image viewing apparatus according to claim 1, wherein the advertising image data delivery system includes a controller to electrically provide one of a plurality of advertising image data of commercial messages to the moving image viewing apparatus, the advertising image data of commercial message being related to a television program designated by the moving image viewing apparatus.

7. The moving image viewing apparatus according to claim 1, wherein the advertising image data delivery system includes a controller to electrically provide one of a plurality of advertising image data of commercial messages to the moving image viewing apparatus, the plurality of advertising image data of commercial messages including an advertisement of a television program.

8. The moving image viewing apparatus according to claim 1, wherein the first controller is to receive the electric data in exchange of selecting one of the plurality of advertising image data of commercial massages provided in an automatic manner.

9. The moving image viewing apparatus according to claim 1 further comprising a fourth controller to inform of searched information of a plurality of commercial messages, wherein the first controller is to receive the electric data in exchange of selecting one of the plurality of advertising image data of commercial massages informed by the fourth controller.

10. The moving image viewing apparatus according to claim 1 further comprising a fourth controller to inform of a plurality of commercial messages related to a television program designated by the moving image viewing apparatus, wherein the first controller is to receive the electric data in exchange of selecting one of the plurality of advertising image data of commercial massages informed by the fourth controller.

11. The moving image viewing apparatus according to claim 1 further comprising a manual operating portion to voluntary direct the moving image viewing apparatus to at least partially replace the television program by the commercial message on the display.

12. A moving image viewing apparatus capable of being in communication with a moving image data delivery system and an advertising image data delivery system comprising:
a display capable of displaying a television program provided by the moving image data delivery system and a commercial message provided by the advertising image data delivery system without intermediary of the delivery of the moving image data by the moving image data delivery system;
a first controller to electrically receive form the advertising image data delivery system an electric data denoting a right of viewing the television program on the display in exchange of a commercial message view by the moving image viewing apparatus on the display provided by the advertising image data delivery system, wherein no electric payment is made to the moving image data delivery system when the advertising image data delivery system issues the electric data to the moving image viewing apparatus in exchange of viewing commercial message;
a second controller allowed to view on the display the television program provided by the moving image data delivery system in advance conditioned on a late presentation of the electric data to be received by the moving image viewing apparatus in exchange of viewing a commercial message prior to a due date by means of the first controller, the received electric data being presented later to the moving image data delivery system; and
a third controller to inform the moving image data delivery system of a report of the presentation of the electric data to the moving image data delivery system, wherein an electric payment from the advertising image data delivery system is made in exchange of a presentation of the report from the moving image data delivery system to the advertising image data delivery system.

13. The moving image viewing apparatus according to claim 12, wherein the second controller is to compensate the television program view by money in the due date.

14. The moving image viewing apparatus according to claim 12 further comprising a fourth controller to inform of searched information of a plurality of commercial messages, wherein the first controller is to receive the electric data in exchange of selecting one of the plurality of advertising image data of commercial massages informed by the fourth controller.

15. The moving image viewing apparatus according to claim 12 further comprising a fourth controller to inform of a plurality of commercial messages related to a television program designated by the moving image viewing apparatus, wherein the first controller is to receive the electric data in exchange of selecting one of the plurality of advertising image data of commercial massages informed by the fourth controller.

16. The moving image viewing apparatus according to claim 12, wherein the advertising image data delivery system includes a controller to electrically provide one of a plurality of advertising image data of commercial messages to the moving image viewing apparatus, the plurality of advertising image data of commercial messages including an advertisement of a television program.

* * * * *